US012659003B2

(12) United States Patent
Fan et al.

(10) Patent No.: US 12,659,003 B2
(45) Date of Patent: Jun. 16, 2026

(54) BEAM-BASED COMMUNICATION METHOD AND RELATED APPARATUS

(71) Applicant: HUAWEI TECHNOLOGIES CO., LTD., Shenzhen (CN)

(72) Inventors: Bo Fan, Chengdu (CN); Xi Zhang, Chengdu (CN); Shitong Yuan, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 433 days.

(21) Appl. No.: 18/300,491

(22) Filed: Apr. 14, 2023

(65) Prior Publication Data

US 2023/0254030 A1     Aug. 10, 2023

Related U.S. Application Data

(63) Continuation of application No. PCT/CN2020/121623, filed on Oct. 16, 2020.

(51) Int. Cl.
    *H04B 7/06*         (2006.01)
    *H04L 5/00*         (2006.01)
    *H04W 72/23*      (2023.01)

(52) U.S. Cl.
    CPC ......... *H04B 7/0695* (2013.01); *H04L 5/0048* (2013.01); *H04W 72/23* (2023.01)

(58) Field of Classification Search
    CPC ..... H04B 7/0695; H04W 72/23; H04L 5/0048
    See application file for complete search history.

(56) References Cited

U.S. PATENT DOCUMENTS

| | | | | |
|---|---|---|---|---|
| 11,212,825 | B2 * | 12/2021 | Gong | H04W 72/1273 |
| 2019/0141693 | A1 * | 5/2019 | Guo | H04L 5/0053 |
| 2020/0107341 | A1 | 4/2020 | Zhang et al. | |
| 2020/0177242 | A1 * | 6/2020 | Kim | H04L 5/0051 |
| 2021/0051736 | A1 * | 2/2021 | Jeon | H04W 76/11 |
| 2022/0046612 | A1 * | 2/2022 | Ma | H04W 72/23 |

FOREIGN PATENT DOCUMENTS

| | | | | |
|---|---|---|---|---|
| CN | 111510267 A | | 8/2020 | |
| CN | 111586858 A | * | 8/2020 | H04W 72/23 |

OTHER PUBLICATIONS

3GPP TS 38.213 V16.3.0, "3rd Generation Partnership Project; Technical Specification Group Radio Access Network; NR; Physical layer procedures for control (Release 16)," Sep. 2020, 179 pages.

(Continued)

*Primary Examiner* — Duc C Ho
(74) *Attorney, Agent, or Firm* — Fish & Richardson P.C.

(57) ABSTRACT

Embodiments of this application disclose a beam-based communication method. The method includes: receiving configuration information of a physical downlink control channel (PDCCH) from a network device, wherein the PDCCH is corresponding to a control resource set 0 (CORESET0); receiving indication information from the network device, wherein the indication information indicates a first beam; where the configuration information of the PDCCH includes a first parameter, the first parameter indicates that the PDCCH uses the first beam; and receiving the PDCCH by using the first beam.

20 Claims, 4 Drawing Sheets

(56)                    References Cited

OTHER PUBLICATIONS

3GPP TS 38.214 V16.3.0, "3rd Generation Partnership Project; Technical Specification Group Radio Access Network; NR; Physical layer procedures for data (Release 16)," Sep. 2020, 166 pages.
3GPP TS 38.331 V16.2.0, "3rd Generation Partnership Project; Technical Specification Group Radio Access Network; NR; Radio Resource Control (RRC) protocol specification (Release 16)," Sep. 2020, 921 pages.
Ericsson, "On beam indication, measurement, and reporting," 3GPP TSG-RAN WG1 NR Ad Hoc #3, R1-1716350, Nagoya, Japan, Sep. 18-21, 2017, 13 pages.
Nokia et al., "Enhancements on Multi-beam Operation," 3GPP TSG RAN WG1 #98bis, R1-1910916, Chongqing, China, Oct. 14-20, 2019, 16 pages.
3GPP TS 38.331 V15.3.0, "3rd Generation Partnership Project; Technical Specification Group Radio Access Network; NR; Radio Resource Control (RRC) protocol specification (Release 15)," Sep. 2018, 445 pages.
Nokia et al., "On QCL Framework and Configurations in NR," 3GPP TSG RAN WG1 NR Ad-Hoc#2, R1-1711312, Qingdao, P.R. China, Jun. 27-30, 2017, 6 pages.

Vivo, "Discussion on multi-beam enhancement," 3GPP TSG RAN WG1 #102-e, R1-2005363, Aug. 17-28, 2020, 21 pages.
3GPP TS 38.211 V15.0.0, "3rd Generation Partnership Project; Technical Specification Group Radio Access Network; NR; Physical channels and modulation (Release 15)," Dec. 2017, 73 pages.
Samsung, "Remaining Issues on Multi-Beam Operation," 3GPP TSG RAN WG1 Meeting #94, R1-1808750, Gothenburg, Sweden, Aug. 20-24, 2018, 7 pages.
3GPP TS 38.212 V15.0.0, "3rd Generation Partnership Project; Technical Specification Group Radio Access Network; NR; Multiplexing and channel coding (Release 15)," Dec. 2017, 82 pages.
3GPP TS 38.213 V15.0.0, "3rd Generation Partnership Project; Technical Specification Group Radio Access Network; NR; Physical layer procedures for control (Release 15)," Dec. 2017, 56 pages.
3GPP TS 38.214 V15.0.0, "3rd Generation Partnership Project; Technical Specification Group Radio Access Network; NR; Physical layer procedures for data (Release 15)," Dec. 2017, 71 pages.
International Search Report and Written Opinion in International Appln. No. PCT/CN2020/121623, mailed on Jul. 15, 2021, 15 pages (with English translation).
Extended European Search Report in European Appln. No. 20957256.9, mailed on Nov. 8, 2023, 9 pages.

* cited by examiner

Figures 3, 4:
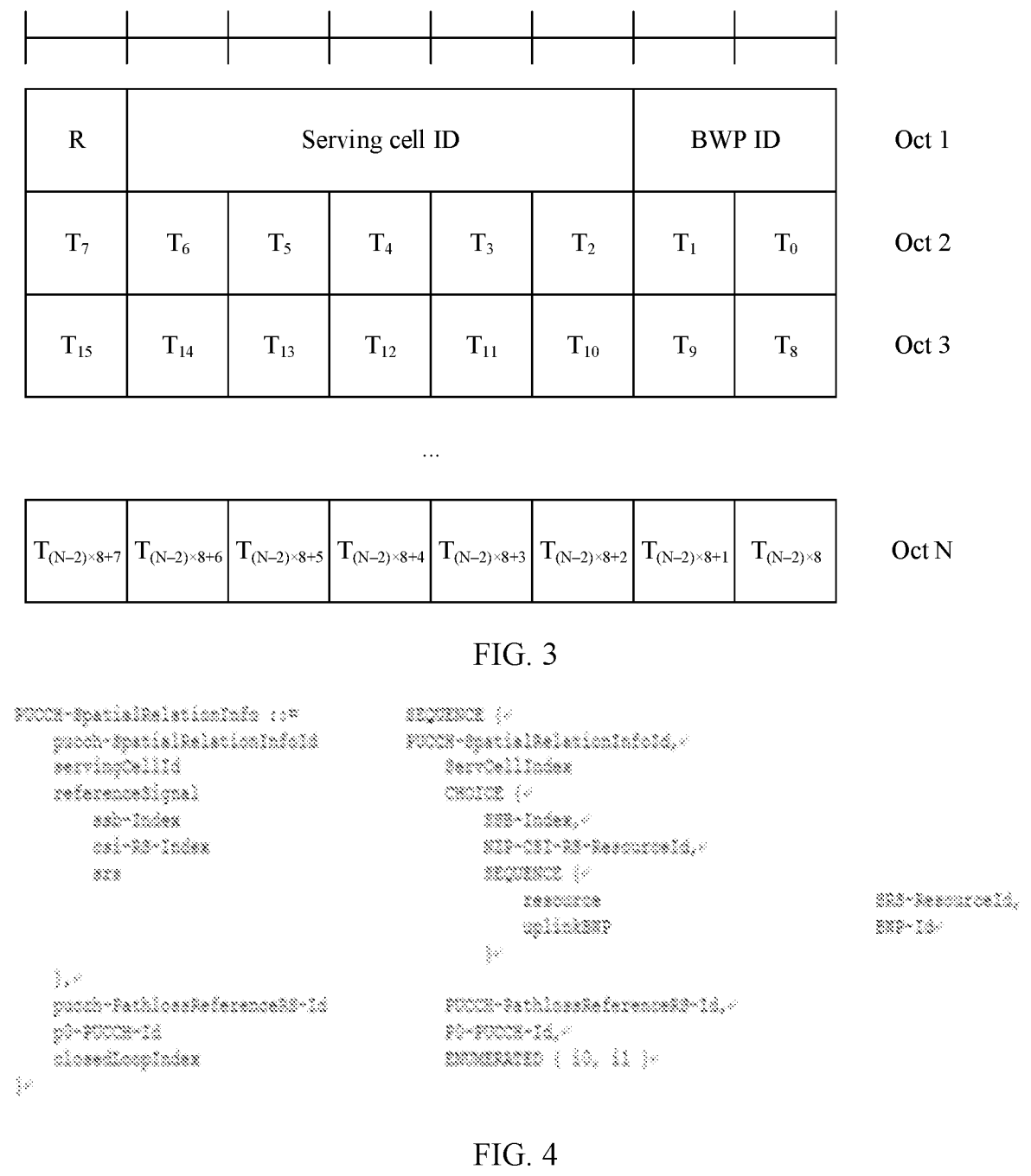

| R | Serving cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

501: Receive a configuration message sent by the network device

502: Receive an indication message sent by the network device

503: Determine a first beam

504: The terminal device communicates with the network device by using the first beam

601

Transceiver module

602

Processing module

701

Transceiver module

BEAM-BASED COMMUNICATION METHOD AND RELATED APPARATUS

CROSS-REFERENCE TO RELATED APPLICATIONS

This application is a continuation of International Application No. PCT/CN2020/121623, filed on Oct. 16, 2020. The disclosure of which is hereby incorporated by reference in its entirety.

TECHNICAL FIELD

This application relates to the field of communication technologies, and in particular, to a beam-based communication method and a related apparatus.

BACKGROUND

In a 5th generation (5G) mobile communication system, high-frequency communication is used. That is, data is sent or received through isuper high frequency (above 6 GHz) signals. A main problem of the high-frequency communication is that signal energy sharply decreases as a transmission distance increases, and this results in a short signal transmission distance. To resolve this problem, an analog beam technology is used for the high-frequency communication. A large-scale antenna array is for processing, and the signal energy is concentrated in a small range, to form a signal similar to a light beam and referred to as an analog beam (a beam for short), so that the transmission distance is extended.

A network device may generate different beams that point to different transmission directions. In downlink data transmission, the network device sends data to a terminal device by using a specific beam, and notifies the terminal device of information about the transmit beam used by the network device. In this way, the terminal device can receive, by using a correct receive beam (namely, a receive beam corresponding to the transmit beam), the data sent by the network device.

The network device indicates a beam for each channel by using signaling. Specifically, the network device separately indicates beams for a physical downlink control channel (PDCCH), a physical downlink shared channel (PDSCH), a physical uplink control channel (PUCCH), a physical uplink shared channel (PUSCH), and a physical random access channel (PRACH) by using different signaling. Because signaling used for each type of channels varies, high signaling overheads are caused.

Separate indication of a beam for each channel causes high signaling overheads. During actual operation, a plurality of different channels usually correspond to a same beam. Therefore, the separate indication causes a waste of signaling overheads.

SUMMARY

This application provides a beam-based communication method. Implementation is effectively simplified and signaling overheads are reduced compared with those in an existing procedure.

A first aspect of this application provides a beam-based communication method, including:

A terminal device communicates with a network device by using a first beam, where the first beam is for transmitting a first channel and/or a first reference signal.

The first channel includes a plurality of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH).

The first reference signal includes a plurality of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS).

Specifically, the first beam is used for the communication between the terminal device and the network device, and the first beam may be a downlink transmit beam/receive beam, or may be an uplink transmit beam/receive beam. The first beam is for transmitting a plurality of channels and/or a plurality of reference signals. The plurality of channels or the plurality of reference signals for which the first beam is used are referred to as first channels or first reference signals. In this application, transmission may refer to sending or receiving. Specifically, the first beam is for transmitting the first channel and/or the first reference signal, and the transmission includes uplink transmission and downlink transmission. The first channel includes one or more of the following: the first physical downlink control channel (PDCCH), the first physical downlink shared channel (PDSCH), the first physical uplink control channel (PUCCH), the first physical uplink shared channel (PUSCH), the first physical broadcast channel (PBCH), or the first physical random access channel (PRACH). The first reference signal includes one or more of the following: the first synchronization signal/physical broadcast channel block (SSB), the first channel state information reference signal (CSI-RS), the first sounding reference signal (SRS), the first demodulation reference signal (DMRS), the first phase tracking reference signal (PTRS), the first cell-specific reference signal (CRS), or the first time-frequency tracking reference signal (TRS). A plurality of types of channels and a plurality of types of reference signals may be transmitted by using a same type of beam. Therefore, Implementation is effectively simplified and signaling overheads are reduced compared with those in an existing procedure.

It should be noted that the first beam may alternatively be a beam sent by the network device to the terminal device or a beam received by the network device from the terminal device; or the first beam may be a beam received by the terminal device from the network device or a beam sent by the terminal device to the network device. This is not limited herein.

With reference to the first aspect, in an optional implementation of the first aspect, the first PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In this application, the first PDCCH includes a plurality of types of PDCCHs, so that implementation flexibility of the solution is improved.

With reference to the first aspect, in an optional implementation of the first aspect, the first PDSCH includes one or more of the following, or a combination of a plurality of the following:

a PDSCH scheduled by using a PDCCH for which the first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

In this application, the first PDSCH includes a plurality of types of PDSCHs, so that implementation flexibility of the solution is improved.

With reference to the first aspect, in an optional implementation of the first aspect, the first PUCCH includes one or more of the following:

a specific-format PUCCH configured by the network device, a PUCCH carrying hybrid automatic repeat request (HARQ) feedback information, a PUCCH carrying HARQ feedback information of a PDSCH scheduled by using a PDCCH for which the first beam is used, a PUCCH overlapping, in time domain, with another channel for which the first beam is used, or a PUCCH overlapping, in time domain, with another reference signal for which the first beam is used.

In this application, the first PUCCH includes a plurality of types of PUCCHs, so that implementation flexibility of the solution is improved.

With reference to the first aspect, in an optional implementation of the first aspect, the first PUSCH includes one or more of the following:

a PUSCH scheduled by using a PDCCH for which the first beam is used, a PUSCH corresponding to a scheduling PDCCH that indicates no beam, a PUSCH corresponding to the scheduling PDCCH that indicates no sounding reference signal resource indicator (SRI), a PUSCH whose time interval with the scheduling PDCCH is less than a preset threshold, a PUSCH scheduled by using downlink control information (DCI) 0-0, a PUSCH scheduled by using downlink control information (DCI) 0-2, a PUSCH overlapping, in time domain, with another channel for which the first beam is used, or a PUSCH overlapping, in time domain, with another reference signal for which the first beam is used, where the scheduling PDCCH is a PDCCH for scheduling a PUSCH.

In this application, the first PUSCH includes a plurality of types of PUSCHs, so that implementation flexibility of the solution is improved.

With reference to the first aspect, in an optional implementation of the first aspect, the first CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In this application, the first CSI-RS includes a plurality of types of CSI-RSs, so that implementation flexibility of the solution is improved.

With reference to the first aspect, in an optional implementation of the first aspect, the first SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In this application, the first SRS includes a plurality of types of SRSs, so that implementation flexibility of the solution is improved.

With reference to the first aspect, in an optional implementation of the first aspect, before the terminal device communicates with the network device by using the first beam, the method further includes:

the terminal device receives a configuration message sent by a network device; and the terminal device determines, based on the configuration message, whether to use the first beam; or the terminal device determines, based on the configuration message, the first channel and/or the first reference signal for which the first beam is used.

In this application, the network device sends the configuration message to the terminal device, to configure whether the terminal device uses the first beam. Alternatively, the configuration message is for configuring the first channel and/or the first reference signal for which the terminal device uses the first beam. This improves implementation flexibility of the solution.

With reference to the first aspect, in an optional implementation of the first aspect, the configuration message carries one or more of the following:

a type of the first channel;

a type of the first reference signal;

information about the first PDCCH;

information about a control-resource set (CORESET) corresponding to the first PDCCH;

information about a search space corresponding to the first PDCCH;

information about the first PUCCH;

information about the first CSI-RS;

information about the first SRS;

one or more beams included in the first beam; or a first parameter, where the first parameter indicates whether to use the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

Specifically, when the first parameter (a switch) is configured as on, it indicates that a function of the first beam may be used. To be specific, the terminal device transmits the first channel and/or the first reference signal by using the first beam. When the first parameter (a switch) is configured as off, it indicates that a function of the first beam is not used. To be specific, the terminal device does not transmit the first channel and/or the first reference signal by using the first beam. When the first beam has a plurality of subcategories, whether to use a specific subcategory may be configured. For example, whether to use one or more of a first beam shared by an uplink and a downlink, a first beam on the uplink, a first beam on the downlink, a first beam on a control channel, a first beam on a data channel, a first beam that is wide, or a first beam that is narrow may be configured.

The configuration message is for configuring the first parameter for one or more types of channels/reference signals, and the first parameter indicates whether the first beam is used for the one or more types of channels/reference signals. When the first parameter indicates that the first beam is used, the one or more types of channels/reference signals are the first channel/first reference signal. For example, the first parameter is configured in a configuration of a PDCCH, a PUCCH, a PDSCH, a PUSCH, a CSI-RS resource setting, a CSI-RS resource set, a CSI-RS resource, an SRS resource set, or an SRS resource. The first parameter indicates whether the first beam is used for the PDCCH, the PUCCH, the PDSCH, the PUSCH, the CSI-RS resource setting, the CSI-RS resource set, the CSI-RS resource, the SRS resource set, or the SRS resource. Alternatively, a channel and/or a reference signal for which the first beam is used are/is directly configured. For example, a set of first channels for which the first beam is used and/or a set of first reference signals for which the first beam is used are/is configured. The set of the first channels includes one or more channels, and the set of the first reference signals includes one or more reference signals.

An example in which the first parameter is for configuring whether the first beam is used for the PDCCH is used for description, and some fields of the configuration message are as follows:

```
"PDCCHConfig{
    CommonBeamEnabler{enabled, disabled}
}".
```

When a value of CommonBeamEnabler is configured as enabled, it indicates that the first beam is used for the PDCCH. When a value of CommonBeamEnabler is configured as disabled, it indicates that the first beam is not used for the PDCCH.

For example, the channel and/or the reference signal for which the first beam is used may alternatively be configured, and some fields of the configuration message are as follows: "commonBeamEnabler{PDCCH, PDSCH, . . . }", indicating that channels for which the first beam is used include the PDCCH and the PDSCH.

In this application, the configuration message may be implemented in a plurality of manners, and the configuration message includes one or more of the foregoing, so that implementation flexibility of the solution is improved.

With reference to the first aspect, in an optional implementation of the first aspect, the configuration message is a radio resource control (RRC) message, a medium access control-control element (MAC CE) message, or downlink control information (DCI).

With reference to the first aspect, in an optional implementation of the first aspect, before the terminal device communicates with the network device by using the first beam, the method further includes:

The terminal device receives an indication message sent by the network device; and The terminal device determines, based on the indication message, the first beam to be configured, activated, or indicated.

Optionally, the indication message may be RRC signaling, MAC CE signaling, or DCI signaling. The indication message may alternatively be other signaling. This is not limited herein.

Specifically, one MAC CE can indicate only one type of first beam. For example, a dedicated MAC CE indicates the first beam on the downlink, and a dedicated MAC CE indicates the first beam on the uplink. Alternatively, one MAC CE can indicate only first beams from a same first beam set. For example, the MAC CE indicates an ID of the first beam set of the first beams and IDs of the first beams in the set. Alternatively, one MAC CE may indicate a plurality of types of first beams. For example, the MAC CE indicates both the first beam on the uplink and the first beam on the downlink. Alternatively, one MAC CE includes one bitmap, each bit corresponds to one first beam, and a bit value 1 indicates to use a corresponding first beam.

In this application, the network device may further indicate, to the terminal device by using the indication message, the type of the first reference signal for which the first beam is used and/or the type of the first channel for which the first beam is used. The terminal device determines, based on the indication message, the first beam to be configured, activated, or indicated.

With reference to the first aspect, in an optional implementation of the first aspect, that the terminal device receives an indication message sent by the network device includes:

The terminal device receives downlink control information (DCI) sent by the network device.

When a first condition is satisfied, a transmission configuration indicator (TCI) field in the DCI indicates the first beam, where the first condition includes one of the following, or a combination of a plurality of the following:

the first beam is configured for the terminal device;

the terminal device is configured with the first channel that includes the first PDSCH;

the first beam is for PDSCH transmission;

PDSCH transmission is not scheduled by using the DCI;

a frequency domain resource assignment field value in the DCI is 0; or a value of a first field carried in the DCI indicates that the TCI field indicates the first beam, and the first field indicates a function of the TCI field.

Optionally, when a second condition is not satisfied, a TCI field in the DCI indicates the first beam, where the second condition may also include but is not limited to one or more of the following:

the first beam is not configured for the terminal device;

the first channel is not configured for the terminal device;

the first beam is not used for PDSCH transmission;

PDSCH transmission is scheduled by using the DCI;

a frequency domain resource assignment field value in the DCI is not all 0s;

a one-shot hybrid automatic repeat request-acknowledg-
ment request one-shot HARQ-ACK request does not
exist or a value thereof is all 0s;
a value of a one-shot HARQ-ACK request is not all 0s; or
a value of a first field carried in the DCI indicates that the
TCI field indicates a normal beam.
In this application, the network device uses the DCI as the
indication message of the first beam, so that when the first
condition is satisfied or the second condition is not satisfied,
implementation flexibility of the solution is improved.
With reference to the first aspect, in an optional imple-
mentation of the first aspect, the DCI further carries a second
field, the second field indicates a function of the DCI, and
the function of the DCI includes one or more of the
following: indicating the first beam, scheduling a PDSCH,
or indicating the first channel.
The second field may indicate the first beam by using one
field, or may indicate the first beam in combination with a
plurality of fields. The plurality of fields include but are not
limited to one or more of the following: a frequency domain
resource assignment field, a time domain resource assign-
ment field, a modulation and coding scheme (MCS) MCS
field, a new data indicator (NDI) field, a redundancy version
(RV) field, a hybrid automatic repeat request (HARQ)
process field, a downlink assignment index field, a physical
uplink control channel (PUCCH) resource field, a hybrid
automatic repeat request (HARQ) feedback time indicator
field, an antenna port, DMRS sequence initialization, or the
like.
Indicating a common beam in combination with the
plurality of fields needs a condition, and the first condition
may be used. Alternatively, one or more of the following
conditions, or a combination of a plurality of the following
conditions may be used: The time domain resource assign-
ment field is all 0s, the time domain resource assignment
field is all 1s, the frequency domain resource assignment
field is all 0s, the frequency domain resource assignment
field is all 1s, the one-shot HARQ-ACK request field is 0, no
one-shot HARQ-ACK request field in the DCI is 0, the
HARQ process field is all 0s, the HARQ process field is all
1s, the RV field is all 0s, the RV field is all 1s, an MCS index
indicated by the MCS field is X (where X may be any one
of 0 to 63), the TCI field is all 0s, or the TCI field is all 1s.
It should be noted that different types of first beams may
be indicated by different signaling. For example, the first
beam on the uplink is indicated by DCI for scheduling
uplink transmission. The first beam on the downlink is
indicated by DCI for scheduling downlink transmission.
In an optional implementation, the network device may
further release/deactivate, by using RRC/MAC CE/DCI
signaling, the previously configured, activated, or indicated
first beam, that is, cancel the previously configured, acti-
vated, or indicated first beam.
In this application, the network device uses the DCI as the
indication message of the first beam, and may alternatively
indicate the first beam by another field in addition to the TCI
field. This improves implementation flexibility of the solu-
tion.
With reference to the first aspect, in an optional imple-
mentation of the first aspect, the method further includes:
The terminal device sends capability information to the
network device, where the capability information includes
one or both of the following:
whether the terminal device supports use of the first beam,
and a beam quantity of first beams supported by the
terminal device, where the first beam includes one or
more of the following: a first beam on an uplink, a first beam on a downlink, a first beam shared by the uplink
and the downlink, a first beam on a control channel, or
a first beam on a data channel.
The beam quantity includes one or more of the following:
a quantity of beams configured for a single transmission
reception point (TRP) corresponding to the terminal device,
a quantity of beams configured for all TRPs corresponding
to the terminal device, a quantity of beams configured for a
single cell corresponding to the terminal device, or a quan-
tity of beams configured for all cells corresponding to the
terminal device;
a quantity of beams activated for a single transmission
reception point (TRP) corresponding to the terminal
device, a quantity of beams activated for all TRPs
corresponding to the terminal device, a quantity of
beams activated for a single cell corresponding to the
terminal device, or a quantity of beams activated for all
cells corresponding to the terminal device; or
a quantity of beams indicated for a single transmission
reception point (TRP) corresponding to the terminal
device, a quantity of beams indicated for all TRPs
corresponding to the terminal device, a quantity of
beams indicated for a single cell corresponding to the
terminal device, or a quantity of beams indicated for all
cells corresponding to the terminal device.
In this application, the terminal device may send the
capability information to the network device in advance, and
the network device configures the first beam for the terminal
device based on the capability information, to ensure that the
terminal device can successfully use the first beam for
communication.
With reference to the first aspect, in an optional imple-
mentation of the first aspect, the first beam is for transmitting
one or more channels, one or more reference signals, and/or
one or more messages. The channel, the reference signal,
and the message include but are not limited to: a PDCCH,
a PDSCH, a PUCCH, a PUSCH, a PRACH, a random access
message 2, a random access message 3, a random access
message 4, an SSB, a CSI-RS, a DMRS, a PTRS, a TRS, an
SRS, or the like.
With reference to the first aspect, in an optional imple-
mentation of the first aspect, the first beam includes but is
not limited to: a first beam shared by an uplink and a
downlink, a first beam on the uplink, a first beam on the
downlink, a first beam on a control channel, a first beam on
a data channel, a first beam that is wide, or a first beam that
is narrow. Specifically, classification is performed based on
a usage scenario, and one or more of the following subcat-
egories may be distinguished.
The first beam shared by the uplink and the downlink are
for transmission of one or more channels on the uplink and
the downlink, such as a PDCCH, a PDSCH, a PUCCH, and
a PUSCH.
The first beam on the uplink is for transmission of a
plurality of (or a plurality of types of) channels on the
uplink, for example, a PUCCH and a PUSCH.
The first beam on the downlink is for transmission of a
plurality of (or a plurality of types of) channels on the
downlink, for example, a PDCCH and a PDSCH.
The first beam on the control channel is for transmission
of a plurality of (or a plurality of types of) control channels,
and the control channels include a PDCCH, a PUCCH, and
the like.
The first beam on the data channel is for transmission of
a plurality of (or a plurality of types of) data channels, and
the data channels include a PDSCH, a PUSCH, and the like.

The first beam that is wide: First beams are classified into two types based on a beam coverage angle. A beam with a larger coverage angle is referred to as the first beam that is wide.

The first beam that is narrow: The first beams are classified into the two types based on the beam coverage angle. A beam with a smaller coverage angle is referred to as the first beam that is narrow.

The first beam in this application may be any one of the foregoing, or may be another type of first beam. This is not limited herein.

With reference to the first aspect, in an optional implementation of the first aspect, the first beam includes one or more beams, and the network device configures, activates, or indicates one first beam for the terminal device. For example, the first beam is the first beam shared by the uplink and the downlink. The network device may configure, activate, or indicate a plurality of first beams for the terminal device. The plurality of first beams are first beams of different types, for example, the first beam on the uplink and the first beam on the downlink, or the first beam on the control channel and the first beam on the data channel. Alternatively, the plurality of first beams may be first beams of a same type. That is, the plurality of first beams of the same type may be configured, activated, or indicated for the terminal device.

With reference to the first aspect, in an optional implementation of the first aspect, the first beam includes one or more of the following information: an identifier (ID) of the first beam, a logical cell ID, a physical cell ID, a BWP (bandwidth part) ID, a reference signal resource for determining an uplink beam, a reference signal resource for determining a downlink beam, a reference signal resource for determining an uplink-downlink beam, a quasi-colocation (QCL) type, and an uplink power control related parameter, where the uplink power control related parameter includes: a path loss measurement reference signal resource, p0, a closed loop index, or the like.

With reference to the first aspect, in an optional implementation of the first aspect, the first beam is a cell-level first beam, a cross-cell first beam, a BWP-level first beam, or a control-resource set (CORESET)-level first beam. Specifically, the cell-level first beam is one (or more) first beam for transmission of a plurality of channels (or reference signals or messages) in one cell. The cross-cell first beam is one (or more) first beam for transmission of a plurality of channels (or reference signals or messages) in a plurality of cells. The plurality of cells may be a plurality of cells within one band, or may be a plurality of cells across bands. The BWP-level first beam is a first beam that may be for transmission of a plurality of channels (or reference signals or messages) in one BWP. The CORESET-level first beam is a same (or more) first beam used for all PDCCHs corresponding to a CORESET, all PDSCHs scheduled by using a PDCCH of the CORESET, all PUSCHs scheduled by using the PDCCH of the CORESET, and/or a PUCCH/PUSCH for transmission of an acknowledgment (ACK) or a negative acknowledgment (NACK) of a PDSCH scheduled by using the PDCCH of the CORESET.

With reference to the first aspect, in an optional implementation of the first aspect, a priority of the first beam is higher than a priority of a normal beam; a priority of the first beam is equal to a priority of a normal beam; or a priority of the first beam is lower than a priority of a normal beam, where the normal beam is a beam indicated by a TCI-state or a spatial relation.

Specifically, the priority of the first beam is higher than the priority of the normal beam: If the network device configures, activates, or indicates the first beam, the first beam is applied to transmission of the first channel and the first reference signal. If the normal beam (the TCI-state or the spatial relation) is configured, activated, or indicated for the first channel and the first reference signal previously, the first beam covers the normal beam (the TCI-state or the spatial relation). The terminal device transmits the first channel and/or the first reference signal by using the normal beam.

The priority of the first beam is equal to the priority of the normal beam: The first beam and the normal beam may cover each other. That is, a beam (the first beam or the normal beam) that is configured, activated, or indicated later covers a beam (the first beam or the normal beam) that is configured, activated, or indicated earlier. For example, the normal beam is previously indicated for a channel, then the network device indicates the first beam for the channel, and the terminal device replaces the previous normal beam with the first beam. Alternatively, the first beam is previously indicated for a channel, then the network device indicates the normal beam for the channel, and the terminal device replaces the previous first beam with the normal beam.

For example, first, the network device indicates the first beam by using RRC, a MAC CE, or DCI. Then, when DCI for scheduling a PDSCH further indicates a normal beam (the TCI-state), the terminal device uses the TCI-state indicated by the DCI. When DCI does not indicate a normal beam, the first beam is used. Specifically, that the DCI does not indicate a normal beam includes that the DCI does not include a TCI field or that a TCI field value in the DCI is associated with no beam.

The priority of the first beam is lower than the priority of the normal beam: The normal beam may cover the first beam, but the first beam cannot cover the normal beam. Alternatively, the first beam can be applied only to a channel or a reference signal for which no normal beam is configured. For example, the network device indicates, to the terminal device, the first beam for transmitting a PDSCH. When the DCI does not indicate a normal beam of the PDSCH, the terminal device uses the first beam. When the DCI indicates a normal beam, the terminal device uses the indicated normal beam.

The normal beam is a beam for transmission of a single channel or reference signal in R15 and R16 protocols.

It should be noted that the first beam covers the normal beam, or the normal beam covers the first beam, and may cover only QCL information of typeD. In addition, the first beam may also be represented by using a TCI-state or a spatial relation. For example, the first beam on the downlink is represented by using the TCI-state. The first beam on the uplink is represented by using the spatial relation. Alternatively, the first beam may be represented by using another parameter indicating an uplink or downlink transmission beam.

With reference to the first aspect, in an optional implementation of the first aspect, the terminal device determines, based on a type of a reference signal resource included in the first beam, whether the first beam is for transmitting a PUSCH, where the type of the reference signal resource indicates whether the first beam is for transmitting the PUSCH.

For example, if a reference signal resource that is included in the first beam and that indicates a beam is an uplink resource, for example, an SRS, the first beam is for transmitting the PUSCH. That is, the first beam may be used for the PUSCH. If a reference signal resource that is included in the first beam and that indicates a beam is a downlink resource, for example, a CSI-RS/an SSB, the first beam is not for transmitting the PUSCH. That is, the first beam is not used for the PUSCH.

If the reference signal resource that is included in the first beam and that indicates the beam is the uplink resource (for example, the SRS), and DCI for scheduling the PUSCH does not indicate the SRS, information such as a beam and/or a precoding matrix for uplink transmission is determined, for PUSCH transmission, with reference to the SRS resource in the first beam.

If the reference signal resource that is included in the first beam and that indicates the beam is the downlink resource (for example, the CSI-RS/the SSB), and DCI for scheduling the PUSCH indicates an SRS, information such as a beam and/or a precoding matrix for uplink transmission is determined, for PUSCH transmission, with reference to the SRS resource indicated by the DCI.

If the reference signal resource that is included in the first beam and that indicates the beam is the SRS, and DCI for scheduling the PUSCH indicates the SRS, information such as a beam and/or a precoding matrix for uplink transmission is determined, for PUSCH transmission, with reference to the SRS resource indicated by the DCI. That is, the SRS resource indicated in the DCI has a higher priority.

If the reference signal resource that is included in the first beam and that indicates the beam is the SRS, and DCI for scheduling the PUSCH indicates the SRS, information such as a beam and/or a precoding matrix for uplink transmission is determined, for PUSCH transmission, with reference to that the reference signal resource that is included in the first beam and that indicates the beam is the SRS. That is, the reference signal resource that is included in the first beam and that indicates the beam is the SRS resource, and has a higher priority.

With reference to the first aspect, in an optional implementation of the first aspect, the terminal device receives an indication message sent by the network device, where the indication message dynamically indicates the first channel and/or the first reference signal for which the first beam is used. The indication message is MAC CE signaling or DCI signaling.

With reference to the first aspect, in an optional implementation of the first aspect, during communication between the terminal device and the network device, the terminal device does not transmit a second channel and/or a second reference signal by using the first beam, where the second channel includes but is not limited to one or more of the following: a second PDCCH, a second PDSCH, a second PUCCH, or a second PUSCH. The second reference signal includes but is not limited to one or more of the following: a second CSI-RS, a second SRS, or a second SSB.

In this application, the terminal device may alternatively not use the first beam to transmit one or more channels and/or one or more reference signals. This improves implementation flexibility of the solution.

With reference to the first aspect, in an optional implementation of the first aspect, the second PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which no first beam is used, a PDCCH overlapping, in time domain, with another reference signal for which no first beam is used, a PDCCH corresponding to a specific-format search space configured by the network device, or a PDCCH corresponding to a specific-format CORESET configured by the network device.

Specifically, the second PDCCH includes all types of PDCCHs, or includes only a part of PDCCHs, and specifically includes but is not limited to one or more of the following, or a combination of a plurality of the following: a PDCCH carrying a downlink control information (DCI) format 0-0/0-1/0-2/1-0/1-1/1-2/2-1/2-2/2-3/2-4/2-5/3-1/3-2, a PDCCH corresponding to a UE-specific search space, a PDCCH corresponding to a common search space, a PDCCH corresponding to a search space 0/CORESET 0, a PDCCH corresponding to searchSpaceSIB1/searchSpaceOtherSystemInformation/ra-SearchSpace, a PDCCH that overlaps with a specific channel or signal in time domain (where the first beam is not used for the specific channel or signal), a PDCCH corresponding to a specific CORESET, or a PDCCH corresponding to a specific search space. The specific CORESET may be one CORESET/one group of CORESETs configured, activated, or indicated by the network device. The specific search space may be one search space/one group of search spaces configured, activated, or indicated by the network device.

Alternatively, the second PDCCH may be a combination of a plurality of the foregoing. For example, a combination of the PDCCH carrying the DCI format 0-0 and the PDCCH corresponding to the UE-specific search space is a PDCCH carrying the DCI format 0-0 and corresponding to the UE-specific search space.

The foregoing PDCCH may alternatively be replaced with a DMRS (demodulation reference signal) of the PDCCH.

The configuration message sent by the network device to the terminal device carries information about the second PDCCH, and the information about the second PDCCH includes but is not limited to a parameter of the second PDCCH or an identifier of the second PDCCH.

With reference to the first aspect, in an optional implementation of the first aspect, the second PDSCH includes one or more of the following, or a combination of a plurality of the following:

a PDSCH scheduled by using a PDCCH for which no first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which no first beam is used, a PDSCH overlapping, in time domain, with another reference signal for which no first beam is used, or a specific-format PDSCH configured by the network device, where the scheduling PDCCH is a PDCCH for scheduling a PDSCH.

Specifically, the TCI field has three bits, and there are eight field values in total. Each of the eight field values may correspond to one beam. Specifically, the eight beams respectively corresponding to the eight field values are indicated by MAC CE signaling. The MAC CE signaling may indicate a maximum of eight beams. If a quantity of indicated beams is less than 8, some TCI field values do not have corresponding beams. In other words, the TCI field values are associated with no beam herein.

Specifically, the second PDSCH includes all types of PDSCHs, or includes only a part of PDSCHs, and specifically includes but is not limited to one or more of the following, or a combination of a plurality of the following: the PDSCH scheduled by using the PDCCH for which no first beam is used, the PDSCH scheduled by using the DCI format 1-0, a PDSCH scheduled by using DCI format 1-1, the PDSCH scheduled by using the DCI format 1-2, a PDSCH for which a beam is indicated (for example, a PDSCH scheduled by using DCI carrying the TCI field value), a PDSCH for which no beam is indicated (for example, the PDSCH scheduled by using the DCI format 1-0 or a PDSCH scheduled by using DCI having no TCI field), a PDSCH whose time interval with the scheduling PDCCH is less than a threshold (for example, TimeDuration-ForQCL), or a PDSCH that overlaps with a specific channel or signal in time domain (where no first beam is used for the specific channel or signal).

The second PDSCH may alternatively be a combination of a plurality of the foregoing. For example, a combination of the PDSCH scheduled by using the DCI format 1-1 and the PDSCH for which no beam is indicated is a PDSCH scheduled by using the DCI format 1-1 and for which no beam is indicated.

The foregoing PDSCH may alternatively be replaced with a DMRS of the PDSCH or a phase tracking reference signal (PTRS) of the PDSCH.

The configuration message sent by the network device to the terminal device carries information about the second PDSCH, and the information about the second PDSCH includes but is not limited to a parameter of the second PDSCH or an identifier of the second PDSCH.

With reference to the first aspect, in an optional implementation of the first aspect, the second CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

Specifically, the second CSI-RS includes all types of CSI-RSs, or includes only a part of CSI-RSs, and specifically includes but is not limited to one or more of the following, or a combination of a plurality of the following: a CSI-RS in a resource set for which a repetition parameter is configured, the CSI-RS in the resource set whose repetition parameter is configured as on, a CSI-RS in a resource set whose repetition parameter is configured as off, a CSI-RS in a resource set for which a trs-info parameter is configured, the CSI-RS in the resource set for which no repetition parameter and no trs-info parameter are configured, a CSI-RS for mobility (a CSI-RS for layer 3 mobility measurement), the CSI-RS for which no beam information is configured, a CSI-RS for which beam information is configured, a periodic CSI-RS, a semi-persistent (SP) CSI-RS, an aperiodic CSI-RS, a CSI-RS for reference signal received power (RSRP) or signal to interference plus noise ratio (SINR) measurement, or a CSI-RS for channel state information (SI), channel quality identifier (CQI), precoding matrix indicator (PMI), or channel rank identifier (RI) measurement.

The second CSI-RS may alternatively be a combination of a plurality of the foregoing. For example, a combination of the CSI-RS in the resource set for which the repetition parameter is configured and the periodic CSI-RS is a periodic CSI-RS for which the repetition parameter is configured.

The configuration message sent by the network device to the terminal device carries information about the second CSI-RS, and the information about the second CSI-RS includes but is not limited to a parameter of the second CSI-RS or an identifier of the second CSI-RS.

With reference to the first aspect, in an optional implementation of the first aspect, the second SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

Specifically, the second SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message sent by the network device to the terminal device carries information about the second SRS, and the information about the second SRS includes but is not limited to a parameter of the second SRS or an identifier of the second SRS.

With reference to the first aspect, in an optional implementation of the first aspect, the second PUCCH includes all types of PUCCHs, or includes only a part of PUCCHs, and specifically includes but is not limited to one or more of the following, or a combination of a plurality of the following: a PUCCH format 0, a PUCCH format 1, a PUCCH format 2, a PUCCH format 3, a PUCCH format 4, a PUCCH carrying a HARQ ACK/NACK, a PUCCH carrying an SR (scheduling request), a PUCCH carrying a CSI (channel state information) measurement result, a PUCCH carrying ACK/NACK information and a scheduling request (SR), a PUCCH carrying ACK/NACK information and a CSI measurement result, a PUCCH carrying ACK/NACK information+an SR+a CSI measurement result, a long PUCCH, a short PUCCH, a PUCCH carrying ACK/NACK information of a PDSCH that is not sent by using the first beam, a PUCCH carrying ACK/NACK information of a PDSCH scheduled by using a PDCCH that is not sent by using the first beam, a PUCCH that overlaps with a specific channel or signal in time domain (where no first beam is used for the specific channel or signal), a PUCCH for which no beam is configured, activated, or indicated, or a PUCCH for which no path loss measurement resource is configured, activated, or indicated.

Alternatively, the second PUCCH may be a combination of a plurality of the foregoing. For example, a combination of the PUCCH format 0 and the PUCCH carrying the hybrid automatic repeat request (HARQ) ACK/NACK is a PUCCH format 0 carrying the HARQ ACK/NACK.

The foregoing PUCCH may alternatively be replaced with a DMRS of the PUCCH.

The configuration message sent by the network device to the terminal device carries information about the second PUCCH, and the information about the second PUCCH includes but is not limited to a parameter of the second PUCCH or an identifier of the second PUCCH.

With reference to the first aspect, in an optional implementation of the first aspect, the second PUSCH includes all types of PUSCHs, or includes only a part of PUSCHs, and specifically includes but is not limited to one or more of the following, or a combination of a plurality of the following: a PUSCH scheduled by using a PDCCH for which no first beam is used, a PUSCH scheduled by using DCI 0-0, a PUSCH scheduled by using DCI 0-1, a PUSCH scheduled by using DCI 0-2, a PUSCH in codebook mode, a PUSCH in nonCodebook mode, a PUCCH scheduled by using DCI including no uplink beam indication field/SRI field, a PUCCH for which no beam is configured, activated, or indicated, a PUCCH for which no path loss measurement resource is configured, activated, or indicated, or a PUSCH that overlaps with a specific channel or signal in time domain (where no first beam is used for the specific channel or signal).

The second PUSCH may alternatively be a combination of a plurality of the foregoing. For example, a combination of the PUSCH in codebook mode and the PUSCH scheduled by using the DCI 0-0 is a PUSCH that is in codebook mode and that is scheduled by using the DCI 0-0.

The foregoing PUSCH may alternatively be replaced with a DMRS/PTRS of the PUSCH.

The configuration message sent by the network device to the terminal device carries information about the second PUSCH, and the information about the second PUSCH includes but is not limited to a parameter of the second PUSCH or an identifier of the second PUSCH.

With reference to the first aspect, in an optional implementation of the first aspect, the second SRS includes but is not limited to an SRS whose type or usage is beam management.

The second SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message sent by the network device to the terminal device carries information about the second SRS, and the information about the second SRS includes but is not limited to a parameter of the second SRS or an identifier of the second SRS.

The second SSB includes all types of SSBs, or includes only a part of SSBs, and specifically includes but is not limited to one or more of the following, or a combination of a plurality of the following: an SSB for mobility (a CSI-RS for layer 3 mobility measurement), an SSB for RSRP/SINR measurement, an SSB for CQI/PMI measurement, an SSB for which no QCL information is configured, a periodic SSB, or an aperiodic SSB.

The configuration message sent by the network device to the terminal device carries information about the second SSB, and the information about the second SSB includes but is not limited to a parameter of the second SSB or an identifier of the second SSB.

According to a second aspect, this application provides a beam-based communication method, applied to a network device and including:

The network device communicates with a terminal device by using a first beam, where the first beam is for transmitting a first channel and/or a first reference signal.

The first channel includes a plurality of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH).

The first reference signal includes a plurality of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS).

Specifically, the first beam is used for the communication between the terminal device and the network device, and the first beam may be a downlink transmit beam/receive beam, or may be an uplink transmit beam/receive beam. The first beam is for transmitting a plurality of channels and/or a plurality of reference signals. The plurality of channels or the plurality of reference signals for which the first beam is used are referred to as first channels or first reference signals. In this application, transmission may refer to sending or receiving. Specifically, the first beam is for transmitting the first channel and/or the first reference signal, and the transmission includes uplink transmission and downlink transmission. The first channel includes one or more of the following: the first physical downlink control channel (PDCCH), the first physical downlink shared channel (PDSCH), the first physical uplink control channel (PUCCH), the first physical uplink shared channel (PUSCH), the first physical broadcast channel (PBCH), or the first physical random access channel (PRACH). The first reference signal includes one or more of the following: the first synchronization signal/physical broadcast channel block (SSB), the first channel state information reference signal (CSI-RS), the first sounding reference signal (SRS), the first demodulation reference signal (DMRS), the first phase tracking reference signal (PTRS), the first cell-specific reference signal (CRS), or the first time-frequency tracking reference signal (TRS). A plurality of types of channels and a plurality of types of reference signals may be transmitted by using a same type of beam. Therefore, Implementation is effectively simplified and signaling overheads are reduced compared with those in an existing procedure.

With reference to the second aspect, in an optional implementation of the second aspect, the first PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In this application, the first PDCCH includes a plurality of types of PDCCHs, so that implementation flexibility of the solution is improved.

With reference to the second aspect, in an optional implementation of the second aspect, the first PDSCH includes one or more of the following, or a combination of a plurality of the following:

a PDSCH scheduled by using a PDCCH for which the first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

In this application, the first PDSCH includes a plurality of types of PDSCHs, so that implementation flexibility of the solution is improved.

With reference to the second aspect, in an optional implementation of the second aspect, the first PUCCH includes one or more of the following:

a specific-format PUCCH configured by the network device, a PUCCH carrying hybrid automatic repeat request (HARQ) feedback information, a PUCCH carrying HARQ feedback information of a PDSCH scheduled by using a PDCCH for which the first beam is used, a PUCCH overlapping, in time domain, with another channel for which the first beam is used, or a PUCCH overlapping, in time domain, with another reference signal for which the first beam is used.

In this application, the first PUCCH includes a plurality of types of PUCCHs, so that implementation flexibility of the solution is improved.

With reference to the second aspect, in an optional implementation of the second aspect, the first PUSCH includes one or more of the following:

a PUSCH scheduled by using a PDCCH for which the first beam is used, a PUSCH corresponding to a scheduling PDCCH that indicates no beam, a PUSCH corresponding to the scheduling PDCCH that indicates no sounding reference signal resource indicator (SRI), a PUSCH whose time interval with the scheduling PDCCH is less than a preset threshold, a PUSCH scheduled by using downlink control information (DCI) 0-0, a PUSCH scheduled by using downlink control information (DCI) 0-2, a PUSCH overlapping, in time domain, with another channel for which the first beam is used, or a PUSCH overlapping, in time domain, with another reference signal for which the first beam is used, where the scheduling PDCCH is a PDCCH for scheduling a PUSCH.

In this application, the first PUSCH includes a plurality of types of PUSCHs, so that implementation flexibility of the solution is improved.

With reference to the second aspect, in an optional implementation of the second aspect, the first CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In this application, the first CSI-RS includes a plurality of types of CSI-RSs, so that implementation flexibility of the solution is improved.

With reference to the second aspect, in an optional implementation of the second aspect, the first SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In this application, the first SRS includes a plurality of types of SRSs, so that implementation flexibility of the solution is improved.

With reference to the second aspect, in an optional implementation of the second aspect, before the network device communicates with the terminal device by using the first beam, the method further includes:

The network device sends a configuration message to the terminal device, where the configuration message is for configuring whether the terminal device uses the first beam, or configuring the first channel and/or the first reference signal for which the terminal device uses the first beam.

In this application, the network device sends the configuration message to the terminal device, to configure whether the terminal device uses the first beam. Alternatively, the configuration message is for configuring the first channel and/or the first reference signal for which the terminal device uses the first beam. This improves implementation flexibility of the solution.

With reference to the second aspect, in an optional implementation of the second aspect, the configuration message carries one or more of the following:

a type of the first channel;

a type of the first reference signal;

information about the first PDCCH;

information about a control-resource set (CORESET) corresponding to the first PDCCH;

information about a search space corresponding to the first PDCCH;

information about the first PUCCH;

information about the first CSI-RS;

information about the first SRS;

one or more beams included in the first beam; or a first parameter, where the first parameter indicates whether to use the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

Specifically, when the first parameter (a switch) is configured as on, it indicates that a function of the first beam may be used. To be specific, the terminal device transmits the first channel and/or the first reference signal by using the first beam. When the first parameter (a switch) is configured as off, it indicates that a function of the first beam is not used. To be specific, the terminal device does not transmit the first channel and/or the first reference signal by using the first beam. When the first beam has a plurality of subcategories, whether to use a specific subcategory may be configured. For example, whether to use one or more of a first beam shared by an uplink and a downlink, a first beam on the uplink, a first beam on the downlink, a first beam on a control channel, a first beam on a data channel, a first beam that is wide, or a first beam that is narrow may be configured.

The configuration message is for configuring the first parameter for one or more types of channels/reference signals, and the first parameter indicates whether the first beam is used for the one or more types of channels/reference signals. When the first parameter indicates that the first beam is used, the one or more types of channels/reference signals are the first channel/first reference signal. For example, the first parameter is configured in a configuration of a PDCCH, a PUCCH, a PDSCH, a PUSCH, a CSI-RS resource setting, a CSI-RS resource set, a CSI-RS resource, an SRS resource set, or an SRS resource. The first parameter indicates whether the first beam is used for the PDCCH, the PUCCH, the PDSCH, the PUSCH, the CSI-RS resource setting, the CSI-RS resource set, the CSI-RS resource, the SRS resource set, or the SRS resource. Alternatively, a channel and/or a reference signal for which the first beam is used are/is directly configured. For example, a set of first channels for which the first beam is used and/or a set of first reference signals for which the first beam is used are/is configured. The set of the first channels includes one or more channels, and the set of the first reference signals includes one or more reference signals.

An example in which the first parameter is for configuring whether the first beam is used for the PDCCH is used for description, and some fields of the configuration message are as follows:

```
"PDCCHConfig{
    CommonBeamEnabler{enabled, disabled}
}".
```

When a value of CommonBeamEnabler is configured as enabled, it indicates that the first beam is used for the PDCCH. When a value of CommonBeamEnabler is configured as disabled, it indicates that the first beam is not used for the PDCCH.

For example, the channel and/or the reference signal for which the first beam is used may alternatively be configured, and some fields of the configuration message are as follows: "commonBeamEnabler{PDCCH, PDSCH, . . . }", indicating that channels for which the first beam is used include the PDCCH and the PDSCH.

In this application, the configuration message may be implemented in a plurality of manners, and the configuration message includes one or more of the foregoing, so that implementation flexibility of the solution is improved.

With reference to the second aspect, in an optional implementation of the second aspect, the configuration message is a radio resource control (RRC) message, a medium access control-control element (MAC CE) message, or downlink control information (DCI).

With reference to the second aspect, in an optional implementation of the second aspect, before the terminal device communicates with the network device by using the first beam, the method further includes:

The terminal device receives an indication message sent by the network device; and The terminal device determines, based on the indication message, the first beam to be configured, activated, or indicated.

Optionally, the indication message may be RRC signaling, MAC CE signaling, or DCI signaling. The indication message may alternatively be other signaling. This is not limited herein.

Specifically, one MAC CE can indicate only one type of first beam. For example, a dedicated MAC CE indicates the first beam on the downlink, and a dedicated MAC CE indicates the first beam on the uplink. Alternatively, one MAC CE can indicate only first beams from a same first beam set. For example, the MAC CE indicates an ID of the first beam set of the first beams and IDs of the first beams in the set. Alternatively, one MAC CE may indicate a plurality of types of first beams. For example, the MAC CE indicates both the first beam on the uplink and the first beam on the downlink. Alternatively, one MAC CE includes one bitmap, each bit corresponds to one first beam, and a bit value 1 indicates to use a corresponding first beam.

In this application, the network device may further indicate, to the terminal device by using the indication message, the type of the first reference signal for which the first beam is used and/or the type of the first channel for which the first beam is used. The terminal device determines, based on the indication message, the first beam to be configured, activated, or indicated.

With reference to the second aspect, in an optional implementation of the second aspect, that the network device sends the indication message to the terminal device includes:

The network device sends downlink control information (DCI) to the terminal device.

When a first condition is satisfied, a transmission configuration indicator (TCI) field in the DCI indicates the first beam, where the first condition includes one of the following, or a combination of a plurality of the following:

the first beam is configured for the terminal device;

the terminal device is configured with the first channel that includes the first PDSCH;

the first beam is for PDSCH transmission;

PDSCH transmission is not scheduled by using the DCI;

a frequency domain resource assignment field value in the DCI is 0; or a value of a first field carried in the DCI indicates that the TCI field indicates the first beam, and the first field indicates a function of the TCI field.

Optionally, when a second condition is not satisfied, a TCI field in the DCI indicates the first beam, where the second condition may also include but is not limited to one or more of the following:

the first beam is not configured for the terminal device;

the first channel is not configured for the terminal device;

the first beam is not used for PDSCH transmission;

PDSCH transmission is scheduled by using the DCI;

a frequency domain resource assignment field value in the DCI is not all 0s;

a one-shot hybrid automatic repeat request-acknowledgment request one-shot HARQ-ACK request does not exist or a value thereof is all 0s;

a value of a one-shot HARQ-ACK request is not all 0s; or a value of a first field carried in the DCI indicates that the TCI field indicates a normal beam.

In this application, the network device uses the DCI as the indication message of the first beam, so that when the first condition is satisfied or the second condition is not satisfied, implementation flexibility of the solution is improved.

With reference to the second aspect, in an optional implementation of the second aspect, the DCI further carries a second field, the second field indicates a function of the DCI, and the function of the DCI includes one or more of the following: indicating the first beam, scheduling a PDSCH, or indicating the first channel.

The second field may indicate the first beam by using one field, or may indicate the first beam in combination with a plurality of fields. The plurality of fields include but are not limited to one or more of the following: a frequency domain resource assignment field, a time domain resource assignment field, a modulation and coding scheme (MCS) MCS field, a new data indicator (NDI) field, a redundancy version (RV) field, a hybrid automatic repeat request (HARQ) process field, a downlink assignment index field, a physical uplink control channel (PUCCH) resource field, a hybrid automatic repeat request (HARQ) feedback time indicator field, an antenna port, DMRS sequence initialization, or the like.

Indicating a common beam in combination with the plurality of fields needs a condition, and the first condition may be used. Alternatively, one or more of the following conditions, or a combination of a plurality of the following conditions may be used: The time domain resource assignment field is all 0s, the time domain resource assignment field is all 1s, the frequency domain resource assignment field is all 0s, the frequency domain resource assignment field is all 1s, the one-shot HARQ-ACK request field is 0, no one-shot HARQ-ACK request field in the DCI is 0, the HARQ process field is all 0s, the HARQ process field is all 1s, the RV field is all 0s, the RV field is all 1s, an MCS index indicated by the MCS field is X (where X may be any one of 0 to 63), the TCI field is all 0s, or the TCI field is all 1s.

It should be noted that different types of first beams may be indicated by different signaling. For example, the first beam on the uplink is indicated by DCI for scheduling uplink transmission. The first beam on the downlink is indicated by DCI for scheduling downlink transmission.

In an optional implementation, the network device may further release/deactivate, by using RRC/MAC CE/DCI signaling, the previously configured, activated, or indicated first beam, that is, cancel the previously configured, activated, or indicated first beam.

In this application, the network device uses the DCI as the indication message of the first beam, and may alternatively indicate the first beam by another field in addition to the TCI field. This improves implementation flexibility of the solution.

With reference to the second aspect, in an optional implementation of the second aspect, the method further includes:

The network device receives capability information sent by the terminal device, where the capability information includes one or both of the following:

whether the terminal device supports use of the first beam, and a beam quantity of first beams supported by the terminal device, where the first beam includes one or more of the following: a first beam on an uplink, a first beam on a downlink, a first beam shared by the uplink and the downlink, a first beam on a control channel, or a first beam on a data channel.

The beam quantity includes one or more of the following: a quantity of beams configured for a single transmission reception point (TRP) corresponding to the terminal device, a quantity of beams configured for all TRPs corresponding to the terminal device, a quantity of beams configured for a single cell corresponding to the terminal device, or a quantity of beams configured for all cells corresponding to the terminal device;

a quantity of beams activated for a single transmission reception point (TRP) corresponding to the terminal device, a quantity of beams activated for all TRPs corresponding to the terminal device, a quantity of beams activated for a single cell corresponding to the terminal device, or a quantity of beams activated for all cells corresponding to the terminal device; or a quantity of beams indicated for a single transmission reception point (TRP) corresponding to the terminal device, a quantity of beams indicated for all TRPs corresponding to the terminal device, a quantity of beams indicated for a single cell corresponding to the terminal device, or a quantity of beams indicated for all cells corresponding to the terminal device.

In this application, the terminal device may send the capability information to the network device in advance, and the network device configures the first beam for the terminal device based on the capability information, to ensure that the terminal device can successfully use the first beam for communication.

With reference to the second aspect, in an optional implementation of the second aspect, the first beam is for transmitting one or more channels, one or more reference signals, and/or one or more messages. The channel, the reference signal, and the message include but are not limited to: a PDCCH, a PDSCH, a PUCCH, a PUSCH, a PRACH, a random access message 2, a random access message 3, a random access message 4, an SSB, a CSI-RS, a DMRS, a PTRS, a TRS, an SRS, or the like.

With reference to the second aspect, in an optional implementation of the second aspect, the first beam includes but is not limited to: a first beam shared by an uplink and a downlink, a first beam on the uplink, a first beam on the downlink, a first beam on a control channel, a first beam on a data channel, a first beam that is wide, or a first beam that is narrow. Specifically, classification is performed based on a usage scenario, and one or more of the following subcategories may be distinguished.

The first beam shared by the uplink and the downlink are for transmission of one or more channels on the uplink and the downlink, such as a PDCCH, a PDSCH, a PUCCH, and a PUSCH.

The first beam on the uplink is for transmission of a plurality of (or a plurality of types of) channels on the uplink, for example, a PUCCH and a PUSCH.

The first beam on the downlink is for transmission of a plurality of (or a plurality of types of) channels on the downlink, for example, a PDCCH and a PDSCH.

The first beam on the control channel is for transmission of a plurality of (or a plurality of types of) control channels, and the control channels include a PDCCH, a PUCCH, and the like.

The first beam on the data channel is for transmission of a plurality of (or a plurality of types of) data channels, and the data channels include a PDSCH, a PUSCH, and the like.

The first beam that is wide: First beams are classified into two types based on a beam coverage angle. A beam with a larger coverage angle is referred to as the first beam that is wide.

The first beam that is narrow: The first beams are classified into the two types based on the beam coverage angle. A beam with a smaller coverage angle is referred to as the first beam that is narrow.

The first beam in this application may be any one of the foregoing, or may be another type of first beam. This is not limited herein.

With reference to the second aspect, in an optional implementation of the second aspect, the first beam includes one or more beams, and the network device configures, activates, or indicates one first beam for the terminal device. For example, the first beam is the first beam shared by the uplink and the downlink. The network device may configure, activate, or indicate a plurality of first beams for the terminal device. The plurality of first beams are first beams of different types, for example, the first beam on the uplink and the first beam on the downlink, or the first beam on the control channel and the first beam on the data channel. Alternatively, the plurality of first beams may be first beams of a same type. That is, the plurality of first beams of the same type may be configured, activated, or indicated for the terminal device.

With reference to the second aspect, in an optional implementation of the second aspect, the first beam includes one or more of the following information: an identifier (ID) of the first beam, a logical cell ID, a physical cell ID, a BWP (bandwidth part) ID, a reference signal resource for determining an uplink beam, a reference signal resource for determining a downlink beam, a reference signal resource for determining an uplink-downlink beam, a quasi-colocation (QCL) type, and an uplink power control related parameter, where the uplink power control related parameter includes: a path loss measurement reference signal resource, p0, a closed loop index, or the like.

With reference to the second aspect, in an optional implementation of the second aspect, the first beam is a cell-level first beam, a cross-cell first beam, a BWP-level first beam, or a control-resource set (CORESET)-level first beam. Specifically, the cell-level first beam is one (or more) first beam for transmission of a plurality of channels (or reference signals or messages) in one cell. The cross-cell first beam is one (or more) first beam for transmission of a plurality of channels (or reference signals or messages) in a plurality of cells. The plurality of cells may be a plurality of cells within one band, or may be a plurality of cells across bands. The BWP-level first beam is a first beam that may be for transmission of a plurality of channels (or reference signals or messages) in one BWP. The CORESET-level first beam is a same (or more) first beam used for all PDCCHs corresponding to a CORESET, all PDSCHs scheduled by using a PDCCH of the CORESET, all PUSCHs scheduled by using the PDCCH of the CORESET, and/or a PUCCH/PUSCH for transmission of an acknowledgment (ACK) or a negative acknowledgment (NACK) of a PDSCH scheduled by using the PDCCH of the CORESET.

With reference to the second aspect, in an optional implementation of the second aspect, a priority of the first beam is higher than a priority of a normal beam; a priority of the first beam is equal to a priority of a normal beam; or a priority of the first beam is lower than a priority of a normal beam, where the normal beam is a beam indicated by a TCI-state or a spatial relation.

Specifically, the priority of the first beam is higher than the priority of the normal beam: If the network device configures, activates, or indicates the first beam, the first beam is applied to transmission of the first channel and the first reference signal. If the normal beam (the TCI-state or the spatial relation) is configured, activated, or indicated for the first channel and the first reference signal previously, the first beam covers the normal beam (the TCI-state or the spatial relation). The terminal device transmits the first channel and/or the first reference signal by using the normal beam.

The priority of the first beam is equal to the priority of the normal beam: The first beam and the normal beam may cover each other. That is, a beam (the first beam or the normal beam) that is configured, activated, or indicated later covers a beam (the first beam or the normal beam) that is configured, activated, or indicated earlier. For example, the normal beam is previously indicated for a channel, then the network device indicates the first beam for the channel, and the terminal device replaces the previous normal beam with the first beam. Alternatively, the first beam is previously indicated for a channel, then the network device indicates the normal beam for the channel, and the terminal device replaces the previous first beam with the normal beam.

For example, first, the network device indicates the first beam by using RRC, a MAC CE, or DCI. Then, when DCI for scheduling a PDSCH further indicates a normal beam (the TCI-state), the terminal device uses the TCI-state indicated by the DCI. When DCI does not indicate a normal beam, the first beam is used. Specifically, that the DCI does not indicate a normal beam includes that the DCI does not include a TCI field or that a TCI field value in the DCI is associated with no beam.

The priority of the first beam is lower than the priority of the normal beam: The normal beam may cover the first beam, but the first beam cannot cover the normal beam. Alternatively, the first beam can be applied only to a channel or a reference signal for which no normal beam is configured. For example, the network device indicates, to the terminal device, the first beam for transmitting a PDSCH. When the DCI does not indicate a normal beam of the PDSCH, the terminal device uses the first beam. When the DCI indicates a normal beam, the terminal device uses the indicated normal beam.

The normal beam is a beam for transmission of a single channel or reference signal in R15 and R16 protocols.

It should be noted that the first beam covers the normal beam, or the normal beam covers the first beam, and may cover only QCL information of typeD. In addition, the first beam may also be represented by using a TCI-state or a spatial relation. For example, the first beam on the downlink is represented by using the TCI-state. The first beam on the uplink is represented by using the spatial relation. Alternatively, the first beam may be represented by using another parameter indicating an uplink or downlink transmission beam.

With reference to the second aspect, in an optional implementation of the second aspect, during communication between the terminal device and the network device, the terminal device does not transmit a second channel and/or a second reference signal by using the first beam, where the second channel includes but is not limited to one or more of the following: a second PDCCH, a second PDSCH, a second PUCCH, or a second PUSCH. The second reference signal includes but is not limited to one or more of the following: a second CSI-RS, a second SRS, or a second SSB.

In this application, the terminal device may alternatively not use the first beam to transmit one or more channels and/or one or more reference signals. This improves implementation flexibility of the solution.

With reference to the second aspect, in an optional implementation of the second aspect, the second PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which no first beam is used, a PDCCH overlapping, in time domain, with another reference signal for which no first beam is used, a PDCCH corresponding to a specific-format search space configured by the network device, or a PDCCH corresponding to a specific-format CORESET configured by the network device.

Specifically, the second PDCCH includes all types of PDCCHs, or includes only a part of PDCCHs, and specifically includes but is not limited to one or more of the following, or a combination of a plurality of the following: a PDCCH carrying a downlink control information (DCI) format 0-0/0-1/0-2/1-0/1-1/1-2/2-1/2-2/2-3/2-4/2-5/3-1/3-2, a PDCCH corresponding to a UE-specific search space, a PDCCH corresponding to a common search space, a PDCCH corresponding to a search space 0/CORESET 0, a PDCCH corresponding to searchSpaceSIB1/searchSpaceOtherSystemInformation/ra-SearchSpace, a PDCCH that overlaps with a specific channel or signal in time domain (where the first beam is not used for the specific channel or signal), a PDCCH corresponding to a specific CORESET, or a PDCCH corresponding to a specific search space. The specific CORESET may be one CORESET/one group of CORESETs configured, activated, or indicated by the network device. The specific search space may be one search space/one group of search spaces configured, activated, or indicated by the network device.

Alternatively, the second PDCCH may be a combination of a plurality of the foregoing. For example, a combination of the PDCCH carrying the DCI format 0-0 and the PDCCH corresponding to the UE-specific search space is a PDCCH carrying the DCI format 0-0 and corresponding to the UE-specific search space.

The foregoing PDCCH may alternatively be replaced with a DMRS (demodulation reference signal) of the PDCCH.

The configuration message sent by the network device to the terminal device carries information about the second PDCCH, and the information about the second PDCCH includes but is not limited to a parameter of the second PDCCH or an identifier of the second PDCCH.

With reference to the second aspect, in an optional implementation of the second aspect, the second PDSCH includes one or more of the following, or a combination of a plurality of the following:

a PDSCH scheduled by using a PDCCH for which no first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which no first beam is used, a PDSCH overlapping, in time domain, with another reference signal for which no first beam is used, or a specific-format PDSCH configured by the network device, where the scheduling PDCCH is a PDCCH for scheduling a PDSCH.

Specifically, the TCI field has three bits, and there are eight field values in total. Each of the eight field values may correspond to one beam. Specifically, the eight beams respectively corresponding to the eight field values are indicated by MAC CE signaling. The MAC CE signaling may indicate a maximum of eight beams. If a quantity of indicated beams is less than 8, some TCI field values do not have corresponding beams. In other words, the TCI field values are associated with no beam herein.

Specifically, the second PDSCH includes all types of PDSCHs, or includes only a part of PDSCHs, and specifically includes but is not limited to one or more of the following, or a combination of a plurality of the following: the PDSCH scheduled by using the PDCCH for which no first beam is used, the PDSCH scheduled by using the DCI format 1-0, a PDSCH scheduled by using DCI format 1-1, the PDSCH scheduled by using the DCI format 1-2, a PDSCH for which a beam is indicated (for example, a PDSCH scheduled by using DCI carrying the TCI field value), a PDSCH for which no beam is indicated (for example, the PDSCH scheduled by using the DCI format 1-0 or a PDSCH scheduled by using DCI having no TCI field), a PDSCH whose time interval with the scheduling PDCCH is less than a threshold (for example, TimeDurationForQCL), or a PDSCH that overlaps with a specific channel or signal in time domain (where no first beam is used for the specific channel or signal).

The second PDSCH may alternatively be a combination of a plurality of the foregoing. For example, a combination of the PDSCH scheduled by using the DCI format 1-1 and the PDSCH for which no beam is indicated is a PDSCH scheduled by using the DCI format 1-1 and for which no beam is indicated.

The foregoing PDSCH may alternatively be replaced with a DMRS of the PDSCH or a phase tracking reference signal (PTRS) of the PDSCH.

The configuration message sent by the network device to the terminal device carries information about the second PDSCH, and the information about the second PDSCH includes but is not limited to a parameter of the second PDSCH or an identifier of the second PDSCH.

With reference to the second aspect, in an optional implementation of the second aspect, the second CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

Specifically, the second CSI-RS includes all types of CSI-RSs, or includes only a part of CSI-RSs, and specifically includes but is not limited to one or more of the following, or a combination of a plurality of the following: a CSI-RS in a resource set for which a repetition parameter is configured, the CSI-RS in the resource set whose repetition parameter is configured as on, a CSI-RS in a resource set whose repetition parameter is configured as off, a CSI-RS in a resource set for which a trs-info parameter is configured, the CSI-RS in the resource set for which no repetition parameter and no trs-info parameter are configured, a CSI-RS for mobility (a CSI-RS for layer 3 mobility measurement), the CSI-RS for which no beam information is configured, a CSI-RS for which beam information is configured, a periodic CSI-RS, a semi-persistent (SP) CSI-RS, an aperiodic CSI-RS, a CSI-RS for reference signal received power (RSRP) or signal to interference plus noise ratio (SINR) measurement, or a CSI-RS for channel state information (CSI), channel quality identifier (CQI), precoding matrix indicator (PMI), or channel rank identifier (RI) measurement.

The second CSI-RS may alternatively be a combination of a plurality of the foregoing. For example, a combination of the CSI-RS in the resource set for which the repetition parameter is configured and the periodic CSI-RS is a periodic CSI-RS for which the repetition parameter is configured.

The configuration message sent by the network device to the terminal device carries information about the second CSI-RS, and the information about the second CSI-RS includes but is not limited to a parameter of the second CSI-RS or an identifier of the second CSI-RS.

With reference to the second aspect, in an optional implementation of the second aspect, the second SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

Specifically, the second SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message sent by the network device to the terminal device carries information about the second SRS, and the information about the second SRS includes but is not limited to a parameter of the second SRS or an identifier of the second SRS.

With reference to the second aspect, in an optional implementation of the second aspect, the second PUCCH includes all types of PUCCHs, or includes only a part of PUCCHs, and specifically includes but is not limited to one or more of the following, or a combination of a plurality of the following: a PUCCH format 0, a PUCCH format 1, a PUCCH format 2, a PUCCH format 3, a PUCCH format 4, a PUCCH carrying a HARQ ACK/NACK, a PUCCH carrying an SR (scheduling request), a PUCCH carrying a CSI (channel state information) measurement result, a PUCCH carrying ACK/NACK information and a scheduling request (SR), a PUCCH carrying ACK/NACK information and a CSI measurement result, a PUCCH carrying ACK/NACK information+an SR+a CSI measurement result, a long PUCCH, a short PUCCH, a PUCCH carrying ACK/NACK information of a PDSCH that is not sent by using the first beam, a PUCCH carrying ACK/NACK information of a PDSCH scheduled by using a PDCCH that is not sent by using the first beam, a PUCCH that overlaps with a specific channel or signal in time domain (where no first beam is used for the specific channel or signal), a PUCCH for which no beam is configured, activated, or indicated, or a PUCCH for which no path loss measurement resource is configured, activated, or indicated.

Alternatively, the second PUCCH may be a combination of a plurality of the foregoing. For example, a combination of the PUCCH format 0 and the PUCCH carrying the hybrid automatic repeat request (HARQ) ACK/NACK is a PUCCH format 0 carrying the HARQ ACK/NACK.

The foregoing PUCCH may alternatively be replaced with a DMRS of the PUCCH.

The configuration message sent by the network device to the terminal device carries information about the second PUCCH, and the information about the second PUCCH includes but is not limited to a parameter of the second PUCCH or an identifier of the second PUCCH.

With reference to the second aspect, in an optional implementation of the second aspect, the second PUSCH includes all types of PUSCHs, or includes only a part of PUSCHs, and specifically includes but is not limited to one or more of the following, or a combination of a plurality of the following: a PUSCH scheduled by using a PDCCH for which no first beam is used, a PUSCH scheduled by using DCI 0-0, a PUSCH scheduled by using DCI 0-1, a PUSCH scheduled by using DCI 0-2, a PUSCH in codebook mode, a PUSCH in nonCodebook mode, a PUCCH scheduled by using DCI including no uplink beam indication field/SRI field, a PUCCH for which no beam is configured, activated, or indicated, a PUCCH for which no path loss measurement resource is configured, activated, or indicated, or a PUSCH that overlaps with a specific channel or signal in time domain (where no first beam is used for the specific channel or signal).

The second PUSCH may alternatively be a combination of a plurality of the foregoing. For example, a combination of the PUSCH in codebook mode and the PUSCH scheduled by using the DCI 0-0 is a PUSCH that is in codebook mode and that is scheduled by using the DCI 0-0.

The foregoing PUSCH may alternatively be replaced with a DMRS/PTRS of the PUSCH.

The configuration message sent by the network device to the terminal device carries information about the second PUSCH, and the information about the second PUSCH includes but is not limited to a parameter of the second PUSCH or an identifier of the second PUSCH.

With reference to the second aspect, in an optional implementation of the second aspect, the second SRS includes but is not limited to an SRS whose type or usage is beam management.

The second SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message sent by the network device to the terminal device carries information about the second SRS, and the information about the second SRS includes but is not limited to a parameter of the second SRS or an identifier of the second SRS.

The second SSB includes all types of SSBs, or includes only a part of SSBs, and specifically includes but is not limited to one or more of the following, or a combination of a plurality of the following: an SSB for mobility (a CSI-RS for layer 3 mobility measurement), an SSB for RSRP/SINR measurement, an SSB for CQI/PMI measurement, an SSB for which no QCL information is configured, a periodic SSB, or an aperiodic SSB.

The configuration message sent by the network device to the terminal device carries information about the second SSB, and the information about the second SSB includes but is not limited to a parameter of the second SSB or an identifier of the second SSB.

According to a third aspect, this application provides a terminal device, including:

a transceiver module, configured to communicate with a network device by using a first beam, where the first beam is for transmitting a first channel and/or a first reference signal.

The first channel includes a plurality of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH).

The first reference signal includes a plurality of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS).

It should be noted that the terminal device in this application may be an independent terminal device, or may be a chip used in the terminal device, or another combined component, part, or the like that can implement a function of the foregoing terminal device. When the terminal device is the independent terminal device, the transceiver module (including a receiving module and a sending module) may be a transceiver. The transceiver may include an antenna, a radio frequency circuit, and the like. A processing module may be a processor, for example, a baseband chip. When the terminal device is the component having the function of the foregoing terminal device, a receiving module and a sending module may be radio frequency units, and a processing module may be a processor. When the terminal device is a chip system, a receiving module may be an input port of the chip system, a sending module may be an output interface of the chip system, and a processing module may be a processor of the chip system, for example, a central processing unit (CPU).

In some optional implementations of this application, the first PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In some optional implementations of this application, the first PDSCH includes one or more of the following, or a combination of a plurality of the following:

a PDSCH scheduled by using a PDCCH for which the first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

In some optional implementations of this application, the first PUCCH includes one or more of the following:

a specific-format PUCCH configured by the network device, a PUCCH carrying hybrid automatic repeat request (HARQ) feedback information, a PUCCH carrying HARQ feedback information of a PDSCH scheduled by using a PDCCH for which the first beam is used, a PUCCH overlapping, in time domain, with another channel for which the first beam is used, or a PUCCH overlapping, in time domain, with another reference signal for which the first beam is used.

In some optional implementations of this application, the first PUSCH includes one or more of the following:

a PUSCH scheduled by using a PDCCH for which the first beam is used, a PUSCH corresponding to a scheduling PDCCH that indicates no beam, a PUSCH corresponding to the scheduling PDCCH that indicates no sounding reference signal resource indicator (SRI), a PUSCH whose time interval with the scheduling PDCCH is less than a preset threshold, a PUSCH scheduled by using downlink control information (DCI) 0-0, a PUSCH scheduled by using downlink control information (DCI) 0-2, a PUSCH overlapping, in time domain, with another channel for which the first beam is used, or a PUSCH overlapping, in time domain, with another reference signal for which the first beam is used, where the scheduling PDCCH is a PDCCH for scheduling a PUSCH.

In some optional implementations of this application, the first CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In some optional implementations of this application, the first SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In some optional implementations of this application,
the transceiver module is further configured to receive a configuration message sent by a network device; and
a processing module is further configured to determine, based on the configuration message, whether to use the first beam; or
a processing module is further configured to determine, based on the configuration message, the first channel and/or the first reference signal for which the first beam is used.

In some optional implementations of this application, the configuration message carries one or more of the following:
a type of the first channel;
a type of the first reference signal;
information about the first PDCCH;
information about a control-resource set (CORESET) corresponding to the first PDCCH;
information about a search space corresponding to the first PDCCH;
information about the first PUCCH;
information about the first CSI-RS;
information about the first SRS;
one or more beams included in the first beam; or
a first parameter, where the first parameter indicates whether to use the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

In some optional implementations of this application, the configuration message is a radio resource control (RRC) message, a medium access control-control element (MAC CE) message, or downlink control information (DCI).

In some optional implementations of this application, the transceiver module is further configured to receive an indication message sent by the network device; and
the processing module is further configured to determine, based on the indication message, the first beam to be configured, activated, or indicated.

In some optional implementations of this application, the transceiver module is further configured to receive downlink control information (DCI) sent by the network device.

When a first condition is satisfied, a transmission configuration indicator (TCI) field in the DCI indicates the first beam, where the first condition includes one of the following, or a combination of a plurality of the following:
the first beam is configured for the terminal device;
the terminal device is configured with the first channel that includes the first PDSCH;
the first beam is for PDSCH transmission;
PDSCH transmission is not scheduled by using the DCI;
a frequency domain resource assignment field value in the DCI is 0; or
a value of a first field carried in the DCI indicates that the TCI field indicates the first beam, and the first field indicates a function of the TCI field.

In some optional implementations of this application, the DCI further carries a second field, the second field indicates a function of the DCI, and the function of the DCI includes one or more of the following:
indicating the first beam, scheduling a PDSCH, or indicating the first channel.

In some optional implementations of this application, the second field includes one or more of the following: a frequency domain resource assignment field, a time domain resource assignment field, a modulation and coding scheme (MCS) field, a new data indicator (NDI) field, a redundancy version (RV) field, a hybrid automatic repeat request (HARQ) process field, a downlink assignment index (DAI) field, a physical uplink control channel (PUCCH) resource field, or a hybrid automatic repeat request (HARQ) feedback time indicator field.

In some optional implementations of this application, the transceiver module is further configured to send capability information to the network device, where the capability information includes one or both of the following:
whether the terminal device supports use of the first beam, and a beam quantity of first beams supported by the terminal device, where the first beam includes one or more of the following: a first beam on an uplink, a first beam on a downlink, a first beam shared by the uplink and the downlink, a first beam on a control channel, or a first beam on a data channel.

The beam quantity includes one or more of the following: a quantity of beams configured for a single transmission reception point (TRP) corresponding to the terminal device, a quantity of beams configured for all TRPs corresponding to the terminal device, a quantity of beams configured for a single cell corresponding to the terminal device, or a quantity of beams configured for all cells corresponding to the terminal device;
a quantity of beams activated for a single transmission reception point (TRP) corresponding to the terminal device, a quantity of beams activated for all TRPs corresponding to the terminal device, a quantity of beams activated for a single cell corresponding to the terminal device, or a quantity of beams activated for all cells corresponding to the terminal device; or
a quantity of beams indicated for a single transmission reception point (TRP) corresponding to the terminal device, a quantity of beams indicated for all TRPs corresponding to the terminal device, a quantity of beams indicated for a single cell corresponding to the terminal device, or a quantity of beams indicated for all cells corresponding to the terminal device.

According to a fourth aspect, this application provides a network device, including:
a transceiver module, configured to communicate with a terminal device by using a first beam, where the first beam is for transmitting a first channel and/or a first reference signal.

The first channel includes a plurality of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH).

The first reference signal includes a plurality of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS).

It should be noted that the network device in this application may be an independent network device, or may be a chip used in the network device, or another combined component, part, or the like that can implement a function of the foregoing network device. When the network device is the independent network device, the transceiver module (including a receiving module and a sending module) may be a transceiver. The transceiver may include an antenna, a radio frequency circuit, and the like. A processing module may be a processor, for example, a baseband chip. When the network device is the component having the function of the foregoing network device, a receiving module and a sending module may be radio frequency units, and a processing module may be a processor. When the network device is a chip system, a receiving module may be an input port of the chip system, a sending module may be an output interface of the chip system, and a processing module may be a processor of the chip system, for example, a central processing unit (CPU).

In some optional implementations of this application, the first PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In some optional implementations of this application, the first PDSCH includes one or more of the following, or a combination of a plurality of the following:

a PDSCH scheduled by using a PDCCH for which the first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

In some optional implementations of this application, the first PUCCH includes one or more of the following:

a specific-format PUCCH configured by the network device, a PUCCH carrying hybrid automatic repeat request (HARQ) feedback information, a PUCCH carrying HARQ feedback information of a PDSCH scheduled by using a PDCCH for which the first beam is used, a PUCCH overlapping, in time domain, with another channel for which the first beam is used, or a PUCCH overlapping, in time domain, with another reference signal for which the first beam is used.

In some optional implementations of this application, the first PUSCH includes one or more of the following:

a PUSCH scheduled by using a PDCCH for which the first beam is used, a PUSCH corresponding to a scheduling PDCCH that indicates no beam, a PUSCH corresponding to the scheduling PDCCH that indicates no sounding reference signal resource indicator (SRI), a PUSCH whose time interval with the scheduling PDCCH is less than a preset threshold, a PUSCH scheduled by using downlink control information (DCI) 0-0, a PUSCH scheduled by using downlink control information (DCI) 0-2, a PUSCH overlapping, in time domain, with another channel for which the first beam is used, or a PUSCH overlapping, in time domain, with another reference signal for which the first beam is used, where the scheduling PDCCH is a PDCCH for scheduling a PUSCH.

In some optional implementations of this application, the first CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In some optional implementations of this application, the first SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In some optional implementations of this application, the transceiver module is further configured to send a configuration message to the terminal device, where the configuration message is for configuring whether the terminal device uses the first beam, or configuring the first channel and/or the first reference signal for which the terminal device uses the first beam.

In some optional implementations of this application, the configuration message carries one or more of the following:

a type of the first channel;
a type of the first reference signal;
information about the first PDCCH;
information about a control-resource set (CORESET) corresponding to the first PDCCH;
information about a search space corresponding to the first PDCCH;
information about the first PUCCH;
information about the first CSI-RS;
information about the first SRS;
one or more beams included in the first beam; or
a first parameter, where the first parameter indicates whether to use the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

In some optional implementations of this application, the configuration message is a radio resource control (RRC) message, a medium access control-control element (MAC CE) message, or downlink control information (DCI).

In some optional implementations of this application, the transceiver module is further configured to send an indication message to the terminal device, where the indication message is for configuring, activating, or indicating the first beam.

In some optional implementations of this application, that the network device sends the indication message to the terminal device includes:

the transceiver module is further configured to send downlink control information (DCI) to the terminal device.

When a first condition is satisfied, a transmission configuration indicator (TCI) field in the DCI indicates the first beam, where the first condition includes one of the following, or a combination of a plurality of the following:

the first beam is configured for the terminal device;

the terminal device is configured with the first channel that includes the first PDSCH;

the first beam is for PDSCH transmission;

PDSCH transmission is not scheduled by using the DCI;

a frequency domain resource assignment field value in the DCI is 0; or a value of a first field carried in the DCI indicates that the TCI field indicates the first beam, and the first field indicates a function of the TCI field.

In some optional implementations of this application, the DCI further carries a second field, the second field indicates a function of the DCI, and the function of the DCI includes one or more of the following:

indicating the first beam, scheduling a PDSCH, or indicating the first channel.

In some optional implementations of this application, the second field includes one or more of the following: a frequency domain resource assignment field, a time domain resource assignment field, a modulation and coding scheme (MCS) field, a new data indicator (NDI) field, a redundancy version (RV) field, a hybrid automatic repeat request (HARQ) process field, a downlink assignment index (DAI) field, a physical uplink control channel (PUCCH) resource field, or a hybrid automatic repeat request (HARQ) feedback time indicator field.

In some optional implementations of this application, the transceiver module is further configured to receive capability information sent by the terminal device, where the capability information includes one or both of the following:

whether the terminal device supports use of the first beam, and a beam quantity of first beams supported by the terminal device, where the first beam includes one or more of the following: a first beam on an uplink, a first beam on a downlink, a first beam shared by the uplink and the downlink, a first beam on a control channel, or a first beam on a data channel.

The beam quantity includes one or more of the following: a quantity of beams configured for a single transmission reception point (TRP) corresponding to the terminal device, a quantity of beams configured for all TRPs corresponding to the terminal device, a quantity of beams configured for a single cell corresponding to the terminal device, or a quantity of beams configured for all cells corresponding to the terminal device;

a quantity of beams activated for a single transmission reception point (TRP) corresponding to the terminal device, a quantity of beams activated for all TRPs corresponding to the terminal device, a quantity of beams activated for a single cell corresponding to the terminal device, or a quantity of beams activated for all cells corresponding to the terminal device; or a quantity of beams indicated for a single transmission reception point (TRP) corresponding to the terminal device, a quantity of beams indicated for all TRPs corresponding to the terminal device, a quantity of beams indicated for a single cell corresponding to the terminal device, or a quantity of beams indicated for all cells corresponding to the terminal device.

A fifth aspect of this application provides a terminal device. The terminal device includes a processor, a memory, an input/output device, and a bus. The memory stores computer instructions. When the processor executes the computer instructions in the memory, the memory stores the computer instructions. When executing the computer instructions in the memory, the processor is configured to implement any implementation of the first aspect.

In a possible implementation of the fifth aspect, the processor, the memory, and the input/output device are connected to the bus.

A sixth aspect of this application provides a network device. The network device includes a processor, a memory, an input/output device, and a bus. The memory stores computer instructions. When the processor executes the computer instructions in the memory, the memory stores the computer instructions. When executing the computer instructions in the memory, the processor is configured to implement any implementation of the third aspect.

In a possible implementation of the sixth aspect, the processor, the memory, and the input/output device are connected to the bus.

A seventh aspect of this application provides a computer program product that includes instructions. When the computer program product runs on a computer, the computer is enabled to perform any implementation of the first aspect and the second aspect.

An eighth aspect of this application provides a computer-readable storage medium, including instructions. When the instructions are run on a computer, the computer is enabled to perform any implementation of either of the first aspect and the second aspect.

A ninth aspect of this application provides a chip system. The chip system includes a processor. The processor is configured to execute a computer program or instructions stored in a memory, so that the processor performs any implementation of either of the first aspect and the second aspect.

In a possible design of the ninth aspect, the chip system further includes the memory. The memory is configured to store a necessary computer program or instructions of a computer device. The processor is configured to invoke the computer program or the instructions from the memory and run the computer program or the instructions. The chip system may include a chip, or may include the chip and another discrete device.

In a possible design of the ninth aspect, the chip system further includes an input port and an output port. The input port and the output port are configured to perform a receiving function and a sending function of the terminal device or a receiving function and a sending function of the network device in any implementation of the first aspect or the second aspect, where the receiving function corresponds to the input port, and the sending function corresponds to the output port.

A tenth aspect of this application provides a communication system. The communication system includes the terminal device in the first aspect and the network device in the second aspect.

BRIEF DESCRIPTION OF DRAWINGS

FIG. 3 is a schematic diagram of a structure of a MAC CE for activating a TCI;

FIG. 4 is a schematic diagram of a configuration structure of a spatial relation;

DESCRIPTION OF EMBODIMENTS

Figure 1A:
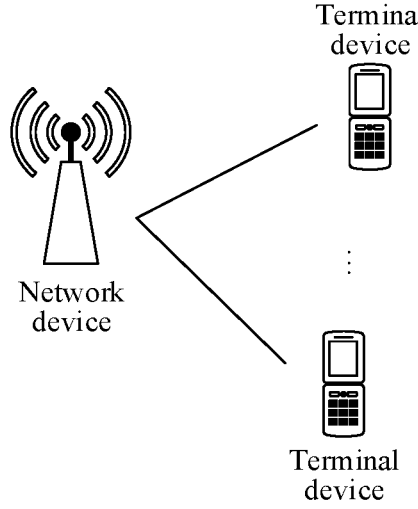
FIG. 1a is a schematic diagram of an application scenario according to an embodiment of this application.

In the specification, claims, and the accompanying drawings of this application, the terms "first", "second", and the like are intended to distinguish between similar objects but are not necessarily for describing a specific order or sequence. It should be understood that, the terms used in such a way are interchangeable in proper circumstances, which is merely a discrimination manner used when objects having a same attribute are described in embodiments of this application. In addition, the terms "include", "have" and any variant thereof mean to cover the non-exclusive inclusion, so that a process, method, system, product, or device that includes a series of units is not necessarily limited to those units, but may include other units not expressly listed or inherent to such a process, method, product, or device.

The following clearly describes the technical solutions in embodiments of this application with reference to the accompanying drawings in embodiments of this application. In descriptions of this application, "/" means "or" unless otherwise specified. For example, A/B may represent A or B. In this application, "and/or" describes only an association relationship between associated objects and represents that three relationships may exist. For example, A and/or B may represent the following three cases: Only A exists, both A and B exist, and only B exists. In addition, in the descriptions of this application, "at least one" means one or more, and "a plurality of" means two or more. "At least one of the following" or a similar expression thereof indicates any combination of the items, and includes a singular item or any combination of plural items. For example, at least one of a, b, or c may indicate: a, b, c, a and b, a and c, b and c, or a, b, and c, where a, b, and c may be singular or plural.

The technical solutions in embodiments of this application may be applied to various communication systems, such as a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth generation (5G) system, an NR system, and a future sixth communication system.

A part operated by an operator in various communication systems may be referred to as an operator network. The operator network may also be referred to as a PLMN, is a network established and operated by a government or an operator approved by the government to provide a land mobile communication service for the public, and is mainly a public network in which a mobile network operator (MNO) provides a mobile broadband access service for a user. The operator network or the PLMN described in embodiments of this application may be a network that satisfies a requirement of the 3rd generation partnership project (3GPP) standard, which is referred to as a 3GPP network. Usually, the 3GPP network is operated by an operator, includes but is not limited to a 5th-generation (5G) mobile communication network (5G network for short), a 4th-generation (4G) mobile communication network (4G network for short), or a 3rd-generation (3G) mobile communication technology network (3G network for short), and further includes a future 6G network. For ease of description, the operator network (for example, a mobile network operator (MNO) network) is used as an example for description in embodiments of this application.

For ease of understanding embodiments of this application, some application scenarios of this solution are described. FIG. 1a is a schematic diagram of an application scenario according to an embodiment of this application. In an optional implementation, a transmitting end in this embodiment of this application may be a network device, and a receiving end may be a terminal device. In another optional implementation, a transmitting end in this embodiment of this application may be a terminal device, and a receiving end may be a network device.

Figure 1B:
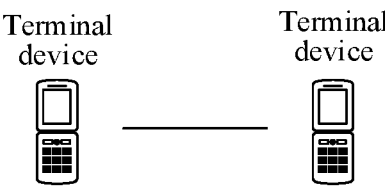
FIG. 1b is a schematic diagram of another application scenario according to an embodiment of this application.

FIG. 1b is a schematic diagram of another application scenario according to an embodiment of this application. In another optional implementation, a transmitting end in this embodiment of this application may be a terminal device, and a receiving end may be another terminal device that establishes a communication connection to the transmitting end.

In embodiments of this application, a terminal device may also be referred to as user equipment (UE). The terminal device in embodiments of this application is a device having a wireless transceiver function, and may communicate with one or more core networks (CNs) by using an access network device in a network device. The terminal device may be referred to as an access terminal, a terminal, a subscriber unit, a subscriber station, a mobile station, a remote station, a remote terminal, a mobile device, a user terminal, a wireless network device, a user agent, a user apparatus, or the like. The terminal device may be deployed on land, and includes an indoor or outdoor device, a handheld device, or a vehicle-mounted device; may be deployed on water (for example, on a ship); or may be deployed in the air (for example, on an aircraft, a balloon, and a satellite). The terminal device may be a cellular phone, a cordless phone, a session initiation protocol (SIP) phone, a smartphone, a mobile phone, a wireless local loop (WLL) station, a personal digital assistant (PDA), a handheld device having a wireless communication function, a computing device or another device connected to a wireless modem, a vehicle-mounted device, a wearable device, an unmanned aerial vehicle device, a terminal in an internet of things or an internet of vehicles, a terminal in any form in a fifth generation (5G) mobile communication network and a future network, relay user equipment, a terminal in a future evolved public land mobile network (PLMN), or the like. The relay user equipment may be, for example, a 5G residential gateway (RG). For example, the terminal device may be a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. This is not limited in embodiments of this application.

A network device may be considered as a subnet of an operator network, and is an implementation system between a service node in the operator network and a terminal device. To access the operator network, the terminal device first passes through the network device, and then may be connected to the service node in the operator network through the network device. The network device in embodiments of this application is a device that provides a wireless communication function for the terminal device, and may also be referred to as a (radio) access network ((R)AN). The network device includes but is not limited to a next generation node base station (gNB) in a 5G system, an evolved NodeB (eNB) in long term evolution (LTE), a radio network controller (RNC), a NodeB (NB), a base station controller (BSC), a base transceiver station (BTS), a home base station (for example, home evolved NodeB or home NodeB, HNB), a base band unit (BBU), a transmission reception point (TRP), a transmitting point (TP), a pico base station device, a mobile switching center, a network device in a future network, or the like. In systems for which different radio access technologies are used, names of a device having a function of an access network device may be different.

A beam-based communication method provided in this application may be applied to various communication systems, for example, an internet of things (IoT) system, a narrow band internet of things (NB-IoT) system, a long term evolution (LTE) system, a 5th generation (5G) communication system, a hybrid LTE and 5G architecture, a 5G new radio (NR) system, and a new communication system emerging in future communication development. The 5G communication system in this application may include at least one of a non-standalone (NSA) 5G communication system and a standalone (SA) 5G communication system. Alternatively, the communication system may be a public land mobile network (PLMN), a device-to-device (D2D) network, a machine to machine (M2M) network, or another network.

In addition, embodiments of this application are further applicable to another future-oriented communication technology, for example, 6G. The network architecture and the service scenario described in this application are intended to describe the technical solutions in this application more clearly, and do not constitute a limitation on the technical solutions provided in this application. A person of ordinary skill in the art may know that with the evolution of the network architecture and the emergence of new service scenarios, the technical solutions provided in this application are also applicable to similar technical problems.

Figure 2:
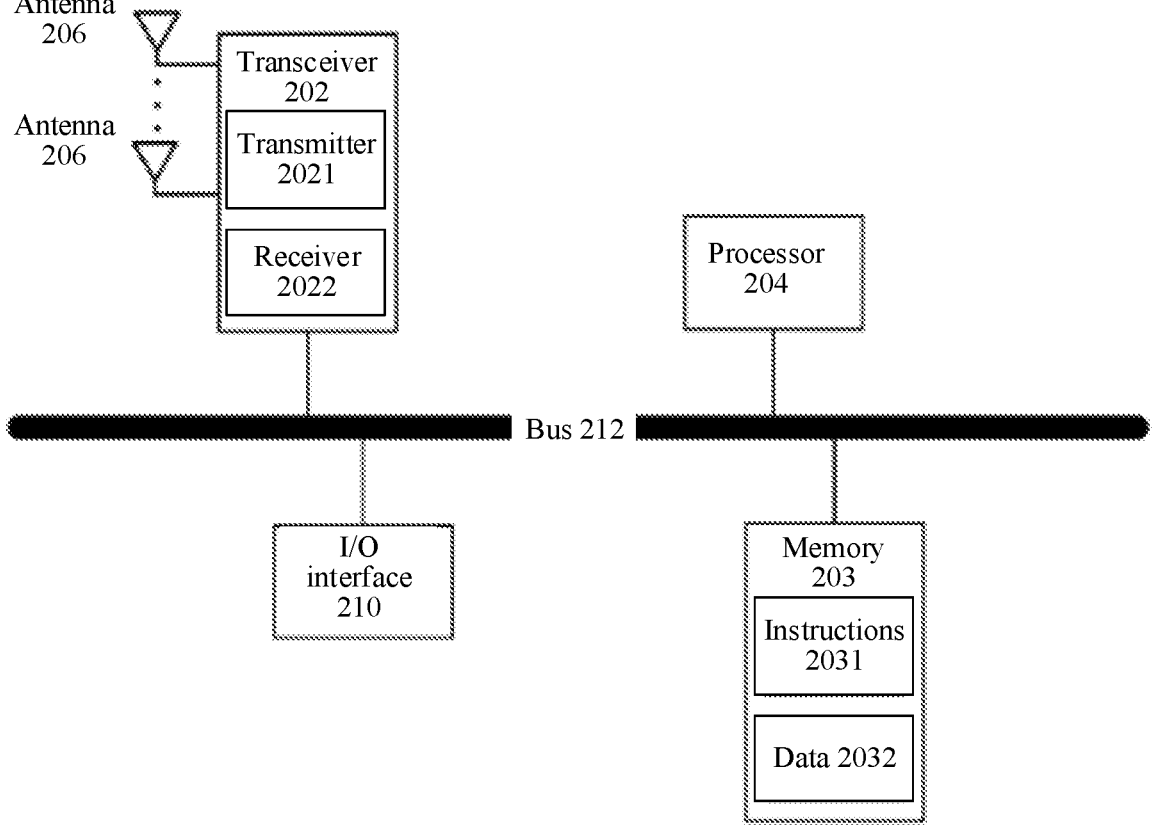
FIG. 2 is a schematic diagram of a hardware structure of a communication apparatus according to an embodiment of this application.

FIG. 2 is a schematic diagram of a hardware structure of a communication apparatus according to an embodiment of this application. The communication apparatus may be a possible implementation of the network device or the terminal device in embodiments of this application. As shown in FIG. 2, the communication apparatus includes at least a processor 204, a memory 203, and a transceiver 202. The memory 203 is further configured to store instructions 2031 and data 2032. Optionally, the communication apparatus may further include antennas 206, an I/O (input/output) interface 210, and a bus 212. The transceiver 202 further includes a transmitter 2021 and a receiver 2022. In addition, the processor 204, the transceiver 202, the memory 203, and the I/O interface 210 are communicatively connected to each other through the bus 212. The antennas 206 are connected to the transceiver 202.

The processor 204 may be a general-purpose processor, for example, but not limited to, a central processing unit (CPU), or may be a dedicated processor, for example, but not limited to, a digital signal processor (DSP), an application specific integrated circuit (ASIC), and a field programmable gate array (FPGA). Alternatively, the processor 204 may be a neural processing unit (NPU). In addition, the processor 204 may alternatively be a combination of a plurality of processors. Particularly, in the technical solutions provided in embodiments of this application, the processor 204 may be configured to perform related steps of a communication method that is based on a first beam in a subsequent method embodiment. The processor 204 may be a processor specifically designed to perform the foregoing steps and/or operations, or may be a processor that performs the foregoing steps and/or operations by reading and executing the instructions 2031 stored in the memory 203. The processor 204 may need to use the data 2032 in a process of performing the foregoing steps and/or operations.

The transceiver 202 includes the transmitter 2021 and the receiver 2022. In an optional implementation, the transmitter 2021 is configured to send a signal through the antenna 206. The receiver 2022 is configured to receive a signal through at least one of the antennas 206. Particularly, in the technical solutions provided in embodiments of this application, the transmitter 2021 may be specifically configured to perform an operation through at least one of the antennas 206, for example, an operation performed by a receiving module or a sending module in the network device or the terminal device when the communication method that is based on a first beam in the subsequent method embodiment is applied to the network device or the terminal device.

In this embodiment of this application, the transceiver 202 is configured to support the communication apparatus in performing the foregoing receiving function and the foregoing sending function. A processor having a processing function is considered as the processor 204. The receiver 2022 may also be referred to as an input port, a receive circuit, or the like. The transmitter 2021 may be referred to as a transmit port, a transmit circuit, or the like.

The processor 204 may be configured to execute the instructions stored in the memory 203, to control the transceiver 202 to receive a message and/or send a message, to complete a function of the communication apparatus in the method embodiment of this application. In an implementation, it may be considered that a function of the transceiver 202 is implemented by using a transceiver circuit or a transceiver-dedicated chip. In this embodiment of this application, that the transceiver 202 receives the message may be understood as that the transceiver 202 inputs the message, and that the transceiver 202 sends the message may be understood as that the transceiver 202 outputs the message.

The memory 203 may be various types of storage media, for example, a random access memory (RAM), a read only memory (ROM), a non-volatile RAM (NVRAM), a programmable ROM (PROM), an erasable PROM (EPROM), an electrically erasable PROM (EEPROM), a flash memory, an optical memory, and a register. The memory 203 is specifically configured to store the instructions 2031 and the data 2032. The processor 204 may perform steps and/or operations in the method embodiment of this application by reading and executing the instructions 2031 stored in the memory 203, and may need to use the data 2032 in a process of performing the operations and/or the steps in the method embodiment of this application.

Optionally, the communication apparatus may further include the I/O interface 210. The I/O interface 210 is configured to: receive instructions and/or data from a peripheral device, and output instructions and/or data to the peripheral device.

For ease of understanding embodiments of this application, the following first briefly describes several terms in this application.

1. Beam:

A main problem of high-frequency communication is that signal energy sharply decreases as a transmission distance increases, and this results in a short signal transmission distance. To resolve this problem, an analog beam technology is used for the high-frequency communication. A large-scale antenna array is for weighted processing, and the signal energy is concentrated in a small range, to form a signal (referred to as an analog beam, a beam for short) similar to a light beam, so that the transmission distance is extended.

The beam is a communication resource. The beam may be a wide beam, a narrow beam, or a beam of another type. A technology for forming the beam may be a beam forming technology or another technical means. The beam forming technology may be specifically a digital beam forming technology, an analog beam forming technology, or a hybrid digital/analog beam forming technology. Different beams may be considered as different resources. Same information or different information may be sent by using the different beams. Optionally, a plurality of beams having a same communication feature or similar communication features may be considered as one beam. The beam may be formed by one or more antenna ports, and is for transmitting a data channel, a control channel, a sounding signal, and the like. The one or more antenna ports forming the beam may be considered as one antenna port set.

Beams include a transmit beam and a receive beam. The transmit beam may refer to distribution of signal strength formed in different directions in space after a signal is transmitted through an antenna, and the receive beam may be distribution of strengthening or weakening reception of a wireless signal in different directions in space by an antenna array.

The beam may be represented in a current NR protocol as a spatial domain filter, a spatial filter, a spatial domain parameter, a spatial parameter, a spatial domain setting, a spatial setting, QCL (quasi-colocation) information, a QCL assumption, a QCL indication, or the like. The beam may be indicated by a transmission configuration indicator state (TCI-state) parameter or a spatial relation parameter. Therefore, in this application, the beam may be replaced with the spatial domain filter, the spatial filter, the spatial domain parameter, the spatial parameter, the spatial domain setting, the spatial setting, the QCL information, the QCL assumption, the QCL indication, a TCI-state (a DL TCI-state and a UL TCI-state), a spatial relation, or the like.

A beam for sending a signal may be referred to as a transmit beam (Tx beam), a spatial domain transmission filter, a spatial transmission filter, a spatial domain transmission parameter, a spatial transmission parameter, a spatial domain transmission setting, or a spatial transmission setting. A downlink transmit beam may be indicated by the TCI-state.

A beam for receiving a signal may be referred to as a receive beam (Rx beam), a spatial domain reception filter, a spatial reception filter, a spatial domain reception parameter, a spatial reception parameter, a spatial domain reception setting, or a spatial reception setting. An uplink transmit beam may be indicated by the spatial relationspatial relation, the uplink TCI-state, or an SRS resource (indicating a transmit beam for which an SRS is used). Therefore, the uplink beam may alternatively be replaced with the SRS resource.

Beam information may be indicated by a quasi-colocation (QCL for short) relationship between antenna ports. Specifically, indication information (for example, downlink control information (DCI for short)) may indicate that one resource (or antenna port) and another resource (or antenna port) have a quasi-colocation relationship, to indicate that beams corresponding to the two resources (or antenna ports) have a same spatial characteristic, and a same receive beam may be used for receiving. In a protocol, a beam may be specifically represented by using identifiers of various signals, for example, a resource index of a channel state information reference signal (CSI-RS for short), an index of a synchronization signal/physical broadcast channel block (which may be referred to as an SS/PBCH block for short, or may be referred to as an SSB for short), a resource index of a sounding reference signal (SRS for short), or a resource index of a tracking reference signal (TRS for short).

In addition, generally, one beam corresponds to one demodulation reference signal (DMRS for short) port/port group, one transmission configuration indicator (TCI for short), one TRP, or one sounding reference signal resource indicator (SRI for short) (for uplink data transmission). Therefore, different beams may alternatively be represented by using different DMRS ports/port groups, TCIs, TRPs, or SRIs.

Because the DMRS port/port group, the TCI, the TRP, the SRI, the resource index of the CSI-RS, the index of the SS/PBCH block, the resource index of the SRS, and the resource index of the TRS each may represent the beam, the following DMRS port/port group and TCI each may alternatively be replaced with the beam, the TRP, the SRI, the resource index of the CSI-RS, the index of the SS/PBCH block, the resource index of the SRS, or the resource index of the TRS, and the replacement does not change the essence of the method provided in embodiments of this application.

2. Quasi-Colocation (QCL):

A QCL relationship indicates that a plurality of resources have one or more same or similar communication features. For a plurality of resources having a colocation relationship, a same communication configuration or similar communication configurations may be used. For example, if two antenna ports have a QCL relationship, a large-scale channel property of one port for transmitting one symbol may be inferred from a large-scale channel property of the other port for transmitting one symbol. Reference signals corresponding to the antenna ports that have a QCL relationship have a same parameter, a parameter of one antenna port may be for determining a parameter of the other antenna port that has a QCL relationship with the antenna port, the two antenna ports have a same parameter, or a parameter difference between the two antenna ports is less than a threshold. The parameter may include one or more of the following: a delay spread, a Doppler spread, a Doppler shift, an average delay, an average gain, and a spatial receive parameter. The spatial receive parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource indicator.

The foregoing angles may be decomposition values at different dimensions or a combination of the decomposition values at the different dimensions. Antenna ports are antenna ports having different antenna port numbers, antenna ports that have a same antenna port number and that are for sending or receiving information at different time, on different frequencies, and/or on different code domain resources, and/or antenna ports that have different antenna port numbers and that are for sending or receiving information at different time, on different frequencies, and/or on different code domain resources. The resource indicator may include: a CSI-RS resource indicator, an SRS resource indicator, an SSB resource indicator, a resource indicator of a preamble sequence transmitted on a physical random access channel (PRACH), or a resource indicator of a demodulation reference signal (DMRS), indicating a beam on a resource.

In an NR protocol, the QCL relationship may be classified into the following four types based on different parameters:

typeA: the Doppler shift, the Doppler spread, the average delay, and the delay spread;

typeB: the Doppler shift and the Doppler spread;

typeC: the Doppler shift and the average delay; and typeD: the spatial receive parameter.

The QCL in embodiments of this application is QCL of typeD. Unless otherwise specified in the following, the QCL may be understood as the QCL of typeD, namely, QCL defined based on the spatial receive parameter, which is referred to as spatial QCL for short.

When a QCL relationship is a QCL relationship of typeD, the QCL relationship may be considered as the spatial QCL. When antenna ports satisfy a spatial QCL relationship, a QCL relationship between a port for a downlink signal and a port for a downlink signal or between a port for an uplink signal and a port for an uplink signal may be that the two signals have a same AOA or AOD, and indicates that the two signals have a same receive beam or transmit beam. For another example, a QCL relationship between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used for determining an uplink transmit beam based on a downlink receive beam or determine a downlink receive beam based on an uplink transmit beam.

From a perspective of a transmitting end, if two antenna ports are spatial QCLed, it may mean that corresponding beam directions of the two antenna ports are consistent in space. From a perspective of a receiving side, if two antenna ports are spatial QCLed, it may mean that the receiving side can receive, in a same beam direction, signals sent through the two antenna ports.

Signals transmitted on ports having a spatial QCL relationship may further have corresponding beams. The corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may alternatively be understood as signals received or sent by using a same spatial filter. The spatial filter may be at least one of the following: precoding, a weight of an antenna port, a phase deflection of the antenna port, and an amplitude gain of the antenna port.

Signals transmitted on ports having a spatial QCL relationship may alternatively be understood as having corresponding beam pair links (BPLs). The corresponding BPL includes at least one of the following: a same downlink BPL, a same uplink BPL, an uplink BPL corresponding to a downlink BPL, and a downlink BPL corresponding to an uplink BPL.

Therefore, the spatial receive parameter (namely, the QCL of typeD) may be understood as a parameter indicating direction information of a receive beam.

3. QCL Indication and QCL Assumption:

It has been described in the QCL introduction that if two antenna ports have a quasi-colocation relationship, a large-scale channel property of one port for transmitting one symbol may be inferred from a large-scale channel property of the other port for transmitting one symbol. Therefore, when a base station indicates that there is a QCL relationship between two ports, a terminal should assume that large-scale channel properties of the two ports for transmitting one symbol are consistent. For example, the large-scale channel property of the port for transmitting the symbol is known, and the large-scale channel property of the other port for transmitting the symbol may use a same assumption.

4. Transmission Configuration Indicator (TCI)-State:

The TCI-state may indicate a QCL relationship between two types of reference signals. Each TCI-state may include a serving cell index, a bandwidth part (BWP) identifier (ID), and a reference signal resource indicator. The reference signal resource indicator may be, for example, at least one of the following: a non-zero-power (NZP) CSI-RS reference signal resource identifier (NZP-CSI-RS-ResourceId), a non-zero-power CSI-RS reference signal resource set identifier (NZP-CSI-RS-ResourceSetId), or an SSB index (SSB-Index).

In 3GPP, a TCI is defined as indicating a transmission configuration which includes QCL-relationships between the DL RSs in one RS set and the PDSCH DMRS ports.

The TCI may indicate QCL information of a physical downlink control channel (PDCCH for short)/physical downlink shared channel (PDSCH for short), and may specifically indicate a reference signal that satisfies a QCL relationship with a DMRS of the PDCCH/PDSCH. In this case, a terminal may receive the PDCCH/PDSCH by using a spatial parameter (for example, a receive beam) that is the same as or similar to a spatial parameter of the reference signal.

In the TCI, a reference signal index may specifically indicate the reference signal that satisfies the QCL relationship with the DMRS of the PDCCH/PDSCH.

In the 3GPP R15 protocol, a network device indicates, to the terminal device by using a TCI field in DCI, related information of a transmit beam used by the network device. For example, when a size of the TCI field is 3 bits, eight different values (code points in the protocol) may be specifically represented, each value corresponds to an index of one TCI-state, and the index of the TCI-state may uniquely identify the TCI-state. The TCI-state includes several parameters, and the related information of the transmit beam may be determined by using these parameters. The TCI-state is configured by the network device for each terminal device.

Each TCI-state includes an index of the TCI-state, namely, tci-StateId, and two pieces of QCL-Info. Each piece of QCL-Info includes a cell field and a bwp-Id that respectively indicate the TCI-state is applied to which BWP (bandwidth part) of which cell. Therefore, different QCL-Info may be configured for different BWPs of different cells or a same cell. The QCL-Info further includes referenceSignal indicating a reference signal resource with which a resource (in this application, a resource or a beam for data transmission) for which the TCI-state is used forms a QCL (quasi-colocation) relationship. In the R15 protocol, the term "beam" is usually not directly used, and the beam is usually replaced with another term. For example, in both data transmission and channel measurement, the beam corresponds to a reference signal resource, and one beam corresponds to one reference signal resource. Therefore, forming a QCL relationship with which reference signal resource herein is essentially forming a QCL relationship with which beam. The QCL relationship means that two reference signal resources (or two antenna ports, where antenna ports and reference signal resources are also in a one-to-one correspondence) have some same spatial parameters. Specifically, which spatial parameters are the same depends on a type of the QCL-Info, that is, another field qcl-Type of the QCL-Info. There may be four values of qcl-Type: {typeA, typeB, typeC, typeD}. TypeD is used as an example. TypeD indicates that the two reference signal resources have same spatial receive parameter (Spatial Rx parameter) information. That is, two beams have a same receive beam. A maximum of one of the two pieces of QCL-Info included in the TCI-state can be TypeD.

The following separately describes TCI-state configuration, activation, and indication.

TCI-state configuration: The network device configures a plurality of TCI-states for the terminal device by using radio resource control (RRC) signaling. Each of these TCI-states includes a piece of QCL-Info of typeD. Alternatively, the network device may configure a TCI-state that does not include QCL-info of typeD. However, the TCI-states do not indicate a data transmission beam. Therefore, details are not further described herein.

TCI-state activation: After configuring the plurality of TCI-states, the network device further needs to activate eight of the TCI-states by using a medium access control-control element (MAC CE). The eight TCI-states are in a one-to-one correspondence with eight values of the TCI field in the DCI. That is, the eight TCI-states corresponding to the eight values of the TCI field in the DCI are determined by using MAC CE signaling. A structure of the MAC CE for activating a TCI is shown in FIG. 3. Fields T0 to T(N−2)×8+7 respectively correspond to TCI-states whose indexes are 0 to (N−2)×8+7 and that are configured in the first step, a size of each field is 1 bit, a value may be 0 or 1, and N is a positive integer. The value 1 indicates that the TCI-state is activated, and the value 0 indicates that the TCI-state is not activated. Theoretically, each MAC CE may have eight activation fields whose values are 1, and the others are all 0. TCI-states corresponding to the eight fields whose values are 1 are the eight TCI-states corresponding to the eight values of the TCI field in the DCI. For example, a smallest value 000 of the TCI field corresponds to an activated TCI-state with a smallest index in the MAC CE. The rest may be deduced by analogy. There are many types of MAC CEs. In addition to the MAC CE for activating a TCI-state, there are many MAC CEs for other purposes. This application relates only to a MAC CE for activating a TCI-state/TCI-state combination. Therefore, unless otherwise specified, each MAC CE in this application is such a MAC CE.

TCI-state indication: The network device indicates a specific TCI-state by using the TCI field in the DCI. For example, a value of the TCI field in the DCI sent by the network device to the terminal device is 000, indicating that a TCI-state corresponding to 000 is used for the data transmission beam. The referenceSignal included in QCL-Info of typeD in the TCI-state is a channel state information reference signal (CSI-RS) whose index is #1, indicating that the data transmission beam is the same as a receive beam corresponding to the CSI-RS whose index is #1. The receive beam corresponding to the CSI-RS whose index is #1 may be determined through a beam measurement procedure, and is known to the terminal device. Therefore, the terminal device may determine, based on a specific value of the TCI field, a receive beam corresponding to the data transmission beam, to receive data by using a corresponding receive beam.

5. Spatial Relation:

In a current protocol, a transmit beam for uplink transmission is indicated by the spatial relation, and a function of the spatial relation is similar to that of a TCI-state, and notifies a terminal device of the transmit beam for the uplink transmission.

The spatial relation also needs to be configured through RRC signaling first. As shown in FIG. 4, a configuration structure of the spatial relation includes a spatial relation ID, a cell ID, a target reference signal resource, a path loss measurement reference signal, a power control parameter, and the like. The target reference signal resource (which may be one of an SRS/an SSB/a CSI-RS) indicates a corresponding uplink beam. If a spatial relation #1 is used for the uplink transmission, and the spatial relation #1 includes a target reference signal resource #2, it indicates that the transmit beam used for the uplink transmission is a transmit/receive beam of a target reference signal. For example, when the target reference signal resource is an uplink resource SRS, it indicates that the transmit beam for the uplink transmission is a transmit beam of the SRS (where the transmit beam of the SRS is known). For another example, if the target reference signal resource is a downlink resource such as the SSB/CSI-RS, it indicates that the transmit beam for the uplink transmission is a receive beam of the SSB/CSI-RS (where the receive beam of the SSB/CSI-RS is known).

A network device may configure a plurality of spatial relations for the terminal device. Then, one of the spatial relations is activated for corresponding data transmission by using a MAC CE. The uplink transmission includes PUCCH transmission, SRS transmission, PUSCH transmission, and the like, and a corresponding spatial relation is needed. A spatial relation of the PUCCH is indicated by MAC CE signaling. A spatial relation of the SRS is also indicated by MAC CE signaling. During PUSCH transmission, a specific SRS is associated, and a spatial relation of the SRS is used for transmission.

6. Antenna Panel:

The panel is the antenna panel, and may be an antenna panel of a network device, or may be an antenna panel of a terminal device. There are usually one or more antennas on one antenna panel. These antennas are arranged into an antenna array, and beamforming is performed, to form an analog beam. The antenna array may generate analog beams pointing to different directions. In other words, a plurality of analog beams may be formed on each antenna panel, and a best analog beam used by the antenna panel may be determined through beam measurement. The terminal device may be equipped with a plurality of antenna panels. The antenna panels may be distributed at different locations, and face different directions. This can ensure that at least one antenna panel faces the network device regardless of a direction that the terminal device faces, and the terminal device can perform data transmission with the network device. The terminal device may simultaneously open all antenna panels for transmission. Alternatively, to reduce power consumption of the terminal device, the terminal device may perform transmission by using only one antenna panel once, and another unused antenna panel may be closed. Whether the antenna panel of the terminal device is in an open state or a closed state usually needs to be notified to the network device. In other words, the terminal device and the network device usually need to exchange status information of the antenna panels.

In embodiments of this application, unless otherwise specified, each antenna panel is the antenna panel of the terminal device. In a protocol, the antenna panel may be represented by a panel, a panel index, or the like. In addition, the antenna panel may alternatively be implicitly represented in another manner. For example, the antenna panel may be represented by using an antenna port (for example, a CSI-RS port, an SRS port, a DMRS port, a PTRS port, a CRS port, a TRS port, or an SSB port) or an antenna port group, may be represented by using a resource (for example, a CSI-RS resource, an SRS resource, a DMRS resource, a PTRS resource, a CRS resource, a TRS resource, or an SSB resource) or a resource group, may be represented by using a channel (for example, a PUCCH, PUSCH, PRACH, PDSCH, PDCCH, or a PBCH), or may be represented by using a beam, QCL, a TCI-state, a spatial relation, or an index configured in the QCL, the TCI-state, or the spatial relation. Alternatively, the antenna panel may be represented by using a beam group, a QCL group, a TCI-state group, a spatial relation group, or the like. In other words, an identifier of the antenna panel/panel in this application may be replaced with an identifier of the foregoing content.

According to a beam indication method in a current protocol (Rel-15/Rel-16), a network device indicates a beam for each channel and each reference signal by using signaling. Specifically, the network device separately indicates a beam for a channel state information reference signal (CSI-RS), a sounding reference signal (SRS), a demodulation reference signal (DMRS), a phase tracking reference signal (PTRS), a cell-specific reference signal (CRS), a time-frequency tracking reference signal (TRS), a physical uplink control channel (PUCCH), a physical uplink shared channel (PUSCH), a physical random access channel (PRACH), a physical downlink shared channel (PDSCH), a physical downlink control channel (PDCCH), or a physical broadcast channel (PBCH) by using different signaling. Because different signaling is used for all types of channels and reference signals, high signaling overheads are caused.

Therefore, embodiments of this application provide the beam-based communication method. A first beam is used for communication between a terminal device and a network device, and the first beam may be a downlink transmit beam/receive beam, or may be an uplink transmit beam/ receive beam. The first beam is for transmitting a plurality of channels and/or a plurality of reference signals. The plurality of channels or the plurality of reference signals for which the first beam is used are referred to as first channels or first reference signals. In this application, transmission may refer to sending or receiving. Specifically, the first beam is for transmitting the first channel and/or the first reference signal, and the transmission includes uplink transmission and downlink transmission. The first channel includes one or more of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH). The first reference signal includes one or more of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS). A plurality of types of channels and a plurality of types of reference signals may be transmitted by using a same type of beam.

For example, that a first beam is used for communication between a terminal device and a network device includes: The terminal device sends the first channel and/or the first reference signal by using the first beam; the terminal device receives the first channel and/or the first reference signal by using the first beam; the network device sends the first channel and/or the first reference signal by using the first beam; and/or the network device receives the first channel and/or the first reference signal by using the first beam.

For example, the terminal device receives the first PDCCH, the first PDSCH, and the like by using the first beam; and the terminal device sends the first PUCCH, the first PUSCH, and the first SRS by using the first beam.

It should be noted that the first beam may be a plurality of beams and/or a beam shared by a plurality of reference signals. For example, the first beam is a beam shared by the first channels and/or the first reference signals. The plurality of channels and/or the plurality of reference signals for which the first beam is used are not necessarily sent or received simultaneously.

The following describes the first beam in detail. For example, because the first beam may be used for the plurality of channels and the plurality of reference signals, the first beam may also be referred to as a common beam. First, some properties of the first beam provided in embodiments of this application are described.

The first beam is for transmitting one or more channels, one or more reference signals, and/or one or more messages. The channel, the reference signal, and the message include but are not limited to: a PDCCH, a PDSCH, a PUCCH, a PUSCH, a PRACH, a random access message 2, a random access message 3, a random access message 4, an SSB, a CSI-RS, a DMRS, a PTRS, a TRS, an SRS, or the like.

The first beam includes but is not limited to: a first beam shared by an uplink and a downlink, a first beam on an uplink, a first beam on a downlink, a first beam on a control channel, a first beam on a data channel, a first beam that is wide, or a first beam that is narrow. Specifically, classification is performed based on a usage scenario, and one or more of the following subcategories may be distinguished.

The first beam shared by the uplink and the downlink are for transmission of one or more channels on the uplink and the downlink, such as a PDCCH, a PDSCH, a PUCCH, and a PUSCH.

The first beam on the uplink is for transmission of a plurality of (or a plurality of types of) channels on the uplink, for example, a PUCCH and a PUSCH.

The first beam on the downlink is for transmission of a plurality of (or a plurality of types of) channels on the downlink, for example, a PDCCH and a PDSCH.

The first beam on the control channel is for transmission of a plurality of (or a plurality of types of) control channels, and the control channels include a PDCCH, a PUCCH, and the like.

The first beam on the data channel is for transmission of a plurality of (or a plurality of types of) data channels, and the data channels include a PDSCH, a PUSCH, and the like.

The first beam that is wide: First beams are classified into two types based on a beam coverage angle. A beam with a larger coverage angle is referred to as the first beam that is wide.

The first beam that is narrow: The first beams are classified into the two types based on the beam coverage angle. A beam with a smaller coverage angle is referred to as the first beam that is narrow.

The first beam in this application may be any one of the foregoing, or may be another type of first beam. This is not limited herein.

The first beam includes one or more beams, and the network device configures, activates, or indicates one first beam for the terminal device. For example, the first beam is the first beam shared by the uplink and the downlink. The network device may configure, activate, or indicate a plurality of first beams for the terminal device. The plurality of first beams are first beams of different types, for example, the first beam on the uplink and the first beam on the downlink, or the first beam on the control channel and the first beam on the data channel. Alternatively, the plurality of first beams may be first beams of a same type. That is, the plurality of first beams of the same type may be configured, activated, or indicated for the terminal device.

The first beam includes one or more of the following information: an identifier (ID) of the first beam, a logical cell ID, a physical cell ID, a BWP (bandwidth part) ID, a reference signal resource for determining an uplink beam, a reference signal resource for determining a downlink beam, a reference signal resource for determining an uplink-downlink beam, a quasi-colocation (QCL) type, and an uplink power control related parameter, where the uplink power control related parameter includes: a path loss measurement reference signal resource, p0, a closed loop index, or the like.

The first beam is a cell-level first beam, a cross-cell first beam, a BWP-level first beam, or a control-resource set (CORESET)-level first beam. Specifically, the cell-level first beam is one (or more) first beam for transmission of a plurality of channels (or reference signals or messages) in one cell. The cross-cell first beam is one (or more) first beam for transmission of a plurality of channels (or reference signals or messages) in a plurality of cells. The plurality of cells may be a plurality of cells within one band, or may be a plurality of cells across bands. The BWP-level first beam is a first beam that may be for transmission of a plurality of channels (or reference signals or messages) in one BWP. The CORESET-level first beam is a same (or more) first beam used for all PDCCHs corresponding to a CORESET, all PDSCHs scheduled by using a PDCCH of the CORESET, all PUSCHs scheduled by using the PDCCH of the CORESET, and/or a PUCCH/PUSCH for transmission of an acknowledgment (ACK) or a negative acknowledgment (NACK) of a PDSCH scheduled by using the PDCCH of the CORESET.

A priority of the first beam is higher than a priority of a normal beam; a priority of the first beam is equal to a priority of a normal beam; or a priority of the first beam is lower than a priority of a normal beam, where the normal beam is a beam indicated by a TCI-state or a spatial relation.

Specifically, the priority of the first beam is higher than the priority of the normal beam: If the network device configures, activates, or indicates the first beam, the first beam is applied to transmission of the first channel and the first reference signal. If the normal beam (the TCI-state or the spatial relation) is configured, activated, or indicated for the first channel and the first reference signal previously, the first beam covers the normal beam (the TCI-state or the spatial relation). The terminal device transmits the first channel and/or the first reference signal by using the normal beam.

The priority of the first beam is equal to the priority of the normal beam: The first beam and the normal beam may cover each other. That is, a beam (the first beam or the normal beam) that is configured, activated, or indicated later covers a beam (the first beam or the normal beam) that is configured, activated, or indicated earlier. For example, the normal beam is previously indicated for a channel, then the network device indicates the first beam for the channel, and the terminal device replaces the previous normal beam with the first beam. Alternatively, the first beam is previously indicated for a channel, then the network device indicates the normal beam for the channel, and the terminal device replaces the previous first beam with the normal beam.

For example, first, the network device indicates the first beam by using RRC, a MAC CE, or DCI. Then, when DCI for scheduling a PDSCH further indicates a normal beam (the TCI-state), the terminal device uses the TCI-state indicated by the DCI. When DCI does not indicate a normal beam, the first beam is used. Specifically, that the DCI does not indicate a normal beam includes that the DCI does not include a TCI field or that a TCI field value in the DCI is associated with no beam.

The priority of the first beam is lower than the priority of the normal beam: The normal beam may cover the first beam, but the first beam cannot cover the normal beam. Alternatively, the first beam can be applied only to a channel or a reference signal for which no normal beam is configured. For example, the network device indicates, to the terminal device, the first beam for transmitting a PDSCH. When the DCI does not indicate a normal beam of the PDSCH, the terminal device uses the first beam. When the DCI indicates a normal beam, the terminal device uses the indicated normal beam.

The normal beam is a beam for transmission of a single channel or reference signal in R15 and R16 protocols.

It should be noted that the first beam covers the normal beam, or the normal beam covers the first beam, and may cover only QCL information of typeD. In addition, the first beam may also be represented by using a TCI-state or a spatial relation. For example, the first beam on the downlink is represented by using the TCI-state. The first beam on the uplink is represented by using the spatial relation. Alternatively, the first beam may be represented by using another parameter indicating an uplink or downlink transmission beam.

Figure 5:
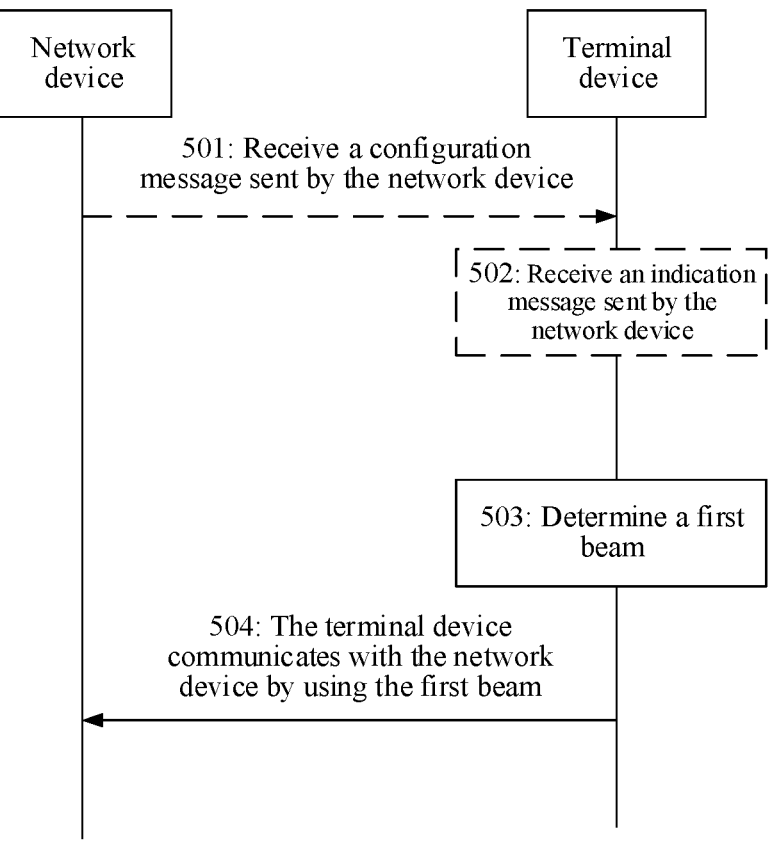
FIG. 5 is a schematic diagram of an embodiment of a beam-based communication method according to embodiments of this application.

Specifically, FIG. 5 is a schematic diagram of an embodiment of a beam-based communication method according to embodiments of this application. The beam-based communication method provided in this embodiment of this application includes the following steps.

500: A terminal device sends capability information to a network device.

In this embodiment, the terminal device sends the capability information to the network device, where the capability information includes one or both of the following: whether the terminal device supports use of a first beam, and a beam quantity of first beams supported by the terminal device, where the first beam includes one or more of the following: a first beam on an uplink, a first beam on a downlink, a first beam shared by the uplink and the downlink, a first beam on a control channel, or a first beam on a data channel. The beam quantity includes one or more of the following: a beam quantity corresponding to a single transmission reception point (TRP), a beam quantity corresponding to all TRPs, a beam quantity corresponding to a single cell, or a beam quantity corresponding to all cells. The corresponding beam quantity may be a quantity of configured beams, a quantity of activated beams, or a quantity of indicated beams.

It should be noted that step 500 is an optional step, and the network device may predetermine the capability information of the terminal device.

501: Receive a configuration message sent by the network device.

In this embodiment, the terminal device receives the configuration message sent by the network device. The configuration message is for configuring a parameter related to the first beam, including but not limited to a quantity of first beams, a type and usage of the first beam, and the like. The following separately provides descriptions.

Specifically, the terminal device determines, based on the configuration message, whether to use the first beam; or the terminal device determines, based on the configuration message, a first channel and/or a first reference signal for which the first beam is used.

In an optional implementation, the configuration message carries a first parameter, where the first parameter indicates whether the terminal device uses the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

Optionally, the first parameter may also be referred to as a switch of the first beam.

For example, the configuration message is RRC signaling. When the terminal device is configured to use a function of the first beam, the first parameter is configured to be in an on state. For example, the first parameter is "1". When the terminal device is configured not to use a function of the first beam, the first parameter is configured to be in an off state. For example, the first parameter is "0".

Specifically, when the first parameter (the switch) is configured as on, it indicates that the function of the first beam may be used. To be specific, the terminal device transmits the first channel and/or the first reference signal by using the first beam. When the first parameter (the switch) is configured as off, it indicates that the function of the first beam is not used. To be specific, the terminal device does not transmit the first channel and/or the first reference signal by using the first beam. When the first beam has a plurality of subcategories, whether to use a specific subcategory may be configured. For example, whether to use one or more of the following may be configured: the first beam shared by the uplink and the downlink, the first beam on the uplink, the first beam on the downlink, the first beam on the control channel, the first beam on the data channel, a first beam that is wide, or a first beam that is narrow.

The configuration message is for configuring the first parameter for one or more types of channels/reference signals, and the first parameter indicates whether the first beam is used for the one or more types of channels/reference signals. When the first parameter indicates that the first beam is used, the one or more types of channels/reference signals are the first channel/first reference signal. For example, the first parameter is configured in a configuration of a PDCCH, a PUCCH, a PDSCH, a PUSCH, a CSI-RS resource setting, a CSI-RS resource set, a CSI-RS resource, an SRS resource set, or an SRS resource. The first parameter indicates whether the first beam is used for the PDCCH, the PUCCH, the PDSCH, the PUSCH, the CSI-RS resource setting, the CSI-RS resource set, the CSI-RS resource, the SRS resource set, or the SRS resource. Alternatively, a channel and/or a reference signal for which the first beam is used are/is directly configured. For example, a set of first channels for which the first beam is used and/or a set of first reference signals for which the first beam is used are/is configured. The set of the first channels includes one or more channels, and the set of the first reference signals includes one or more reference signals.

An example in which the first parameter is for configuring whether the first beam is used for the PDCCH is used for description, and some fields of the configuration message are as follows:

```
"PDCCHConfig{
    CommonBeamEnabler{enabled, disabled}
}".
```

When a value of CommonBeamEnabler is configured as enabled, it indicates that the first beam is used for the PDCCH. When a value of CommonBeamEnabler is configured as disabled, it indicates that the first beam is not used for the PDCCH.

For example, the channel and/or the reference signal for which the first beam is used may alternatively be configured, and some fields of the configuration message are as follows:

"commonBeamEnabler{PDCCH, PDSCH, . . . }", indicating that channels for which the first beam is used include the PDCCH and the PDSCH.

In an optional implementation, the configuration message may further carry one or more beams included in the first beam, for example, carry an identifier or a parameter of the one or more beams included in the first beam. Specifically, the configuration message is also referred to as a set for configuring the first beam. The configuration message is for configuring one or more first beam sets for the terminal device. Different types of first beams belong to different sets. The network device may indicate a specific first beam set or a specific first beam in the first beam set by using another message. For example, the network device performs activation by using MAC CE signaling, and the MAC CE carries an ID of a specific first beam set that needs to be activated and/or an ID of a first beam that needs to be activated. "Activation" means indicating the terminal device to use the first beam.

One or more first beam sets may be configured in the configuration message, and each first beam set includes one or more first beams. Alternatively, one or more first beam sets are configured, each first beam set includes one or more first beam subsets, and each first beam subset includes one or more first beams. Each first beam set (or subset) corresponds to one type of channel, for example, the PDCCH, the PDSCH, the PUCCH, the PUSCH, an uplink channel, a downlink channel, the control channel, or the data channel.

Alternatively, each first beam set (or subset) corresponds to one type of reference signal, for example, a CSI-RS, an SSB, or an SRS.

For example, some fields of the configuration message are as follows:

"CommonBeamSetForPDCCH{
BeamID1, BeamID2}
CommonBeamSetForCSI-RS {
BeamID1, BeamID2}", where "BeamID1, BeamID2" is identifiers of first beams, and the foregoing fields indicate that the first channel and the first reference signal that are transmitted by using the first beam include the PDCCH and the CSI-RS.

In an optional implementation, the configuration message may further carry a type of the first channel (for example, an identifier of the first channel or a parameter of the first channel), and the configuration message may further carry a type of the first reference signal (for example, an identifier of the first reference signal or a parameter of the first reference signal).

Specifically, the configuration message is for configuring the first beam and the first reference signal and/or the first channel that are/is transmitted by using the first beam. Alternatively, the configuration message is for configuring the first reference signal and/or the first channel, and the first reference signal and/or the first channel are/is transmitted by using the first beam.

For example: 1. The first channel and/or the first reference signal are/is directly configured by using the configuration message. For example, first channels for which the first beam is used are directly configured as {PDCCH, PDSCH}. First channels may be separately configured for different types of first beams.

2. When the configuration message is for configuring the first channel and/or the first reference signal, the configuration message is further for configuring whether the first beam is used for the first channel and/or the first reference signal. For example, configuration message of a PDCCH includes a parameter for configuring whether the first beam is used for the PDCCH or whether the PDCCH is a target channel of the first beam.

In this embodiment of this application, for ease of description, a channel transmitted by using the first beam is referred to as the first channel, and a reference signal transmitted by using the first beam is referred to as the first reference signal. Specifically, a PDCCH transmitted by using the first beam is referred to as a first PDCCH, and a PUCCH transmitted by using the first beam is referred to as a first PUCCH. The rest may be deduced by analogy.

The following describes the first reference signal and the first channel by using examples. It should be noted that the first reference signal may further include another reference signal and another type of reference signal, and the first channel may further include another channel and another type of channel. This is not limited herein.

The first PDCCH includes one or more of the following, or a combination of a plurality of the following: a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In other words, the first PDCCH may include all types of PDCCHs, or include only a part of PDCCHs, and specifically include but is not limited to one or more of the following, or a combination of a plurality of the following: a PDCCH carrying a downlink control information (DCI) format 0-0/0-1/0-2/1-0/1-1/1-2/2-1/2-2/2-3/2-4/2-5/3-1/3-2, a PDCCH corresponding to a UE-specific search space, a PDCCH corresponding to a common search space, a PDCCH corresponding to a search space 0/CORESET 0, a PDCCH corresponding to searchSpaceSIB1/searchSpaceO-therSystemInformation/ra-SearchSpace, a PDCCH that overlaps with a specific channel or signal in time domain (where the first beam is used for the specific channel or signal), a PDCCH corresponding to a specific CORESET, or a PDCCH corresponding to a specific search space. The specific CORESET may be one CORESET/one group of CORESETs configured, activated, or indicated by the network device. The specific search space may be one search space/one group of search spaces configured, activated, or indicated by the network device.

Alternatively, the first PDCCH may be a combination of a plurality of the foregoing. For example, a combination of the PDCCH carrying the DCI format 0-0 and the PDCCH corresponding to the UE-specific search space is a PDCCH carrying the DCI format 0-0 and corresponding to the UE-specific search space.

The foregoing PDCCH may alternatively be replaced with a DMRS (demodulation reference signal) of the PDCCH.

The configuration message carries information about the first PDCCH, and the information about the first PDCCH includes but is not limited to a parameter of the first PDCCH or an identifier of the first PDCCH.

A first PDSCH includes one or more of the following, or a combination of a plurality of the following: a PDSCH scheduled by using a PDCCH for which the first beam is used, a PDSCH corresponding to a scheduling PDCCH that indicates no beam, a PDSCH corresponding to the sched-uling PDCCH that has no transmission configuration indi-cator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

Specifically, a TCI field has three bits, and there are eight field values in total. Each of the eight field values may correspond to one beam. Specifically, the eight beams respectively corresponding to the eight field values are indicated by MAC CE signaling. The MAC CE signaling may indicate a maximum of eight beams. If a quantity of indicated beams is less than 8, some TCI field values do not have corresponding beams. In other words, the TCI field values are associated with no beam herein.

In other words, the first PDSCH includes all types of PDSCHs, or includes only a part of PDSCHs, and specifi-cally includes but is not limited to one or more of the following, or a combination of a plurality of the following: the PDSCH scheduled by using the PDCCH for which the first beam is used, the PDSCH scheduled by using the DCI format 1-0, a PDSCH scheduled by using DCI format 1-1, the PDSCH scheduled by using the DCI format 1-2, a PDSCH for which a beam is indicated (for example, a PDSCH scheduled by using DCI carrying the TCI field value), a PDSCH for which no beam is indicated (for example, the PDSCH scheduled by using the DCI format 1-0 or a PDSCH scheduled by using DCI having no TCI field), a PDSCH whose time interval with the scheduling PDCCH is less than a threshold (for example, TimeDuration-ForQCL), or a PDSCH that overlaps with a specific channel or signal in time domain (where the first beam is used for the specific channel or signal).

The first PDSCH may alternatively be a combination of a plurality of the foregoing. For example, a combination of the PDSCH scheduled by using the DCI format 1-1 and the PDSCH for which no beam is indicated is a PDSCH scheduled by using the DCI format 1-1 and for which no beam is indicated.

The foregoing PDSCH may alternatively be replaced with a DMRS of the PDSCH or a phase tracking reference signal (PTRS) of the PDSCH.

The configuration message carries information about the first PDSCH, and the information about the first PDSCH includes but is not limited to a parameter of the first PDSCH or an identifier of the first PDSCH.

A first CSI-RS includes one or more of the following: a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is nonCodebook.

In other words, the first CSI-RS includes all types of CSI-RSs, or includes only a part of CSI-RSs, and specifically includes but is not limited to one or more of the following, or a combination of a plurality of the following: a CSI-RS in a resource set for which a repetition parameter is configured, the CSI-RS in the resource set whose repetition parameter is configured as on, a CSI-RS in a resource set whose repetition parameter is configured as off, a CSI-RS in a resource set for which a trs-info parameter is configured, the CSI-RS in the resource set for which no repetition parameter and no trs-info parameter are configured, a CSI-RS for mobility (a CSI-RS for layer 3 mobility measurement), the CSI-RS for which no beam information is configured, a CSI-RS for which beam information is configured, a periodic CSI-RS, a semi-persistent (SP) CSI-RS, an aperiodic CSI-RS, a CSI-RS for reference signal received power (RSRP) or signal to interference plus noise ratio (SINR) measurement, or a CSI-RS for channel state information (CSI), channel quality identifier (CQI), precoding matrix indicator (PMI), or channel rank identifier (RI) measurement.

The first CSI-RS may alternatively be a combination of a plurality of the foregoing. For example, a combination of the CSI-RS in the resource set for which the repetition parameter is configured and the periodic CSI-RS is a periodic CSI-RS for which the repetition parameter is configured.

The configuration message carries information about the first CSI-RS, and the information about the first CSI-RS includes but is not limited to a parameter of the first CSI-RS or an identifier of the first CSI-RS.

A first SRS includes one or more of the following: an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In other words, the first SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message carries information about the first SRS, and the information about the first SRS includes but is not limited to a parameter of the first SRS or an identifier of the first SRS.

The first PUCCH includes all types of PUCCHs, or includes only a part of PUCCHs, and specifically includes but is not limited to one or more of the following, or a combination of a plurality of the following: a PUCCH format 0, a PUCCH format 1, a PUCCH format 2, a PUCCH format 3, a PUCCH format 4, a PUCCH carrying a HARQ ACK/NACK, a PUCCH carrying an SR (scheduling request), a PUCCH carrying a CSI (channel state information) measurement result, a PUCCH carrying ACK/NACK information and a scheduling request (SR), a PUCCH carrying ACK/NACK information and a CSI measurement result, a PUCCH carrying ACK/NACK information+an SR+a CSI measurement result, a long PUCCH, a short PUCCH, a PUCCH carrying ACK/NACK information of a PDSCH that is sent by using the first beam, a PUCCH carrying ACK/NACK information of a PDSCH scheduled by using a PDCCH that is sent by using the first beam, a PUCCH that overlaps with a specific channel or signal in time domain (where the first beam is used for the specific channel or signal), a PUCCH for which no beam is configured, activated, or indicated, or a PUCCH for which no path loss measurement resource is configured, activated, or indicated.

Alternatively, the first PUCCH may be a combination of a plurality of the foregoing. For example, a combination of the PUCCH format 0 and the PUCCH carrying the hybrid automatic repeat request (HARQ) ACK/NACK is a PUCCH format 0 carrying the HARQ ACK/NACK.

The foregoing PUCCH may alternatively be replaced with a DMRS of the PUCCH.

The configuration message carries information about the first PUCCH, and the information about the first PUCCH includes but is not limited to a parameter of the first PUCCH or an identifier of the first PUCCH.

A first PUSCH includes all types of PUSCHs, or includes only a part of PUSCHs, and specifically includes but is not limited to one or more of the following, or a combination of a plurality of the following: a PUSCH scheduled by using a PDCCH for which the first beam is used, a PUSCH scheduled by using DCI 0-0, a PUSCH scheduled by using DCI 0-1, a PUSCH scheduled by using DCI 0-2, a PUSCH in codebook mode, a PUSCH in nonCodebook mode, a PUCCH scheduled by using DCI including no uplink beam indication field/SRI field, a PUCCH for which no beam is configured, activated, or indicated, a PUCCH for which no path loss measurement resource is configured, activated, or indicated, or a PUSCH that overlaps with a specific channel or signal in time domain (where the first beam is used for the specific channel or signal).

The first PUSCH may alternatively be a combination of a plurality of the foregoing. For example, a combination of the PUSCH in codebook mode and the PUSCH scheduled by using the DCI 0-0 is a PUSCH that is in codebook mode and that is scheduled by using the DCI 0-0.

The foregoing PUSCH may alternatively be replaced with a DMRS/PTRS of the PUSCH.

The configuration message carries information about the first PUSCH, and the information about the first PUSCH includes but is not limited to a parameter of the first PUSCH or an identifier of the first PUSCH.

A first SSB includes all types of SSBs, or includes only a part of SSBs, and specifically includes but is not limited to one or more of the following, or a combination of a plurality of the following: an SSB for mobility (a CSI-RS for layer 3 mobility measurement), an SSB for RSRP/SINR measurement, an SSB for CQI/PMI measurement, an SSB for which no QCL information is configured, a periodic SSB, or an aperiodic SSB.

The configuration message carries information about the first SSB, and the information about the first SSB includes but is not limited to a parameter of the first SSB or an identifier of the first SSB.

Specifically, the configuration message is one or more of a radio resource control (RRC) message, a medium access control-control element (MAC CE) message, or downlink control information (DCI). A function of the foregoing configuration message may be implemented by using one configuration message, or may be implemented by using a plurality of configuration messages. This is not limited herein.

It should be noted that, when the first beam and the first channel and/or the first reference signal are preconfigured for the terminal device, step 501 is not performed.

502: Receive an indication message sent by the network device.

In this embodiment, the network device may further indicate, to the terminal device by using the indication message, the type of the first reference signal for which the first beam is used and/or the type of the first channel for which the first beam is used. The terminal device determines, based on the indication message, the first beam to be configured, activated, or indicated.

Optionally, the indication message may be RRC signaling, MAC CE signaling, or DCI signaling. The indication message may alternatively be other signaling. This is not limited herein.

When the indication message is the MAC CE signaling, one piece of MAC CE signaling may indicate one first beam. Alternatively, one MAC CE can indicate only one type of first beam. For example, a dedicated MAC CE indicates the first beam on the downlink, and a dedicated MAC CE indicates the first beam on the uplink. Alternatively, one MAC CE can indicate only first beams from a same first beam set. For example, the MAC CE indicates an ID of the first beam set of the first beams and IDs of the first beams in the set. Alternatively, one MAC CE may indicate a plurality of types of first beams. For example, the MAC CE indicates both the first beam on the uplink and the first beam on the downlink. Alternatively, one MAC CE includes one bitmap, each bit corresponds to one first beam, and a bit value 1 indicates to use a corresponding first beam.

When the indication message is the DCI signaling, the DCI signaling may indicate the first beam by using one beam indication field. The beam indication field may specifically indicate the first beam, or may indicate the first beam or a normal beam. The terminal device needs to determine whether the beam indication field indicates the first beam or the normal beam. Specifically, the beam indication field may be a transmission configuration indicator (TCI) field.

Specifically, when a first condition is satisfied, the beam indication field indicates the first beam. That is, a value of the beam indication field corresponds to one of a plurality of first beams configured by using RRC/activated by using a MAC CE. When a second condition is satisfied, the beam indication field indicates the normal beam (or a PDSCH beam). That is, a value of the beam indication field corresponds to one of a plurality of PDSCH beams/TCI-states configured by using RRC or activated by using a MAC CE. Lengths of the beam indication field may be different when the beam indication field indicates the first beam (when the first condition is satisfied) and when the beam indication field indicates the normal beam (when the second condition is satisfied). For example, when the beam indication field indicates the normal beam, a length of this field is 3 bits; or when the beam indication field indicates the first beam, a length of this field is not equal to 3 bits, for example, greater than 3 bits. Alternatively, when the beam indication field indicates the first beam, the beam indication field and another field are combined to form a longer field to indicate the first beam.

The first condition includes but is not limited to one of the following, or a combination of a plurality of the following:
the first beam is configured for the terminal device;
the terminal device is configured with the first channel that includes the first PDSCH;
the first beam is for PDSCH transmission;
PDSCH transmission is not scheduled by using the DCI;
a frequency domain resource assignment field value in the DCI is all 0s;
a one-shot HARQ-ACK request does not exist or a value thereof is all 0s;
a value of a one-shot HARQ-ACK request is not all 0s; or
a value of a first field carried in the DCI indicates that the TCI field indicates the first beam, and the first field indicates a function of the TCI field.

The second condition may be a reverse of the first condition. That is, the second condition is naturally satisfied if the first condition is not satisfied. The second condition may also include but is not limited to one or more of the following:
the first beam is not configured for the terminal device;
the first channel is not configured for the terminal device;
the first beam is not used for PDSCH transmission;
PDSCH transmission is scheduled by using the DCI;
a frequency domain resource assignment field value in the DCI is not all 0s;
a one-shot HARQ-ACK request does not exist or a value thereof is all 0s;
a value of a one-shot HARQ-ACK request is not all 0s; or
a value of a first field carried in the DCI indicates that the TCI field indicates a normal beam.

In another optional implementation, the DCI further carries a second field, the second field indicates a function of the DCI, and the function of the DCI includes one or more of the following: indicating the first beam, scheduling a PDSCH, or indicating the first channel.

A plurality of fields may be combined to indicate the first beam. The plurality of fields include but are not limited to one or more of the following: the TCI field, the beam indication field, a first beam indication field (for example, the first field), a frequency domain resource assignment field, a time domain resource assignment field, a modulation and coding scheme (MCS) field, a new data indicator (NDI) field, a redundancy version (RV) field, a hybrid automatic repeat request (HARQ) process field, a downlink assignment index field, a physical uplink control channel (PUCCH) resource field, a hybrid automatic repeat request (HARQ) feedback time indicator field, an antenna port, DMRS sequence initialization, or the like.

Indicating a common beam in combination with the plurality of fields needs a condition, and the first condition may be used. Alternatively, one or more of the following conditions, or a combination of a plurality of the following conditions may be used: The time domain resource assignment field is all 0s, the time domain resource assignment field is all 1s, the frequency domain resource assignment field is all 0s, the frequency domain resource assignment field is all 1s, the one-shot HARQ-ACK request field is 0, no one-shot HARQ-ACK request field in the DCI is 0, the HARQ process field is all 0s, the HARQ process field is all 1s, the RV field is all 0s, the RV field is all 1s, an MCS index indicated by the MCS field is X (where X may be any one of 0 to 63), the TCI field is all 0s, or the TCI field is all 1s.

It should be noted that different types of first beams may be indicated by different signaling. For example, the first beam on the uplink is indicated by DCI for scheduling uplink transmission. The first beam on the downlink is indicated by DCI for scheduling downlink transmission.

In an optional implementation, the network device may further release/deactivate, by using RRC/MAC CE/DCI signaling, the previously configured, activated, or indicated first beam, that is, cancel the previously configured, activated, or indicated first beam.

Optionally, when the first beam and the first channel and/or the first reference signal are configured for the terminal device, step 503 is not performed.

503: Determine the first beam.

In this embodiment, the terminal device determines the first beam.

In an optional implementation, the terminal device determines the first beam based on the configuration message. The terminal device determines, based on the indication message, the first beam to be configured, activated, or indicated.

In another optional implementation, when the to-be-used first beam and the first reference signal and/or the first channel that are/is transmitted by using the first beam are preconfigured for the terminal device, the terminal device determines the first beam based on preconfigured information. The preconfigured information in the terminal device is specifically as follows:

Specifically, the preconfigured information carries information about the first reference signal and/or information about the first channel. The information about the first reference signal includes but is not limited to the parameter of the first reference signal or the identifier of the first reference signal. The information about the first channel includes but is not limited to the parameter of the first channel or the identifier of the first channel.

In an optional implementation, the terminal device determines, based on a type of a reference signal resource included in the first beam, whether the first beam is for transmitting a PUSCH, where the type of the reference signal resource indicates whether the first beam is for transmitting the PUSCH.

For example, if a reference signal resource that is included in the first beam and that indicates a beam is an uplink resource, for example, an SRS, the first beam is for transmitting the PUSCH. That is, the first beam may be used for the PUSCH. If a reference signal resource that is included in the first beam and that indicates a beam is a downlink resource, for example, a CSI-RS/an SSB, the first beam is not for transmitting the PUSCH. That is, the first beam is not used for the PUSCH.

If the reference signal resource that is included in the first beam and that indicates the beam is the uplink resource (for example, the SRS), and DCI for scheduling the PUSCH does not indicate the SRS, information such as a beam and/or a precoding matrix for uplink transmission is determined, for PUSCH transmission, with reference to the SRS resource in the first beam.

If the reference signal resource that is included in the first beam and that indicates the beam is the downlink resource (for example, the CSI-RS/the SSB), and DCI for scheduling the PUSCH indicates an SRS, information such as a beam and/or a precoding matrix for uplink transmission is determined, for PUSCH transmission, with reference to the SRS resource indicated by the DCI.

If the reference signal resource that is included in the first beam and that indicates the beam is the SRS, and DCI for scheduling the PUSCH indicates the SRS, information such as a beam and/or a precoding matrix for uplink transmission is determined, for PUSCH transmission, with reference to the SRS resource indicated by the DCI. That is, the SRS resource indicated in the DCI has a higher priority.

If the reference signal resource that is included in the first beam and that indicates the beam is the SRS, and DCI for scheduling the PUSCH indicates the SRS, information such as a beam and/or a precoding matrix for uplink transmission is determined, for PUSCH transmission, with reference to that the reference signal resource that is included in the first beam and that indicates the beam is the SRS. That is, the reference signal resource that is included in the first beam and that indicates the beam is the SRS resource, and has a higher priority.

In an implementation, it is stipulated that a case in which a reference signal resource that is included in the first beam and that indicates a beam is a downlink resource (for example, a CSI-RS/an SSB) and DCI for scheduling the PUSCH does not indicate an SRS cannot occur.

In an implementation, it is stipulated that if the first beam is specified for transmission of a PUSCH, and DCI for scheduling the PUSCH indicates an SRS, a transmit beam of the SRS needs to be the same as the first beam.

Optionally, if a reference signal resource that is included in the configured, activated, or indicated first beam and that indicates a beam is an uplink resource, for example, an SRS, DCI for scheduling the PUSCH does not indicate (or may not indicate) the SRS resource. Information such as a beam and/or a precoding matrix for uplink transmission is determined, for PUSCH transmission, with reference to the SRS resource in the first beam. If a reference signal resource that is included in the configured, activated, or indicated first beam and that indicates a beam is a downlink resource, for example, a CSI-RS/an SSB, DCI for scheduling the PUSCH needs to indicate an SRS resource. Information such as a beam and/or a precoding matrix for uplink transmission is determined, for PUSCH transmission, with reference to the SRS resource indicated by the DCI.

Optionally, the first beam may not be directly specified for the PUSCH. A beam corresponding to the SRS indicated in the scheduling DCI is always used for the PUSCH, and the first beam may be indicated for the SRS (for example, an SRS whose type is codebook/nonCodebook). In this way, the first beam may be used for the PUSCH.

In another optional implementation, in addition to directly configuring which channels are first channels and/or which reference signals are first reference signals, which channels and/or which reference signals cannot be transmitted by using the first beam may be stipulated by using an exclusion method. Specifically, it may be stipulated that one or more of the following channels and/or reference signals cannot be transmitted by using the first beam: a second PDCCH, a second PDSCH, a second PUCCH, a second PUSCH, a second CSI-RS, a second SRS, and a second SSB.

It should be noted that "cannot be transmitted by using the first beam" is also referred to as "the first beam is not used".

The second PDCCH includes one or more of the following, or a combination of a plurality of the following: a PDCCH corresponding to a UE-specific search space, a PDCCH corresponding to a control-resource set (CORESET) other than a control-resource set (CORESET) 0, a PDCCH overlapping, in time domain, with another channel for which no first beam is used, a PDCCH overlapping, in time domain, with another reference signal for which no first beam is used, a PDCCH corresponding to a specific-format search space configured by the network device, or a PDCCH corresponding to a specific-format CORESET configured by the network device.

In other words, the second PDCCH may include all types of PDCCHs, or include only a part of PDCCHs, and specifically include but is not limited to one or more of the following, or a combination of a plurality of the following: a PDCCH carrying a downlink control information (DCI) format 0-0/0-1/0-2/1-0/1-1/1-2/2-1/2-2/2-3/2-4/2-5/3-1/3-2, a PDCCH corresponding to a UE-specific search space, a PDCCH corresponding to a common search space, a PDCCH corresponding to a search space 0/CORESET 0, a PDCCH corresponding to searchSpaceSIB1/searchSpaceOtherSystemInformation/ra-SearchSpace, a PDCCH that overlaps with a specific channel or signal in time domain (where the first beam is not used for the specific channel or signal), a PDCCH corresponding to a specific CORESET, or a PDCCH corresponding to a specific search space. The specific CORESET may be one CORESET/one group of CORESETs configured, activated, or indicated by the network device. The specific search space may be one search space/one group of search spaces configured, activated, or indicated by the network device.

Alternatively, the second PDCCH may be a combination of a plurality of the foregoing. For example, a combination of the PDCCH carrying the DCI format 0-0 and the PDCCH corresponding to the UE-specific search space is a PDCCH carrying the DCI format 0-0 and corresponding to the UE-specific search space.

The foregoing PDCCH may alternatively be replaced with a DMRS (demodulation reference signal) of the PDCCH.

The configuration message carries information about the second PDCCH, and the information about the second PDCCH includes but is not limited to a parameter of the second PDCCH or an identifier of the second PDCCH.

The second PDSCH includes one or more of the following, or a combination of a plurality of the following: a PDSCH scheduled by using a PDCCH for which no first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which no first beam is used, a PDSCH overlapping, in time domain, with another reference signal for which no first beam is used, or a specific-format PDSCH configured by the network device, where the scheduling PDCCH is a PDCCH for scheduling a PDSCH.

Specifically, a TCI field has three bits, and there are eight field values in total. Each of the eight field values may correspond to one beam. Specifically, the eight beams respectively corresponding to the eight field values are indicated by MAC CE signaling. The MAC CE signaling may indicate a maximum of eight beams. If a quantity of indicated beams is less than 8, some TCI field values do not have corresponding beams. In other words, the TCI field values are associated with no beam herein.

In other words, the second PDSCH may include all types of PDSCHs, or include only a part of PDSCHs, and specifically include but is not limited to one or more of the following, or a combination of a plurality of the following: the PDSCH scheduled by using the PDCCH for which no first beam is used, the PDSCH scheduled by using the DCI format 1-0, a PDSCH scheduled by using DCI format 1-1, the PDSCH scheduled by using the DCI format 1-2, a PDSCH for which a beam is indicated (for example, a PDSCH scheduled by using DCI carrying the TCI field value), a PDSCH for which no beam is indicated (for example, the PDSCH scheduled by using the DCI format 1-0 or a PDSCH scheduled by using DCI having no TCI field), a PDSCH whose time interval with the scheduling PDCCH is less than a threshold (for example, TimeDurationForQCL), or a PDSCH that overlaps with a specific channel or signal in time domain (where no first beam is used for the specific channel or signal).

The second PDSCH may alternatively be a combination of a plurality of the foregoing. For example, a combination of the PDSCH scheduled by using the DCI format 1-1 and the PDSCH for which no beam is indicated is a PDSCH scheduled by using the DCI format 1-1 and for which no beam is indicated.

The foregoing PDSCH may alternatively be replaced with a DMRS of the PDSCH or a phase tracking reference signal (PTRS) of the PDSCH.

The configuration message carries information about the second PDSCH, and the information about the second PDSCH includes but is not limited to a parameter of the second PDSCH or an identifier of the second PDSCH.

The second CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In other words, the second CSI-RS includes all types of CSI-RSs, or includes only a part of CSI-RSs, and specifically includes but is not limited to one or more of the following, or a combination of a plurality of the following: a CSI-RS in a resource set for which a repetition parameter is configured, the CSI-RS in the resource set whose repetition parameter is configured as on, a CSI-RS in a resource set whose repetition parameter is configured as off, a CSI-RS in a resource set for which a trs-info parameter is configured, the CSI-RS in the resource set for which no repetition parameter and no trs-info parameter are configured, a CSI-RS for mobility (a CSI-RS for layer 3 mobility measurement), the CSI-RS for which no beam information is configured, a CSI-RS for which beam information is configured, a periodic CSI-RS, a semi-persistent (SP) CSI-RS, an aperiodic CSI-RS, a CSI-RS for reference signal received power (RSRP) or signal to interference plus noise ratio (SINR) measurement, or a CSI-RS for channel state information (CSI), channel quality identifier (CQI), precoding matrix indicator (PMI), or channel rank identifier (RI) measurement.

The second CSI-RS may alternatively be a combination of a plurality of the foregoing. For example, a combination of the CSI-RS in the resource set for which the repetition parameter is configured and the periodic CSI-RS is a periodic CSI-RS for which the repetition parameter is configured.

The configuration message carries information about the second CSI-RS, and the information about the second CSI-RS includes but is not limited to a parameter of the second CSI-RS or an identifier of the second CSI-RS.

The second SRS includes one or more of the following: an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In other words, the second SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message carries information about the second SRS, and the information about the second SRS includes but is not limited to a parameter of the second SRS or an identifier of the second SRS.

The second PUCCH includes all types of PUCCHs, or includes only a part of PUCCHs, and specifically includes but is not limited to one or more of the following, or a combination of a plurality of the following: a PUCCH format 0, a PUCCH format 1, a PUCCH format 2, a PUCCH format 3, a PUCCH format 4, a PUCCH carrying a HARQ ACK/NACK, a PUCCH carrying an SR (scheduling request), a PUCCH carrying a CSI (channel state information) measurement result, a PUCCH carrying ACK/NACK information and a scheduling request (SR), a PUCCH carrying ACK/NACK information and a CSI measurement result, a PUCCH carrying ACK/NACK information+an SR+a CSI measurement result, a long PUCCH, a short PUCCH, a PUCCH carrying ACK/NACK information of a PDSCH that is not sent by using the first beam, a PUCCH carrying ACK/NACK information of a PDSCH scheduled by using a PDCCH that is not sent by using the first beam, a PUCCH that overlaps with a specific channel or signal in time domain (where no first beam is used for the specific channel or signal), a PUCCH for which no beam is configured, activated, or indicated, or a PUCCH for which no path loss measurement resource is configured, activated, or indicated.

Alternatively, the second PUCCH may be a combination of a plurality of the foregoing. For example, a combination of the PUCCH format 0 and the PUCCH carrying the hybrid automatic repeat request (HARQ) ACK/NACK is a PUCCH format 0 carrying the HARQ ACK/NACK.

The foregoing PUCCH may alternatively be replaced with a DMRS of the PUCCH.

The configuration message carries information about the second PUCCH, and the information about the second PUCCH includes but is not limited to a parameter of the second PUCCH or an identifier of the second PUCCH.

The second PUSCH includes all types of PUSCHs, or includes only a part of PUSCHs, and specifically includes but is not limited to one or more of the following, or a combination of a plurality of the following: a PUSCH scheduled by using a PDCCH for which no first beam is used, a PUSCH scheduled by using DCI 0-0, a PUSCH scheduled by using DCI 0-1, a PUSCH scheduled by using DCI 0-2, a PUSCH in codebook mode, a PUSCH in non-Codebook mode, a PUCCH scheduled by using DCI including no uplink beam indication field/SRI field, a PUCCH for which no beam is configured, activated, or indicated, a PUCCH for which no path loss measurement resource is configured, activated, or indicated, or a PUSCH that overlaps with a specific channel or signal in time domain (where no first beam is used for the specific channel or signal).

The second PUSCH may alternatively be a combination of a plurality of the foregoing. For example, a combination of the PUSCH in codebook mode and the PUSCH scheduled by using the DCI 0-0 is a PUSCH that is in codebook mode and that is scheduled by using the DCI 0-0.

The foregoing PUSCH may alternatively be replaced with a DMRS/PTRS of the PUSCH.

The configuration message carries information about the second PUSCH, and the information about the second PUSCH includes but is not limited to a parameter of the second PUSCH or an identifier of the second PUSCH.

The second SRS includes but is not limited to an SRS whose type or usage is beam management.

In other words, the second SRS includes all types of SRSs, or includes only a part of SRSs, and specifically includes but is not limited to one or more of the following, or a combination of a plurality of the following: the SRS whose type (or usage) is codebook, the SRS whose type (or usage) is nonCodebook, an SRS whose type (or usage) is beam management, the SRS whose type (or usage) is antenna switch, a periodic SRS, a semi-persistent SRS, an aperiodic SRS, the SRS for which no beam information is configured, an SRS for which beam information is configured, the SRS for which no path loss measurement resource is configured, or an SRS for which a path loss measurement resource is configured.

The configuration message carries information about the second SRS, and the information about the second SRS includes but is not limited to a parameter of the second SRS or an identifier of the second SRS.

The second SSB includes all types of SSBs, or includes only a part of SSBs, and specifically includes but is not limited to one or more of the following, or a combination of a plurality of the following: an SSB for mobility (a CSI-RS for layer 3 mobility measurement), an SSB for RSRP/SINR measurement, an SSB for CQI/PMI measurement, an SSB for which no QCL information is configured, a periodic SSB, or an aperiodic SSB.

The configuration message carries information about the second SSB, and the information about the second SSB includes but is not limited to a parameter of the second SSB or an identifier of the second SSB.

In another optional implementation, the network device sends an indication message to the terminal device, where the indication message dynamically indicates the first channel and/or the first reference signal for which the first beam is used. The indication message is MAC CE signaling or DCI signaling.

Specifically, the indication message carries a bitmap, and each bit in the bitmap corresponds to one channel, or each bit corresponds to one reference signal. Whether the channel is the first channel and/or whether the reference signal is the first reference signal are/is determined based on a value of the bit in the bitmap. For example, a first bit in the bitmap carried in the indication message corresponds to a PUCCH. When the first bit is 1, the indication message indicates the PUCCH to be transmitted by using the first beam. When the first bit is 0, the indication message indicates the PUCCH not to be transmitted by using the first beam.

It should be noted that the plurality of implementations in step 503 may be combined for implementation. For example, the indication message indicates that the first beam is used for the PDCCH. However, specific types of PDCCHs for which the first beam may be used is determined by using preconfigured information in the terminal device.

504: The terminal device communicates with the network device by using the first beam.

In this embodiment of this application, the terminal device communicates with the network device by using the first beam. The first beam is for transmitting the first reference signal and/or the first channel. The first channel includes a plurality of the following: the first physical downlink control channel (PDCCH), the first physical downlink shared channel (PDSCH), the first physical uplink control channel (PUCCH), the first physical uplink shared channel (PUSCH), a first physical broadcast channel (PBCH), or a first physical random access channel (PRACH). The first reference signal includes a plurality of the following: the first synchronization signal/physical broadcast channel block (SSB), the first channel state information reference signal (CSI-RS), the first sounding reference signal (SRS), a first demodulation reference signal (DMRS), a first phase tracking reference signal (PTRS), a first cell-specific reference signal (CRS), or a first time-frequency tracking reference signal (TRS). Therefore, Implementation is effectively simplified and signaling overheads are reduced compared with those in an existing procedure.

A default beam of each channel (or reference signal) is stipulated in the 3GPP R15 protocol. A specific definition of the default beam is as follows: When the network device does not explicitly indicate a beam for a channel (or reference signal), a corresponding default beam is used for transmission. For example, when DCI for scheduling a PDSCH does not include a TCI field, a default beam is used for transmitting the PDSCH.

Based on the embodiment shown in FIG. 5, the following describes a usage rule applied to a default beam of each channel (or reference signal) after the network device indicates, activates, or configures the first beam for the terminal device. Details are as follows.

1. Default Beam of a PDSCH:

If the first beam or the first beam on the downlink is configured, activated, or indicated for the terminal device, the first beam or the first beam on the downlink is used as a receive beam of the PDSCH. That is, the terminal assumes that the PDSCH and the first beam or the first beam on the downlink have a same receive beam. In other words, when a third condition is satisfied, the terminal device uses the first beam or the first beam on the downlink as the receive beam of the PDSCH. The third condition includes but is not limited to one or more of the following conditions:

the first beam or the first beam on the downlink is configured, activated, or indicated for the terminal device;

the terminal device is configured to support use of the first beam as the default beam;

the terminal device is configured to support use of the first beam;

the terminal device is configured with the PDSCH that supports use of the first beam;

the PDSCH supports use of the first beam;

the terminal device is configured to support use of the first beam as the default beam of the PDSCH;

the PDSCH is a target channel of the first beam;

at least one TCI-state includes QCL-info of typeD;

DCI for scheduling the PDSCH indicates no TCI-state or has no TCI field; or a time interval between DCI for scheduling the PDSCH and the PDSCH is less than a preset threshold, for example, TimeDurationForQCL.

2. Default Beam of a PUCCH:

If the first beam or the first beam on the uplink is configured, activated, or indicated for the terminal device, the first beam or the first beam on the uplink is used as a transmit beam of the PUCCH. That is, the terminal assumes that the PUCCH and the first beam or the first beam on the uplink have a same transmit beam. In other words, when a fourth condition is satisfied, the terminal device uses the first beam or the first beam on the uplink as the transmit beam of the PUCCH. The fourth condition includes but is not limited to one or more of the following conditions:

the first beam or the first beam on the uplink is configured, activated, or indicated for the terminal device;

the terminal device is configured to support use of the first beam as the default beam;

the terminal device is configured to support use of the first beam;

the terminal device is configured with the PUCCH that supports use of the first beam;

the PUCCH supports use of the first beam;

the terminal device is configured to support use of the first beam as the default beam of the PUCCH;

the terminal device is configured to support use of a reference signal on the first beam as a path loss measurement reference signal;

the terminal device is configured to support use of a reference signal on the first beam as a path loss measurement reference signal of the PUCCH;

the PUCCH is a target channel of the first beam;

there is no corresponding beam for the PUCCH, for example, no beam is configured, activated, or indicated for the PUCCH;

there is no corresponding path loss measurement resource for the PUCCH, for example, no path loss measurement resource is configured, activated, or indicated for the PUCCH; or a reference signal resource on the first beam is a downlink reference signal resource.

Further, when the first beam or the first beam on the uplink is used as the transmit beam of the PUCCH, a reference signal resource on the first beam or the first beam on the uplink may further be used as the path loss measurement resource.

Further, the path loss measurement resource of the PUCCH may be further determined by using the first beam or the first beam on the uplink. In other words, when a fifth condition is satisfied, a downlink reference signal resource included in the first beam or the first beam on the uplink or a downlink reference signal resource corresponding to an uplink reference signal resource included in the first beam or the first beam on the uplink is used as the path loss measurement resource. The fifth condition includes but is not limited to one or more of the following conditions:

the first beam or the first beam on the uplink is configured, activated, or indicated for the terminal device;

the terminal device is configured to support use of the first beam as the default beam;

the terminal device is configured to support use of the first beam as the default beam of the PUCCH;

the terminal device is configured to support use of the first beam;

the terminal device is configured with the PUCCH that supports use of the first beam;

the PUCCH supports use of the first beam;

the terminal device is configured to support use of a reference signal on the first beam as a path loss measurement reference signal;

the terminal device is configured to support use of a reference signal on the first beam as a path loss measurement reference signal of the PUCCH;

the PUCCH is a target channel of the first beam;

there is no corresponding beam for the PUCCH, for example, no beam is configured, activated, or indicated for the PUCCH;

there is no corresponding path loss measurement resource for the PUCCH, for example, no path loss measurement resource is configured, activated, or indicated for the PUCCH;

a reference signal resource on the first beam is a downlink reference signal resource; or a reference signal resource on the first beam is an uplink reference signal resource, and the uplink reference signal is associated with a downlink reference signal.

The PUCCH in the foregoing solution may be replaced with an SRS, and the SRS includes but is not limited to one or more of the following: an SRS whose usage parameter value is codebook, an SRS whose usage parameter value is nonCodebook, an SRS whose usage parameter value is antennaSwitch, and an SRS whose usage parameter value is BeamManagement.

3. Default Beam of a PUSCH:

If the first beam or the first beam on the uplink is configured, activated, or indicated for the terminal device, the first beam or the first beam on the uplink is used as a transmit beam of the PUSCH. That is, the terminal assumes that the PUSCH and the first beam or the first beam on the uplink have a same transmit beam. In other words, when a sixth condition is satisfied, the terminal device uses the first beam or the first beam on the uplink as the transmit beam of the PUSCH. The sixth condition includes but is not limited to one or more of the following conditions:

the first beam or the first beam on the uplink is configured, activated, or indicated for the terminal device;

the terminal device is configured to support use of the first beam as the default beam;

the terminal device is configured to support use of the first beam as the default beam of the PUSCH;

the terminal device is configured to support use of the first beam;

the terminal device is configured with the PUSCH that supports use of the first beam;

the PUSCH supports use of the first beam;

the terminal device is configured to support use of a reference signal on the first beam as a path loss measurement reference signal;

the terminal device is configured to support use of a reference signal on the first beam as a path loss measurement reference signal of the PUSCH;

the PUSCH is a target channel of the first beam;

there is no corresponding beam for the PUSCH;

the PUSCH is scheduled by using DCI 0-0;

the PUSCH is scheduled by using DCI 0-1, and the DCI 0-1 does not include an SRI or a beam indication field;

no PUCCH is configured for a cell corresponding to the PUSCH;

no beam is configured, activated, or indicated for a PUCCH configured for a cell corresponding to the PUSCH;

there is no corresponding path loss measurement resource for the PUSCH, for example, no path loss measurement resource is configured, activated, or indicated for the PUSCH;

a reference signal resource on the first beam is a downlink reference signal resource; or a reference signal resource on the first beam is an uplink reference signal resource, and the uplink reference signal is associated with a downlink reference signal.

Further, when the first beam or the first beam on the uplink is used as the transmit beam of the PUSCH, a reference signal resource on the first beam or the first beam on the uplink may further be used as the path loss measurement resource.

Further, the path loss measurement resource of the PUSCH may be further determined by using the first beam or the first beam on the uplink. In other words, when a seventh condition is satisfied, a downlink reference signal resource included in the first beam or the first beam on the uplink or a downlink reference signal resource corresponding to an uplink reference signal resource included in the first beam or the first beam on the uplink is used as the path loss measurement resource. The seventh condition includes but is not limited to one or more of the following conditions:

the first beam or the first beam on the uplink is configured, activated, or indicated for the terminal device;

the terminal device is configured to support use of the first beam as the default beam;

the terminal device is configured to support use of the first beam as the default beam of the PUSCH;

the terminal device is configured to support use of the first beam;

the terminal device is configured with the PUSCH that supports use of the first beam;

the PUSCH supports use of the first beam;

the terminal device is configured to support use of a reference signal on the first beam as a path loss measurement reference signal;

the terminal device is configured to support use of a reference signal on the first beam as a path loss measurement reference signal of the PUSCH;

the PUSCH is a target channel of the first beam;

there is no corresponding beam for the PUSCH;

the PUSCH is scheduled by using DCI 0-0;

the PUSCH is scheduled by using DCI 0-1, and the DCI 0-1 does not include an SRI or a beam indication field;

no PUCCH is configured for a cell corresponding to the PUSCH;

no beam is configured, activated, or indicated for a PUCCH configured for a cell corresponding to the PUSCH;

there is no corresponding path loss measurement resource for the PUSCH, for example, no path loss measurement resource is configured, activated, or indicated for the PUSCH;

a reference signal resource on the first beam is a downlink reference signal resource; or a reference signal resource on the first beam is an uplink reference signal resource, and the uplink reference signal is associated with a downlink reference signal.

4. Default Beam of an Aperiodic CSI-RS:

If the first beam or the first beam on the downlink is configured, activated, or indicated for the terminal device, the first beam or the first beam on the downlink is used as a receive beam of the aperiodic CSI-RS. In other words, the terminal assumes that the aperiodic CSI-RS and the first beam or the first beam on the downlink have a same receive beam. In other words, when an eighth condition is satisfied, the terminal device uses the first beam or the first beam on the downlink as the receive beam of the aperiodic CSI-RS. The eighth condition includes but is not limited to one or more of the following conditions:

the first beam or the first beam on the downlink is configured, activated, or indicated for the terminal device;

the terminal device is configured to support use of the first beam;

the terminal device is configured with the CSI-RS that supports use of the first beam;

the CSI-RS supports use of the first beam;

a plurality of (for example, two) first beams or first beams on the downlink are configured, activated, or indicated for the terminal device;

the terminal device is configured to support use of the first beam as the default beam;

the terminal device is configured to support use of the first beam as the default beam of the aperiodic CSI-RS;

at least one TCI-state includes QCL-info of typeD; or a time interval between DCI for scheduling the aperiodic CSI-RS and the aperiodic CSI-RS is less than a preset threshold, for example, beam switch timing.

5. Default Beam of a PDSCH in a Multi-Site or Multi-TRP Scenario:

If the first beam or the first beam on the downlink is configured, activated, or indicated for the terminal device, one group of (for example, two) first beams or first beams on the downlink are used as default beams of the PDSCH. In other words, when a ninth condition is satisfied, the terminal device uses the first beam or the first beam on the downlink as a receive beam of the PDSCH. The ninth condition includes but is not limited to one or more of the following conditions:

the first beam or the first beam on the downlink is configured, activated, or indicated for the terminal device;

the terminal device is configured to support use of the first beam as the default beam;

the terminal device is configured to support use of the first beam;

the terminal device is configured with the PDSCH that supports use of the first beam;

the PDSCH supports use of the first beam;

the terminal device is configured to support use of the first beam as the default beam of the PDSCH;

at least one TCI field value corresponds to two or more TCI-states or first beams;

at least one TCI-state includes QCL-info of typeD;

a time interval between DCI for scheduling the PDSCH and the PDSCH is less than a preset threshold, for example, beamSwitchTiming;

DCI for scheduling the PDSCH indicates no TCI-state or has no TCI field; or a time interval between DCI for scheduling the PDSCH and the PDSCH is less than a preset threshold, for example, TimeDurationForQCL.

The foregoing two first beams may be associated with a specific index, for example, a CORESETPoolIndex. In this case, the PDSCH uses a first beam that has a same CORESETPoolIndex as a PDCCH for scheduling the PDSCH as a receive beam of the PDSCH. The foregoing method may alternatively be used only when a tenth condition is satisfied. The tenth condition includes but is not limited to one or more of the following conditions:

the first beam or the first beam on the downlink is configured, activated, or indicated for the terminal device;

a plurality of (for example, two) first beams or first beams on the downlink are configured, activated, or indicated for the terminal device;

a plurality of (for example, two) configured, activated, or indicated first beams or first beams on the downlink are associated with different indexes, for example, CORESETPoolIndexes;

the terminal device is configured to support use of the first beam as the default beam;

the terminal device is configured to support use of the first beam as the default beam of the PDSCH;

at least one TCI field value corresponds to two or more TCI-states or first beams;

at least one TCI-state includes QCL-info of typeD;

a time interval between DCI for scheduling the PDSCH and the PDSCH is less than a preset threshold, for example, beamSwitchTiming;

DCI for scheduling the PDSCH indicates no TCI-state or has no TCI field; or a time interval between DCI for scheduling the PDSCH and the PDSCH is less than a preset threshold, for example, TimeDurationForQCL.

The foregoing mainly describes, from a perspective of the method, the solutions provided in embodiments of this application. It may be understood that, to implement the foregoing functions, the terminal device and the network device include corresponding hardware structures and/or software modules for performing the functions. A person skilled in the art should be easily aware that, in combination with the examples described in embodiments disclosed in this specification, modules, algorithms, steps can be implemented by hardware or a combination of hardware and computer software in this application. Whether a function is performed by hardware or hardware driven by computer software depends on particular applications and design constraints of the technical solutions. A person skilled in the art may use different methods to implement the functions for all particular applications, but it should not be considered that the implementation goes beyond the scope of this application.

In embodiments of this application, function module division may be performed on the terminal device and the network device based on the foregoing method examples.

For example, each function module may be obtained through division corresponding to each function, or two or more functions may be integrated in one processing module 602. The integrated module may be implemented in a form of hardware, or may be implemented in a form of a software function module. It should be noted that, in embodiments of this application, division into the modules is an example, and is merely logical function division. Another division manner may be used during actual implementation.

Figure 6:
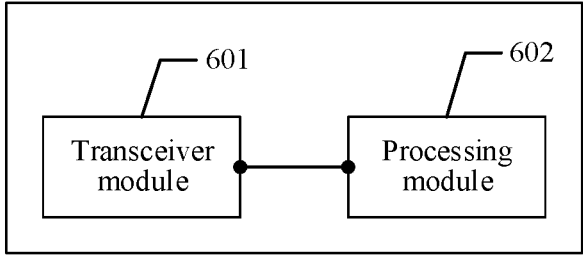
FIG. 6 is a schematic diagram of an embodiment of a terminal device according to embodiments of this application.

The following describes the terminal device and the network device in this application in detail. FIG. 6 is a schematic diagram of an embodiment of a terminal device according to embodiments of this application. The terminal device 600 includes:

a transceiver module 601, configured to communicate with a network device by using a first beam, where the first beam is for transmitting a first channel and/or a first reference signal.

The first channel includes a plurality of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH).

The first reference signal includes a plurality of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS).

In some optional embodiments of this application, the first PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In some optional embodiments of this application, the first PDSCH includes one or more of the following, or a combination of a plurality of the following:

a PDSCH scheduled by using a PDCCH for which the first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

In some optional embodiments of this application, the first PUCCH includes one or more of the following:

a specific-format PUCCH configured by the network device, a PUCCH carrying hybrid automatic repeat request (HARQ) feedback information, a PUCCH carrying HARQ feedback information of a PDSCH scheduled by using a PDCCH for which the first beam is used, a PUCCH overlapping, in time domain, with another channel for which the first beam is used, or a PUCCH overlapping, in time domain, with another reference signal for which the first beam is used.

In some optional embodiments of this application, the first PUSCH includes one or more of the following:

a PUSCH scheduled by using a PDCCH for which the first beam is used, a PUSCH corresponding to a scheduling PDCCH that indicates no beam, a PUSCH corresponding to the scheduling PDCCH that indicates no sounding reference signal resource indicator (SRI), a PUSCH whose time interval with the scheduling PDCCH is less than a preset threshold, a PUSCH scheduled by using downlink control information (DCI) 0-0, a PUSCH scheduled by using downlink control information (DCI) 0-2, a PUSCH overlapping, in time domain, with another channel for which the first beam is used, or a PUSCH overlapping, in time domain, with another reference signal for which the first beam is used, where the scheduling PDCCH is a PDCCH for scheduling a PUSCH.

In some optional embodiments of this application, the first CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In some optional embodiments of this application, the first SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In some optional embodiments of this application, the transceiver module 601 is further configured to receive a configuration message sent by a network device; and a processing module 602 is further configured to determine, based on the configuration message, whether to use the first beam; or a processing module 602 is further configured to determine, based on the configuration message, the first channel and/or the first reference signal for which the first beam is used.

In some optional embodiments of this application, the configuration message carries one or more of the following:

a type of the first channel;
a type of the first reference signal;
information about the first PDCCH;
information about a control-resource set (CORESET) corresponding to the first PDCCH;
information about a search space corresponding to the first PDCCH;

information about the first PUCCH;

information about the first CSI-RS;

information about the first SRS;

one or more beams included in the first beam; or a first parameter, where the first parameter indicates whether to use the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

In some optional embodiments of this application, the configuration message is a radio resource control (RRC) message, a medium access control-control element (MAC CE) message, or downlink control information (DCI).

In some optional embodiments of this application, the transceiver module 601 is further configured to receive an indication message sent by the network device; and the processing module 602 is further configured to determine, based on the indication message, the first beam to be configured, activated, or indicated.

In some optional embodiments of this application, the transceiver module 601 is further configured to receive downlink control information (DCI) sent by the network device.

When a first condition is satisfied, a transmission configuration indicator (TCI) field in the DCI indicates the first beam, where the first condition includes one of the following, or a combination of a plurality of the following:

the first beam is configured for the terminal device;

the terminal device is configured with the first channel that includes the first PDSCH;

the first beam is for PDSCH transmission;

PDSCH transmission is not scheduled by using the DCI;

a frequency domain resource assignment field value in the DCI is 0; or a value of a first field carried in the DCI indicates that the TCI field indicates the first beam, and the first field indicates a function of the TCI field.

In some optional embodiments of this application, the DCI further carries a second field, the second field indicates a function of the DCI, and the function of the DCI includes one or more of the following:

indicating the first beam, scheduling a PDSCH, or indicating the first channel.

In some optional embodiments of this application, the second field includes one or more of the following: a frequency domain resource assignment field, a time domain resource assignment field, a modulation and coding scheme (MCS) field, a new data indicator (NDI) field, a redundancy version (RV) field, a hybrid automatic repeat request (HARQ) process field, a downlink assignment index (DAI) field, a physical uplink control channel (PUCCH) resource field, or a hybrid automatic repeat request (HARQ) feedback time indicator field.

In some optional embodiments of this application, the transceiver module 601 is further configured to send capability information to the network device, where the capability information includes one or both of the following:

whether the terminal device supports use of the first beam, and a beam quantity of first beams supported by the terminal device, where the first beam includes one or more of the following: a first beam on an uplink, a first beam on a downlink, a first beam shared by the uplink and the downlink, a first beam on a control channel, or a first beam on a data channel.

The beam quantity includes one or more of the following: a quantity of beams configured for a single transmission reception point (TRP) corresponding to the terminal device, a quantity of beams configured for all TRPs corresponding to the terminal device, a quantity of beams configured for a single cell corresponding to the terminal device, or a quantity of beams configured for all cells corresponding to the terminal device;

a quantity of beams activated for a single transmission reception point (TRP) corresponding to the terminal device, a quantity of beams activated for all TRPs corresponding to the terminal device, a quantity of beams activated for a single cell corresponding to the terminal device, or a quantity of beams activated for all cells corresponding to the terminal device; or a quantity of beams indicated for a single transmission reception point (TRP) corresponding to the terminal device, a quantity of beams indicated for all TRPs corresponding to the terminal device, a quantity of beams indicated for a single cell corresponding to the terminal device, or a quantity of beams indicated for all cells corresponding to the terminal device.

Figure 7:
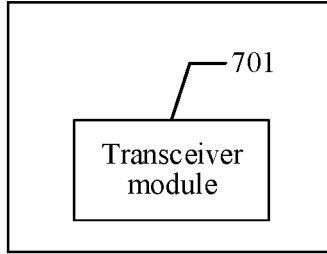
FIG. 7 is a schematic diagram of an embodiment of a network device according to embodiments of this application.

FIG. 7 is a schematic diagram of an embodiment of a network device according to embodiments of this application. The network device 700 includes:

a transceiver module 701, configured to communicate with a terminal device by using a first beam, where the first beam is for transmitting a first channel and/or a first reference signal.

The first channel includes a plurality of the following: a first physical downlink control channel (PDCCH), a first physical downlink shared channel (PDSCH), a first physical uplink control channel (PUCCH), a first physical uplink shared channel (PUSCH), a first physical broadcast channel (PBCH), or a first physical random access channel (PRACH).

The first reference signal includes a plurality of the following: a first synchronization signal/physical broadcast channel block (SSB), a first channel state information reference signal (CSI-RS), a first sounding reference signal (SRS), a first demodulation reference signal (DMRS), a first phase tracking reference signal (PTRS), a first cell-specific reference signal (CRS), or a first time-frequency tracking reference signal (TRS).

In some optional embodiments of this application, the first PDCCH includes one or more of the following, or a combination of a plurality of the following:

a PDCCH corresponding to a UE-specific search space, a PDCCH corresponding to a control-resource set (CORESET) other than a control-resource set (CORESET) 0, a PDCCH overlapping, in time domain, with another channel for which the first beam is used, a PDCCH overlapping, in time domain, with another reference signal for which the first beam is used, a PDCCH corresponding to a specific-format search space configured by the network device, or a PDCCH corresponding to a specific-format CORESET configured by the network device.

In some optional embodiments of this application, the first PDSCH includes one or more of the following, or a combination of a plurality of the following:

a PDSCH scheduled by using a PDCCH for which the first beam is used, a PDSCH corresponding to a scheduling PDCCH that indicates no beam, a PDSCH corresponding to the scheduling PDCCH that has no transmission configuration indicator (TCI) field value associated with a beam, a PDSCH whose time interval with the scheduling PDCCH is less than a preset threshold, a PDSCH scheduled by using downlink control information (DCI) format 1-0, a PDSCH scheduled by using downlink control information (DCI) format 1-2, a PDSCH overlapping, in time domain, with another channel for which the first beam is used, a PDSCH overlapping, in time domain, with another reference signal for which the first beam is used, or a specific-format PDSCH configured by the network device, where the scheduling PDCCH is a PDCCH for scheduling a PDSCH.

In some optional embodiments of this application, the first PUCCH includes one or more of the following:

a specific-format PUCCH configured by the network device, a PUCCH carrying hybrid automatic repeat request (HARQ) feedback information, a PUCCH carrying HARQ feedback information of a PDSCH scheduled by using a PDCCH for which the first beam is used, a PUCCH overlapping, in time domain, with another channel for which the first beam is used, or a PUCCH overlapping, in time domain, with another reference signal for which the first beam is used.

In some optional embodiments of this application, the first PUSCH includes one or more of the following:

a PUSCH scheduled by using a PDCCH for which the first beam is used, a PUSCH corresponding to a scheduling PDCCH that indicates no beam, a PUSCH corresponding to the scheduling PDCCH that indicates no sounding reference signal resource indicator (SRI), a PUSCH whose time interval with the scheduling PDCCH is less than a preset threshold, a PUSCH scheduled by using downlink control information (DCI) 0-0, a PUSCH scheduled by using downlink control information (DCI) 0-2, a PUSCH overlapping, in time domain, with another channel for which the first beam is used, or a PUSCH overlapping, in time domain, with another reference signal for which the first beam is used, where the scheduling PDCCH is a PDCCH for scheduling a PUSCH.

In some optional embodiments of this application, the first CSI-RS includes one or more of the following:

a CSI-RS in a resource set whose repetition parameter is configured as on, a CSI-RS in a resource set for which no repetition parameter and no time-frequency tracking reference signal information trs-info parameter are configured, a CSI-RS for which no beam information is configured, a CSI-RS whose time interval with DCI for triggering a CSI-RS is less than a preset threshold, or a CSI-RS associated with an SRS whose type is non-Codebook.

In some optional embodiments of this application, the first SRS includes one or more of the following:

an SRS whose type is codebook, an SRS whose type is nonCodebook, an SRS in a resource set whose repetition parameter is configured as on, an SRS whose type is antenna switch, an SRS for which no beam information is configured, or an SRS for which no path loss measurement resource is configured.

In some optional embodiments of this application, the transceiver module 701 is further configured to send a configuration message to the terminal device, where the configuration message is for configuring whether the terminal device uses the first beam, or configuring the first channel and/or the first reference signal for which the terminal device uses the first beam.

In some optional embodiments of this application, the configuration message carries one or more of the following:

a type of the first channel;
a type of the first reference signal;
information about the first PDCCH;
information about a control-resource set (CORESET) corresponding to the first PDCCH;
information about a search space corresponding to the first PDCCH;
information about the first PUCCH;
information about the first CSI-RS;
information about the first SRS;
one or more beams included in the first beam; or
a first parameter, where the first parameter indicates whether to use the first beam, and the first parameter indicates: whether the first beam is used for uplink transmission of the terminal device, whether the first beam is used for downlink transmission of the terminal device, whether the first beam is used for uplink transmission and downlink transmission of the terminal device, whether the first beam is used for control channel transmission of the terminal device, or whether the first beam is used for data channel transmission of the terminal device.

In some optional embodiments of this application, the configuration message is a radio resource control (RRC) message, a medium access control-control element (MAC CE) message, or downlink control information (DCI).

In some optional embodiments of this application, the transceiver module 701 is further configured to send an indication message to the terminal device, where the indication message is for configuring, activating, or indicating the first beam.

In some optional embodiments of this application, that the network device sends the indication message to the terminal device includes:

The transceiver module 701 is further configured to send downlink control information (DCI) to the terminal device.

When a first condition is satisfied, a transmission configuration indicator (TCI) field in the DCI indicates the first beam, where the first condition includes one of the following, or a combination of a plurality of the following:

the first beam is configured for the terminal device;
the terminal device is configured with the first channel that includes the first PDSCH;
the first beam is for PDSCH transmission;
PDSCH transmission is not scheduled by using the DCI;
a frequency domain resource assignment field value in the DCI is 0; or
a value of a first field carried in the DCI indicates that the TCI field indicates the first beam, and the first field indicates a function of the TCI field.

In some optional embodiments of this application, the DCI further carries a second field, the second field indicates a function of the DCI, and the function of the DCI includes one or more of the following:

indicating the first beam, scheduling a PDSCH, or indicating the first channel.

In some optional embodiments of this application, the second field includes one or more of the following: a frequency domain resource assignment field, a time domain resource assignment field, a modulation and coding scheme (MCS) field, a new data indicator (NDI) field, a redundancy version (RV) field, a hybrid automatic repeat request (HARD) process field, a downlink assignment index (DAI)

field, a physical uplink control channel (PUCCH) resource field, or a hybrid automatic repeat request (HARQ) feedback time indicator field.

In some optional embodiments of this application, the transceiver module 701 is further configured to receive capability information sent by the terminal device, where the capability information includes one or both of the following:

whether the terminal device supports use of the first beam, and a beam quantity of first beams supported by the terminal device, where the first beam includes one or more of the following: a first beam on an uplink, a first beam on a downlink, a first beam shared by the uplink and the downlink, a first beam on a control channel, or a first beam on a data channel.

The beam quantity includes one or more of the following: a quantity of beams configured for a single transmission reception point (TRP) corresponding to the terminal device, a quantity of beams configured for all TRPs corresponding to the terminal device, a quantity of beams configured for a single cell corresponding to the terminal device, or a quantity of beams configured for all cells corresponding to the terminal device;

a quantity of beams activated for a single transmission reception point (TRP) corresponding to the terminal device, a quantity of beams activated for all TRPs corresponding to the terminal device, a quantity of beams activated for a single cell corresponding to the terminal device, or a quantity of beams activated for all cells corresponding to the terminal device; or a quantity of beams indicated for a single transmission reception point (TRP) corresponding to the terminal device, a quantity of beams indicated for all TRPs corresponding to the terminal device, a quantity of beams indicated for a single cell corresponding to the terminal device, or a quantity of beams indicated for all cells corresponding to the terminal device.

This application further provides a communication system, including at least one or more of a network device or a terminal device.

An embodiment of this application further provides a computer-readable storage medium, including instructions. When the instructions are run on a computer, the computer is enabled to control a network device or a terminal device to perform any implementation shown in the foregoing method embodiment.

An embodiment of this application further provides a computer program product. The computer program product includes computer program code. When the computer program code is run on a computer, the computer is enabled to perform any implementation shown in the foregoing method embodiment.

An embodiment of this application further provides a chip system, including a memory and a processor. The memory is configured to store a computer program, and the processor is configured to invoke the computer program from the memory and run the computer program, so that a chip performs any implementation shown in the foregoing method embodiment.

An embodiment of this application further provides a chip system, including a processor. The processor is configured to invoke and run a computer program, so that a chip performs any implementation shown in the foregoing method embodiment.

In addition, it should be noted that the apparatus embodiments described above are merely examples. The units described as separate parts may or may not be physically separate, and parts displayed as units may or may not be physical units, that is, may be located in one position, or may be distributed on a plurality of network units. Some or all of the modules may be selected based on an actual requirement to achieve the objectives of the solutions in embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any function that is performed by a computer program can be easily implemented by using corresponding hardware. Moreover, a specific hardware structure for achieving a same function may be of various forms, for example, in a form of an analog circuit, a digital circuit, or a dedicated circuit. However, for this application, software program implementation is a better implementation in most cases. Based on such an understanding, the technical solutions in this application essentially or the part contributing to the prior art may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When software is used for implementing embodiments, all or some of embodiments may be implemented in a form of a computer program product.

The computer program product includes one or more computer instructions. When computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, network device, terminal device, network apparatus, computing device, or data center to another website, computer, network device, terminal device, network apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a network apparatus or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that "one embodiment" or "an embodiment" mentioned in the entire specification means that particular features, structures, or characteristics related to the embodiment are included in one or more embodiments of this application. Therefore, "in one embodiment" or "in an embodiment" appearing throughout the specification does not necessarily refer to a same embodiment. In addition, these particular features, structures, or characteristics may be combined in one or more embodiments in any proper manner. It should be understood that, in various embodiments of this application, sequence numbers of the foregoing processes do not mean an execution sequence. An execution sequence of the processes should be determined based on functions and internal logic of the processes, and should not constitute any limitation on an implementation process of embodiments of this application.

A person of ordinary skill in the art may be aware that, in combination with the examples described in embodiments disclosed in this specification, units and algorithm steps may be implemented by electronic hardware, computer software, or a combination thereof. To clearly describe interchangeability between the hardware and the software, the foregoing generally describes a composition and steps of each example based on functions. Whether the functions are performed by hardware or software depends on particular applications and design constraints of the technical solutions. A person skilled in the art may use different methods to implement the functions for all particular applications, but it should not be considered that the implementation goes beyond the scope of this application.

It may be clearly understood by a person skilled in the art that, for ease and brevity of description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the foregoing apparatus embodiment is merely an example. For example, division into the units is merely logical function division, and may be other division in actual implementation. For example, a plurality of units or components may be combined, or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application.

To sum up, the foregoing descriptions are merely examples of embodiments of the technical solutions in this application, but are not intended to limit the protection scope of this application. Any modification, equivalent replacement, improvement, or the like made without departing from the spirit and principle of this application shall fall within the protection scope of this application.

What is claimed is:

1. A communication method, comprising:
   receiving configuration information of a physical downlink control channel (PDCCH) from a network device, wherein the PDCCH is corresponding to a control resource set 0 (CORESET 0);
   receiving downlink control information (DCI) from the network device, wherein the DCI indicates a first beam; wherein the configuration information of the PDCCH is carried in a radio resource control (RRC) message and includes a first parameter that indicates that the PDCCH uses the first beam indicated by the DCI; and
   receiving the PDCCH by using the first beam.

2. The method according to claim 1, further comprising:
   receiving configuration information of a sounding reference signal (SRS) resource set from the network device, wherein the configuration information comprises a second parameter, the second parameter indicates that an SRS resource in the SRS resource set is transmitted by using the first beam.

3. The method according to claim 1, wherein a format of the DCI is 1_1 or 1_2.

4. The method according to claim 1, wherein the first beam is a common beam and is used to transmit a plurality of channels and/or a plurality of reference signals.

5. The method according to claim 4, wherein:
   the plurality of channels comprises one or more of the following: a physical downlink control channel (PDCCH), a physical downlink shared channel (PDSCH), a physical uplink control channel (PUCCH), a physical uplink shared channel (PUSCH), a physical broadcast channel (PBCH), or a physical random access channel (PRACH); and
   the plurality of reference signals comprises one or more of the following: a synchronization signal/physical broadcast channel block (SSB), a channel state information reference signal (CSI-RS), a sounding reference signal (SRS), a demodulation reference signal (DMRS), a phase tracking reference signal (PTRS), a cell-specific reference signal (CRS), or a tracking reference signal (TRS).

6. A communication method, comprising:
   sending configuration information of a physical downlink control channel (PDCCH) to a terminal device, wherein the PDCCH is corresponding to a control resource set 0 (CORESET 0);
   sending downlink control information (DCI) to the terminal device, wherein the DCI indicates a first beam; wherein the configuration information of the PDCCH is carried in a radio resource control (RRC) message and includes a first parameter that indicates that the PDCCH uses the first beam indicated by the DCI; and
   sending the PDCCH by using the first beam.

7. The method according to claim 6, wherein the method further comprises:

sending configuration information of a sounding reference signal (SRS) resource set to the terminal device, wherein the configuration information comprises a second parameter, the second parameter indicates that an SRS resource in the SRS resource set is transmitted by using the first beam.

8. The method according to claim 6, wherein a format of the DCI is 1_1 or 1_2.

9. The method according to claim 6, wherein the first beam is a common beam and is used to transmit a plurality of channels and/or a plurality of reference signals.

10. The method according to claim 9, wherein:

the plurality of channels comprises one or more of the following: a physical downlink control channel (PDCCH), a physical downlink shared channel (PDSCH), a physical uplink control channel (PUCCH), a physical uplink shared channel (PUSCH), a physical broadcast channel (PBCH), or a physical random access channel (PRACH); and the plurality of reference signals comprises one or more of the following: a synchronization signal/physical broadcast channel block (SSB), a channel state information reference signal (CSI-RS), a sounding reference signal (SRS), a demodulation reference signal (DMRS), a phase tracking reference signal (PTRS), a cell-specific reference signal (CRS), or a tracking reference signal (TRS).

11. A communication apparatus, comprising:

at least one processor, configured to execute programming instructions to cause the apparatus to:

receive configuration information of a physical downlink control channel (PDCCH) from a network device, wherein the PDCCH is corresponding to a control resource set 0 (CORESET 0);

receive downlink control information (DCI) from the network device, wherein the DCI indicates a first beam; wherein the configuration information of the PDCCH is carried in a radio resource control (RRC) message and includes a first parameter that indicates that the PDCCH uses the first beam indicated by the DCI; and receive the PDCCH by using the first beam.

12. The communication apparatus according to claim 11, wherein the at least one processor is further configured to execute the programming instructions to cause the apparatus to:

receive configuration information of a sounding reference signal (SRS) resource set from the network device, wherein the configuration information comprises a second parameter, the second parameter indicates that an SRS resource in the SRS resource set is transmitted by using the first beam.

13. The communication apparatus according to claim 11, wherein a format of the DCI is 1_1 or 1_2.

14. The communication apparatus according to claim 11, wherein the first beam is a common beam and is used to transmit a plurality of channels and/or a plurality of reference signals.

15. The communication apparatus according to claim 14, wherein:

the plurality of channels comprises one or more of the following: a physical downlink control channel (PDCCH), a physical downlink shared channel (PDSCH), a physical uplink control channel (PUCCH), a physical uplink shared channel (PUSCH), a physical broadcast channel (PBCH), or a physical random access channel (PRACH); and the plurality of reference signals comprises one or more of the following: a synchronization signal/physical broadcast channel block (SSB), a channel state information reference signal (CSI-RS), a sounding reference signal (SRS), a demodulation reference signal (DMRS), a phase tracking reference signal (PTRS), a cell-specific reference signal (CRS), or a tracking reference signal (TRS).

16. A communication apparatus, comprising:

at least one processor, configured to execute programming instructions to cause the apparatus to:

send configuration information of a physical downlink control channel (PDCCH) to a terminal device, wherein the PDCCH is corresponding to a control resource set 0 (CORESET 0);

send downlink control information (DCI) to the terminal device, wherein the DCI indicates a first beam; wherein the configuration information of the PDCCH is carried in a radio resource control (RRC) message and includes a first parameter that indicates that the PDCCH uses the first beam indicated by the DCI; and send the PDCCH by using the first beam.

17. The communication apparatus according to claim 16, wherein the at least one processor is further configured to execute the programming instructions to cause the apparatus to:

send configuration information of a sounding reference signal (SRS) resource set to the terminal device, wherein the configuration information comprises a second parameter, the second parameter indicates that an SRS resource in the SRS resource set is transmitted by using the first beam.

18. The communication apparatus according to claim 16, wherein a format of the DCI is 1_1 or 1_2.

19. The communication apparatus according to claim 16, wherein the first beam is a common beam and is used to transmit a plurality of channels and/or a plurality of reference signals.

20. The communication apparatus according to claim 19, wherein:

the plurality of channels comprises one or more of the following: a physical downlink control channel (PDCCH), a physical downlink shared channel (PDSCH), a physical uplink control channel (PUCCH), a physical uplink shared channel (PUSCH), a physical broadcast channel (PBCH), or a physical random access channel (PRACH); and the plurality of reference signals comprises one or more of the following: a synchronization signal/physical broadcast channel block (SSB), a channel state information reference signal (CSI-RS), a sounding reference signal (SRS), a demodulation reference signal (DMRS), a phase tracking reference signal (PTRS), a cell-specific reference signal (CRS), or a tracking reference signal (TRS).

* * * * *